(12) United States Patent
Kawasaki

(10) Patent No.: US 8,651,072 B2
(45) Date of Patent: Feb. 18, 2014

(54) SPARK IGNITION TYPE INTERNAL COMBUSTION ENGINE

(75) Inventor: Takashi Kawasaki, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/641,623

(22) PCT Filed: May 24, 2010

(86) PCT No.: PCT/JP2010/059162
§ 371 (c)(1),
(2), (4) Date: Oct. 16, 2012

(87) PCT Pub. No.: WO2011/148514
PCT Pub. Date: Dec. 1, 2011

(65) Prior Publication Data
US 2013/0055989 A1    Mar. 7, 2013

(51) Int. Cl.
*F02B 75/04*    (2006.01)
(52) U.S. Cl.
USPC ............. 123/48 C; 123/90.15; 123/78 C; 123/48 R; 123/48 B; 701/102

(58) Field of Classification Search
USPC ............. 123/48 C, 48 R, 48 B, 90.15, 78 C; 701/102
See application file for complete search history.

(56) References Cited

U.S. PATENT DOCUMENTS

| | | | | |
|---|---|---|---|---|
| 4,834,031 A | * | 5/1989 | Katoh et al. | 123/48 R |
| 7,213,543 B2 | * | 5/2007 | Miyashita | 123/48 C |
| 2008/0133113 A1 | * | 6/2008 | Yasui | 701/105 |

FOREIGN PATENT DOCUMENTS

JP    A-2006-052682    2/2006

* cited by examiner

*Primary Examiner* — Marguerite McMahon
*Assistant Examiner* — James Kim
(74) *Attorney, Agent, or Firm* — Oliff PLC

(57) ABSTRACT

In an internal combustion engine, a variable compression ratio mechanism which can change the mechanical compression ratio and a variable valve timing mechanism which can control a closing timing of an intake valve are provided. When the variable compression ratio mechanism breaks down, the mechanical compression ratio and the intake valve closing timing are made to change from a current operating point toward a low mechanical compression ratio side demanded operating point without entering the no-entry region.

11 Claims, 36 Drawing Sheets

Fig.6
(A)
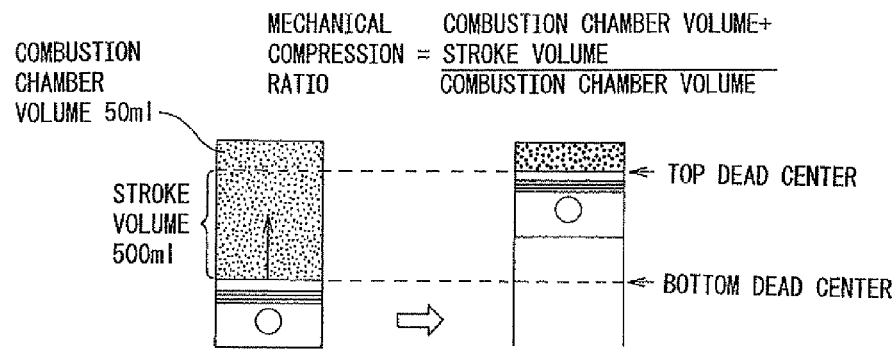
(B)
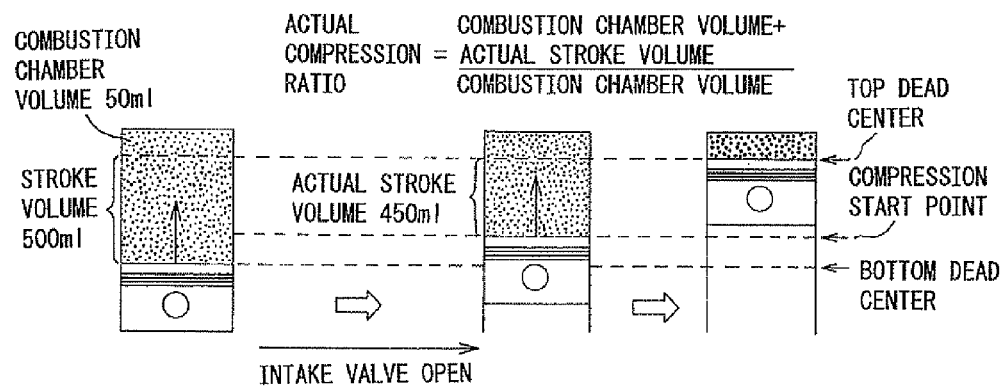
(C)
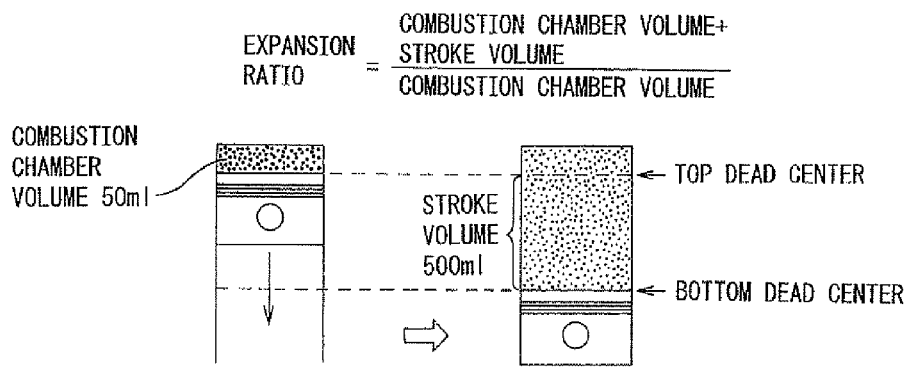

Fig.12
(A)
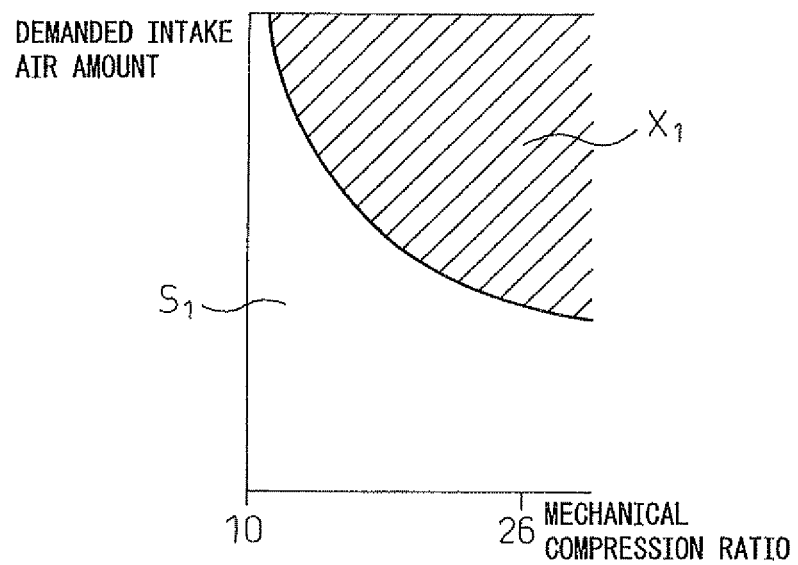
(B)
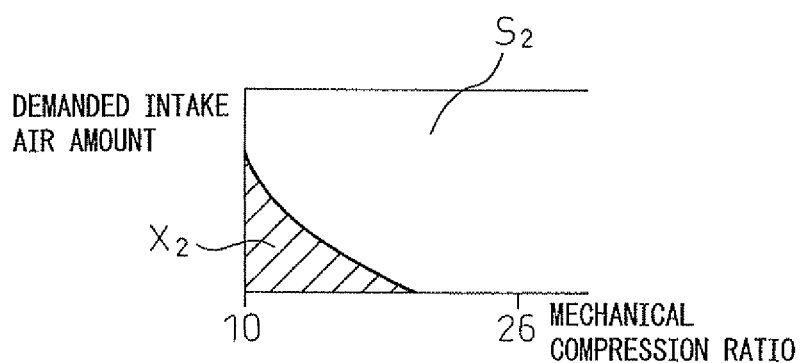

US 8,651,072 B2

SPARK IGNITION TYPE INTERNAL COMBUSTION ENGINE

TECHNICAL FIELD

The present invention relates to a spark ignition type internal combustion engine.

BACKGROUND ART

Known in the art is an internal combustion engine which is provided with a transmission mechanism which is comprised of a hollow sleeve which can rotate about an axis and a control rod which engages with a female thread formed inside of the hollow sleeve and is made to move in an axial direction of the hollow sleeve if the hollow sleeve is made to rotate, wherein the control rod is connected to a link mechanism which controls a stroke of a piston, an electric motor is used to make the hollow sleeve rotate and thereby make the control rod move, and thereby the stroke of the piston is made to change, that is, the mechanical compression ratio is made to change (for example, see Patent Literature 1).

In this internal combustion engine, the transmission mechanism is formed into an irreversible type so that even if the compression pressure or the combustion pressure changes, the piston stroke will not change, that is, the control rod will not move.

CITATION LIST

Patent Literature

Patent Literature 1: Japanese Patent Publication No. 2006-052682 A1

SUMMARY OF INVENTION

Technical Problem

However, if using an irreversible type transmission mechanism in this way, if the electric motor breaks down, the control rod of the transmission mechanism will no longer move, therefore, the mechanical compression ratio will be maintained at the compression ratio at the time of breakdown of the electric motor. In this case, if the mechanical compression ratio is maintained at a high compression ratio, knocking will occur and other problems will arise. In this case, to prevent such problems from occurring, the mechanical compression ratio has to be lowered. However, Patent Literature 1 does not consider this at all.

In this regard, if trying to control the closing timing of the intake valve in addition to the mechanical compression ratio, there will be an operating region of the engine into which the combination of the mechanical compression ratio and the intake valve closing timing must not enter since the combustion would deteriorate, that is, a no-entry region. Therefore, if lowering the mechanical compression ratio at the time of breakdown, it is necessary to prevent the combination of the mechanical compression ratio and the intake valve closing timing from entering this no-entry region.

An object of the present invention is to provide a spark ignition type internal combustion engine which secures good combustion while lowering the mechanical compression ratio when the variable compression ratio mechanism breaks down.

Solution to Problem

According to the present invention, there is provided a spark ignition type internal combustion engine comprising a variable compression ratio mechanism able to change a mechanical compression ratio and a variable valve timing mechanism able to control a closing timing of an intake valve, wherein a no-entry region for a combination of the mechanical compression ratio and the intake valve closing timing is set to prohibit entry of an operating point which shows the combination of the mechanical compression ratio and the intake valve closing timing into the no-entry region, and the mechanical compression ratio and the intake valve closing timing are made to change from a current operating point toward a low mechanical compression ratio side demanded operating point without entering the no-entry region when the variable compression ratio mechanism breaks down.

Advantageous Effects of Invention

When the variable compression ratio mechanism breaks down, the mechanical compression ratio is lowered and, at this time, the mechanical compression ratio and the intake valve closing timing are prevented from entering the no-entry region, so good combustion can be secured.

BRIEF DESCRIPTION OF DRAWINGS

FIG. 6 are views for explaining a mechanical compression ratio, actual combustion ratio, and expansion ratio.

FIG. 12 is a view which shows no-entry regions.

DESCRIPTION OF EMBODIMENTS

Figure 1:
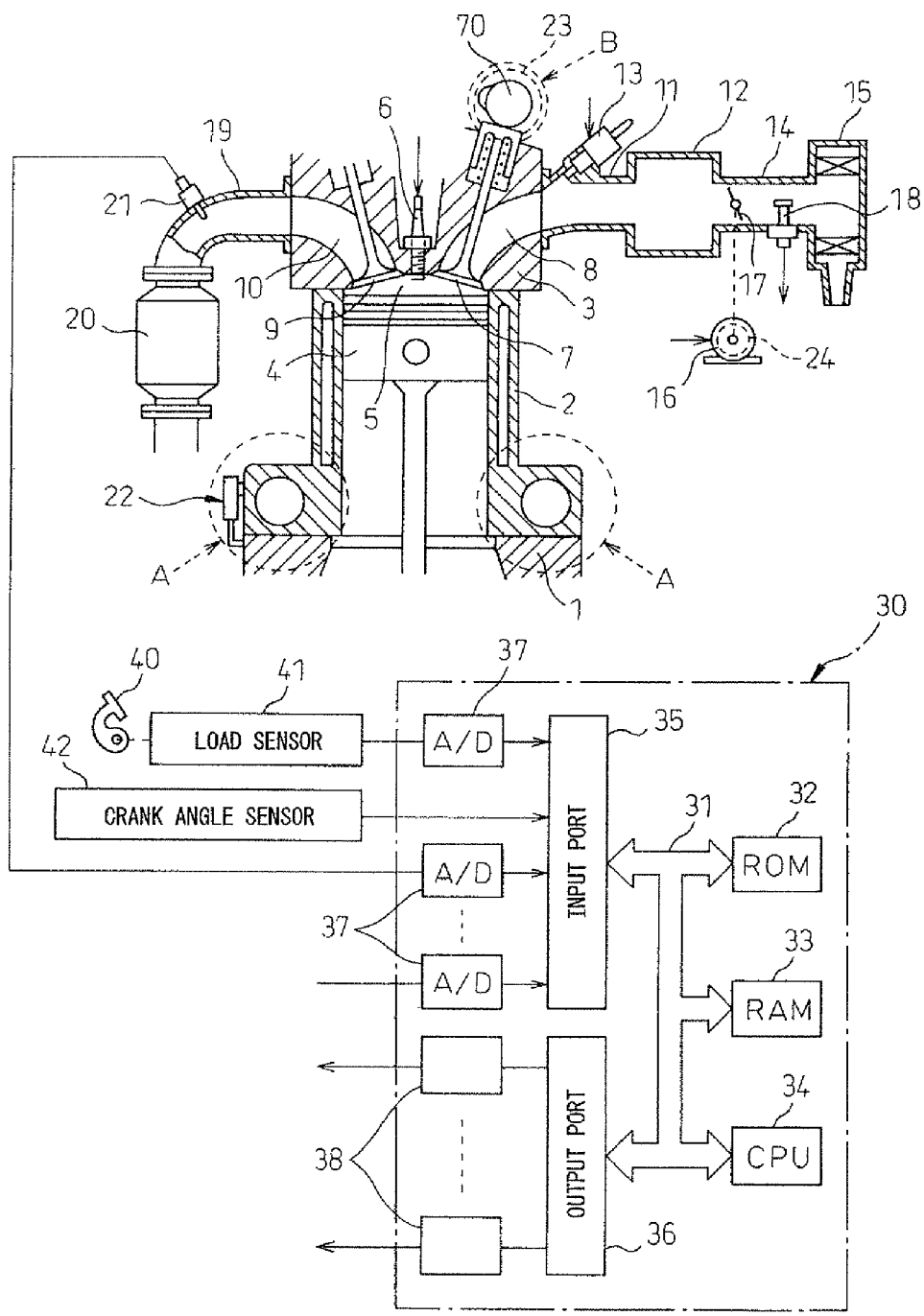
FIG. 1 is an overview of a spark ignition type internal combustion engine.

FIG. 1 shows a side cross-sectional view of a spark ignition type internal combustion engine.

Referring to FIG. 1, 1 indicates a crankcase, 2 a cylinder block, 3 a cylinder head, 4 a piston, 5 a combustion chamber, 6 a spark plug arranged at the top center of the combustion chamber 5, 7 an intake valve, 8 an intake port, 9 an exhaust valve, and 10 an exhaust port. The intake port 8 is connected through an intake branch pipe 11 to a surge tank 12, while each intake branch pipe 11 is provided with a fuel injector 13 for injecting fuel toward a corresponding intake port 8. Note that each fuel injector 13 may be arranged at each combustion chamber 5 instead of being attached to each intake branch pipe 11.

The surge tank 12 is connected via an intake duct 14 to an air cleaner 15. The intake duct 14 is provided inside it with a throttle valve 17 which is driven by an actuator 16 and an intake air amount detector 18 which uses, for example, a hot wire. On the other hand, the exhaust port 10 is connected through an exhaust manifold 19 to for example a catalytic converter 20 which houses a three-way catalyst. The exhaust manifold 19 has an air-fuel ratio sensor 21 arranged inside it.

On the other hand, in the embodiment shown in FIG. 1, the connecting part of the crankcase 1 and the cylinder block 2 is provided with a variable compression ratio mechanism A which can change relative positions of the crankcase 1 and cylinder block 2 in the cylinder axial direction so as to change the volume of the combustion chamber 5 when the piston 4 is positioned at compression top dead center, and further an actual compression action start timing changing mechanism B which can change the start timing of the actual compression action is provided. Note that, in the embodiment which is shown in FIG. 1, this actual compression action start timing changing mechanism B is comprised of a variable valve timing mechanism which can control a closing timing of the intake valve 7.

As shown in FIG. 1, the crankcase 1 and the cylinder block 2 have a relative position sensor 22 attached to them for detecting the relative positional relationship between the crankcase 1 and the cylinder block 2. From this relative position sensor 22, an output signal is output which shows the change in the distance between the crankcase 1 and the cylinder block 2. Further, the variable valve timing mechanism B has a valve timing sensor 23 attached to it which generates an output signal which shows the closing timing of the intake valve 7. The throttle valve drive-use actuator 16 has a throttle opening degree sensor 24 attached to it for generating an output signal which shows the throttle valve opening degree.

An electronic control unit 30 is comprised of a digital computer which is provided with a ROM (read only memory) 32, RAM (random access memory) 33, CPU (microprocessor) 34, input port 35, and output port 36, which are connected with each other through a bidirectional bus 31. The output signals of the intake air amount detector 18, air-fuel ratio sensor 21, relative position sensor 22, valve timing sensor 23, and throttle opening degree sensor 24 are input through corresponding AD converters 37 to the input port 35. Further, the accelerator pedal 40 is connected to a load sensor 41 which generates an output voltage proportional to the amount of depression L of the accelerator pedal 40. The output voltage of the load sensor 41 is input through a corresponding AD converter 37 to the input port 35. Further, the input port 35 is connected to a crank angle sensor 42 which generates an output pulse every time the crankshaft rotates by for example 30°. On the other hand, the output port 36 is connected through corresponding drive circuits 38 to spark plugs 6, fuel injectors 13, the throttle valve drive actuator 16, the variable compression ratio mechanism A, and the variable valve timing mechanism B.

Figure 2:
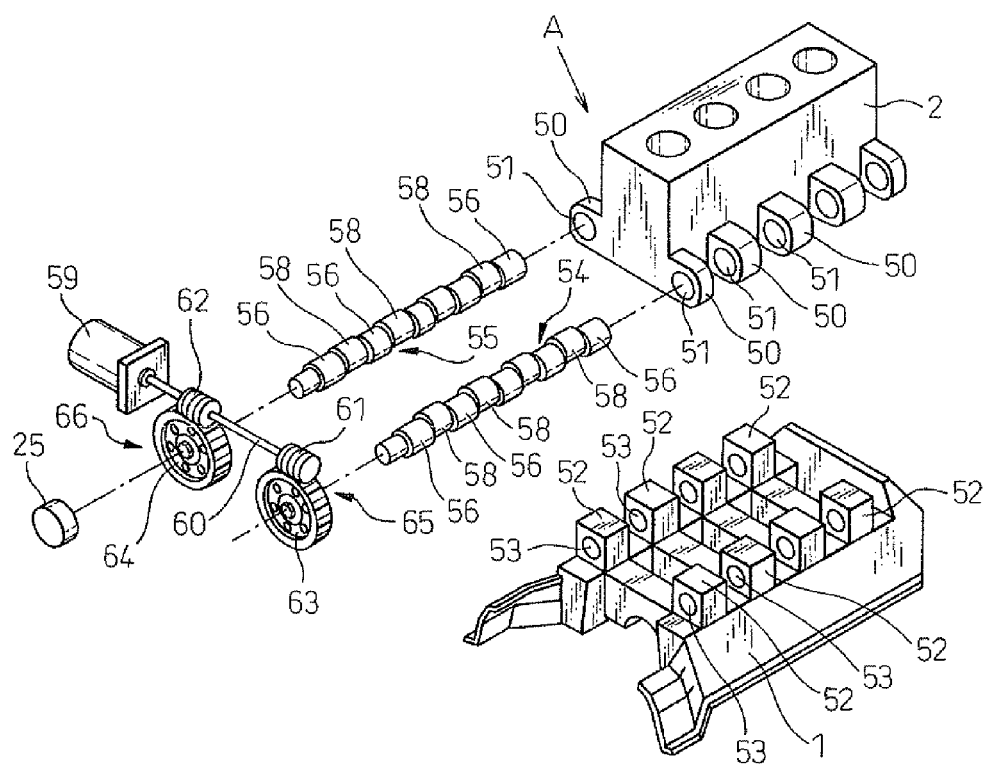
FIG. 2 is a disassembled perspective view of a variable compression ratio mechanism.
Figure 3:
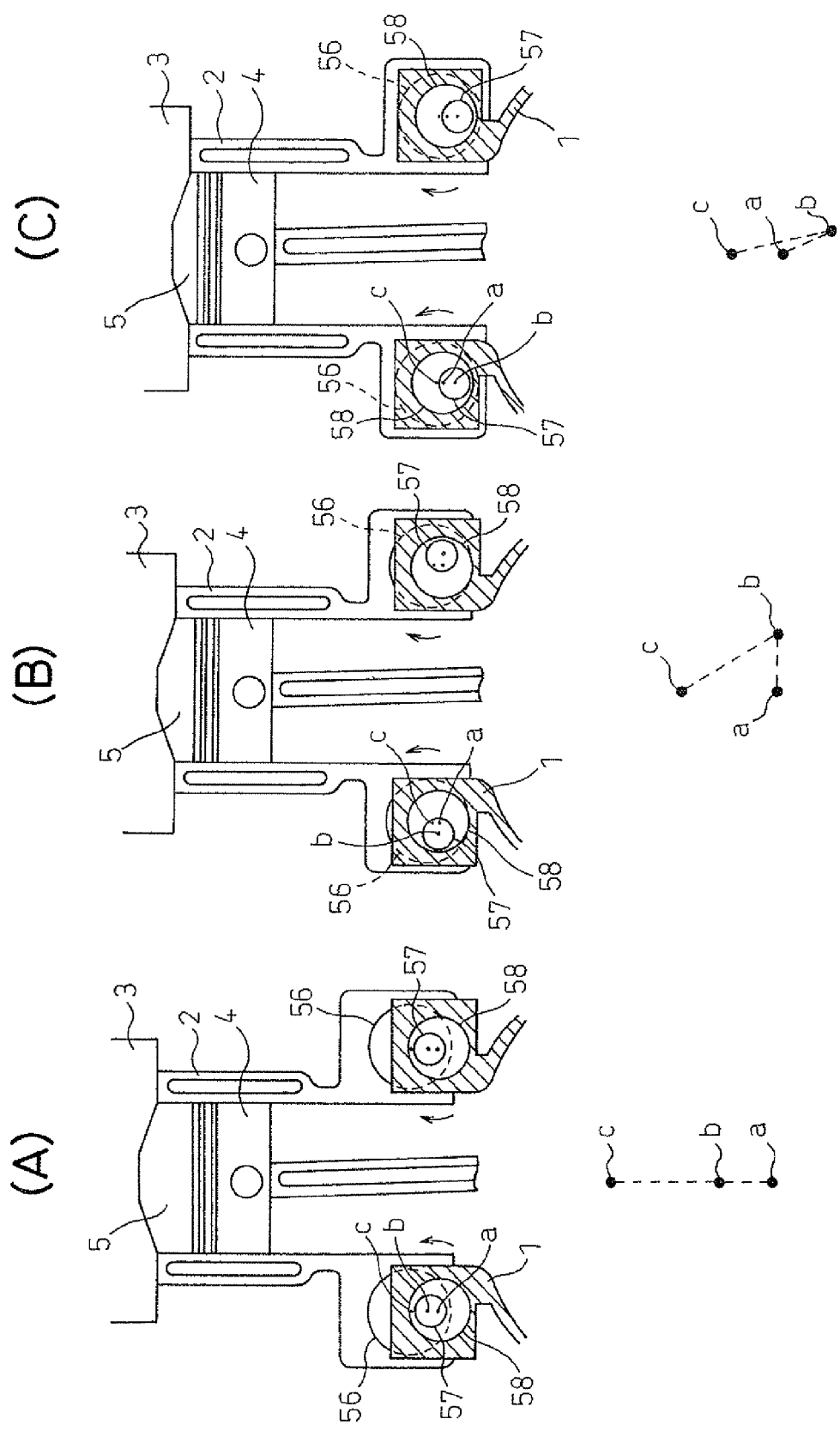
FIG. 3 are side cross-sectional views of the illustrated internal combustion engine.

FIG. 2 is a disassembled perspective view of the variable compression ratio mechanism A which is shown in FIG. 1, while FIG. 3 is a side cross-sectional view of the illustrated internal combustion engine. Referring to FIG. 2, at the bottom of the two side walls of the cylinder block 2, a plurality of projecting parts 50 separated from each other by a certain distance are formed. Each projecting part 50 is formed with a circular cross-section cam insertion hole 51. On the other hand, the top surface of the crankcase 1 is formed with a plurality of projecting parts 52 separated from each other by a certain distance and fitting between the corresponding projecting parts 50. These projecting parts 52 are also formed with circular cross-section cam insertion holes 53.

As shown in FIG. 2, a pair of camshafts 54, 55 are provided. Each of the camshafts 54, 55 has circular cams 56 fixed on it able to be rotatably inserted in the cam insertion holes 53 at every other position. These circular cams 56 are coaxial with the axes of rotation of the camshafts 54, 55. On the other hand, at the two sides of each of the circular cams 58, as shown in FIG. 3, extend eccentric shafts 57 arranged eccentrically with respect to the axes of rotation of the camshafts 54, 55. Each eccentric shaft 57 has other circular cams 56 rotatably attached to it eccentrically. As shown in FIG. 2, these circular cams 56 are arranged at the two sides of each of the circular cams 58. These circular cams 56 are rotatably inserted in the corresponding cam insertion holes 53. Further, as shown in FIG. 2, the camshaft 55 has a cam rotational angle sensor 25 attached to it which generates an output signal which shows a rotational angle of the camshaft 55.

When the circular cams 58 fastened to the camshafts 54, 55 are rotated in opposite directions as shown by the arrows in FIG. 3(A) from the state shown in FIG. 3(A), the eccentric shafts 57 move in directions separating from each other, so the circular cams 56 rotate in the opposite directions from the circular cams 58 in the cam insertion holes 51. As a result, as shown in FIG. 3(B), the positions of the eccentric shafts 57 change from high positions to intermediate positions. Next, if the circular cams 58 are made to further rotate in the directions which are shown by the arrows, as shown in FIG. 3(C), the eccentric shafts 57 become the lowest positions.

Note that, FIG. 3(A), FIG. 3(B), and FIG. 3(C) show the positional relationships among the centers "a" of the circular cams 58, the centers "b" of the eccentric shafts 5, and the centers "c" of the circular cams 56 in the respective states.

As will be understood from a comparison of FIG. 3(A) and FIG. 3(C), the relative positions of the crankcase 1 and cylinder block 2 are determined by the distance between the centers "a" of the circular cams 58 and the centers "c" of the circular cams 56. The larger the distance between the centers "a" of the circular cams 58 and the centers "c" of the circular cams 56, the further the cylinder block 2 from the crankcase 1. That is, the variable compression ratio mechanism A uses a crank mechanism which uses rotating cams so as to change the relative positions of the crankcase 1 and the cylinder block 2. If the cylinder block 2 moves away from the crankcase 1, the volume of the combustion chamber 5 when the piston 4 is positioned at compression top dead center increases, therefore by making the camshafts 54, 55 rotate, the volume of the combustion chamber 5 when the piston 4 is positioned at compression top dead center can be changed.

As shown in FIG. 2, to make the camshafts 54, 55 rotate in opposite directions, the shaft of a drive motor 59 is provided with a pair of worm gears 61, 62 with opposite thread directions. Gears 63, 64 engaging with these worm gears 61, 62 are fastened to ends of the camshafts 54, 55. It is learned that if the drive motor 59 is driven in accordance with an output signal of the electronic control unit 30, the rotational force of the drive motor 59 is transmitted through the worms 61, 62 and the worm wheels 63, 64 to the camshafts 54, 55 and, therefore, the worm 61 and the worm wheel 63 and the worm 62 and the worm wheel 64 form transmission mechanisms 65, 66 for transmitting the rotational force of the drive motor 59 to the corresponding camshafts 54, 55. In the embodiment which is shown in FIG. 2, by driving the drive motor 59, the volume of the combustion chamber 5 when the piston 4 is positioned at compression top dead center is made to change over a broad range.

Figure 4:
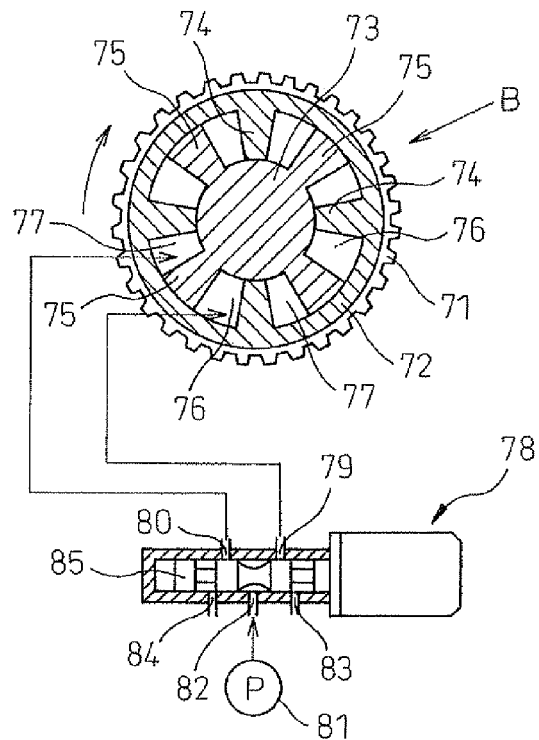
FIG. 4 is a view of a variable valve timing mechanism.

On the other hand, FIG. 4 shows a variable valve timing mechanism B attached to a camshaft 70 for driving the intake valve 7 in FIG. 1. Referring to FIG. 4, this variable valve timing mechanism B is provided with a timing pulley 71 made to rotate by an engine crankshaft through a timing belt in the arrow direction, a cylindrical housing 72 rotating together with the timing pulley 71, a shaft 73 able to rotate together with a camshaft 70 and rotate relative to the cylindrical housing 72, a plurality of partitions 74 extending from an inside circumference of the cylindrical housing 72 to an outside circumference of the shaft 73, and vanes 75 extending between the partitions 74 from the outside circumference of the shaft 73 to the inside circumference of the cylindrical housing 72, and advancing use hydraulic chambers 76 and retarding use hydraulic chambers 77 are formed at the two sides of the vanes 75.

The feed of working oil to the hydraulic chambers 76, 77 is controlled by a working oil feed control valve 78. This working oil feed control valve 78 is provided with hydraulic ports 79, 80 connected to hydraulic chambers 76, 77, a feed port 82 for working oil discharged from a hydraulic pump 81, a pair of drain ports 83, 84, and a spool valve 85 for controlling connection and disconnection of the ports 79, 80, 82, 83, 84.

To advance the phase of the cams of the intake valve drive-use camshaft 70, in FIG. 4, the spool valve 85 is made to move rightward, working oil fed from the feed port 82 is fed through the hydraulic port 79 to the advancing use hydraulic chambers 76, and working oil in the retarding use hydraulic chambers 77 is drained from the drain port 84. At this time, the shaft 73 is made to rotate relative to the cylindrical housing 72 in the arrow direction.

As opposed to this, when retarding the phase of the cam of the intake valve drive-use camshaft 70, in FIG. 4, the spool valve 85 is made to move leftward, working oil which is fed from the feed port 82 is fed through the hydraulic port 80 to the retarding use hydraulic chambers 77, and working oil in the advancing use hydraulic chambers 76 is drained from the drain port 83. At this time, the shaft 73 is made to rotate relative to the cylindrical housing 72 in the direction opposite to the arrows.

When the shaft 73 is made to rotate relative to the cylindrical housing 72, if the spool valve 85 is returned to the neutral position shown in FIG. 4, the operation for relative rotation of the shaft 73 is ended, and the shaft 73 is held at the relative rotational position at that time. Therefore, it is possible to use the variable valve timing mechanism B so as to advance or retard the phase of the cam of the intake valve drive-use camshaft 70 by exactly the desired amount.

Figure 5:
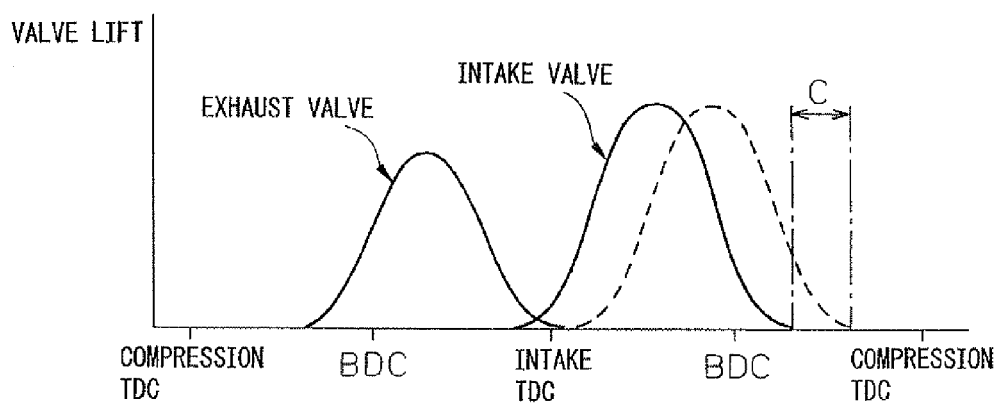
FIG. 5 is a view showing the amounts of lift of the intake valve and exhaust valve.

In FIG. 5, the solid line shows the time when the phase of the cam of the intake valve drive-use camshaft 70 is advanced the most by the variable valve timing mechanism B, while the broken line shows the time when the phase of the cam of the intake valve drive-use camshaft 70 is retarded the most. Therefore, the opening period of the intake valve 7 can be freely set between the range which is shown by the solid line and the range which is shown by the broken line in FIG. 5. Therefore, the closing timing of the intake valve 7 can also be set to any crank angle in the range which is shown by the arrow C in FIG. 5.

The variable valve timing mechanism B which is shown in FIG. 1 and FIG. 4 shows one example. For example, a variable valve timing mechanism which maintains the opening timing of the intake valve constant while enabling only the closing timing of the intake valve to be changed or other various types of variable valve timing mechanisms etc. can be used.

Next, the meaning of the terms used in the present application will be explained with reference to FIG. 6. Note that FIG. 6(A), FIG. 6(B), and FIG. 6(C) show for explanatory purposes an engine with a volume of the combustion chambers of 50 ml and a stroke volume of the piston of 500 ml. In these FIG. 6(A), FIG. 6(B), and FIG. 6(C), the combustion chamber volume shows the volume of the combustion chamber when the piston is at compression top dead center.

FIG. 6(A) explains the mechanical compression ratio. The "mechanical compression ratio" is a value which is determined mechanically from the stroke volume of a piston at the time of a compression stroke and the combustion chamber volume. This mechanical compression ratio is expressed by (combustion chamber volume+stroke volume)/combustion chamber volume. In the example shown in FIG. 6(A), this mechanical compression ratio becomes (50 ml+500 ml)/50 ml=11.

FIG. 6(B) explains the actual combustion ratio. This "actual combustion ratio" is a value which is determined from the actual stroke volume of a piston from when the compression action is actually started to when the piston reaches top dead center and the combustion chamber volume. This actual combustion ratio is expressed by (combustion chamber volume+actual stroke volume)/combustion chamber volume. That is, as shown in FIG. 6(B), even if the piston starts to rise in the compression stroke, no compression action is performed while the intake valve is opened. The actual compression action is started after the intake valve closes. Therefore, the actual combustion ratio is expressed as follows using the actual stroke volume. In the example shown in FIG. 6(B), the actual combustion ratio becomes (50 ml+450 ml)/50 ml=10.

FIG. 6(C) explains the expansion ratio. The "expansion ratio" is a value which is determined from the stroke volume of a piston at the time of an expansion stroke and the combustion chamber volume. This expansion ratio is expressed by the (combustion chamber volume+stroke volume)/combustion chamber volume. In the example shown in FIG. 6(C), this expansion ratio becomes (50 ml+500 ml)/50 ml=11.

Next, the superhigh expansion ratio cycle which is used in the present invention will be explained with reference to FIG. 7 and FIG. 8. Note that FIG. 7 shows the relationship between a theoretical heat efficiency and the expansion ratio, while FIG. 8 shows a comparison between an ordinary cycle and superhigh expansion ratio cycle used selectively in accordance with the load in the present invention.

FIG. 8(A) shows the ordinary cycle when the intake valve closes near bottom dead center and the compression action by a piston is started from near substantially compression bottom dead center. In the example shown in this FIG. 8(A) as well, in the same way as the examples shown in FIG. 6(A), FIG. 6(B), and FIG. 6(C), the combustion chamber volume is made 50 ml, and the stroke volume of the piston is made 500 ml. As will be understood from FIG. 8(A), in an ordinary cycle, the mechanical compression ratio is (50 ml+500 ml)/50 ml=11, the actual combustion ratio is also about 11, and the expansion ratio also becomes (50 ml+500 ml)/50 ml=11. That is, in an ordinary internal combustion engine, the mechanical compression ratio, actual combustion ratio, and expansion ratio become substantially equal.

Figure 7:
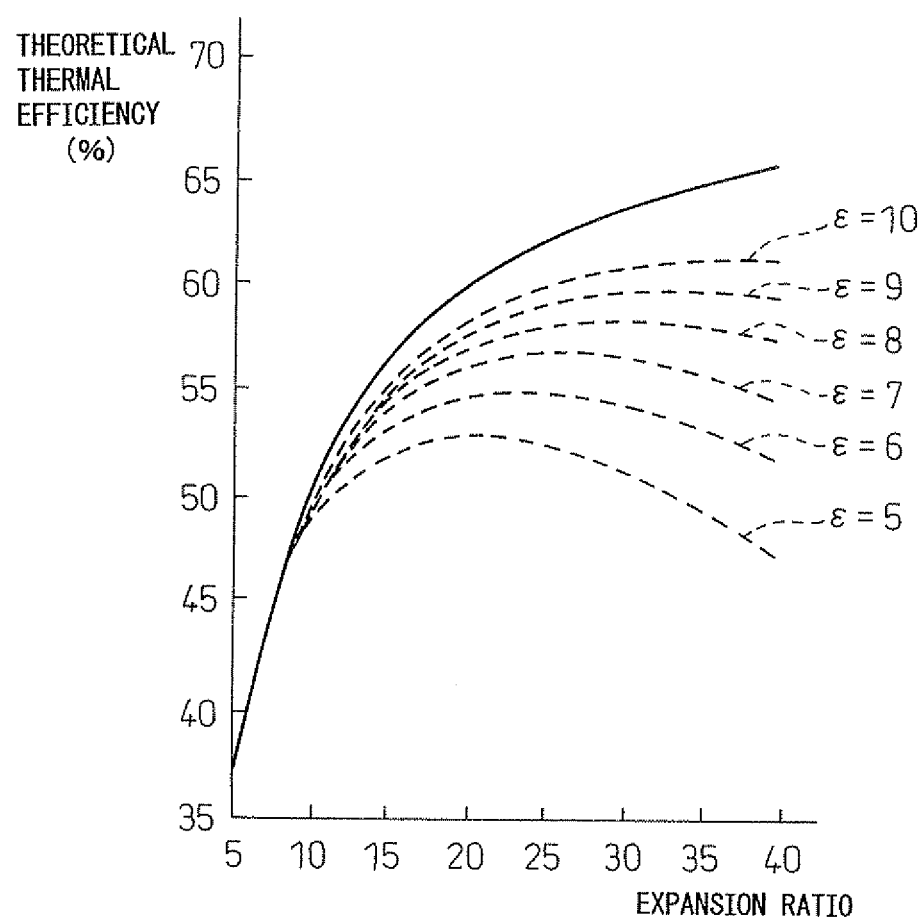
FIG. 7 is a view showing the relationship between a theoretical heat efficiency and expansion ratio.
Figure 8:
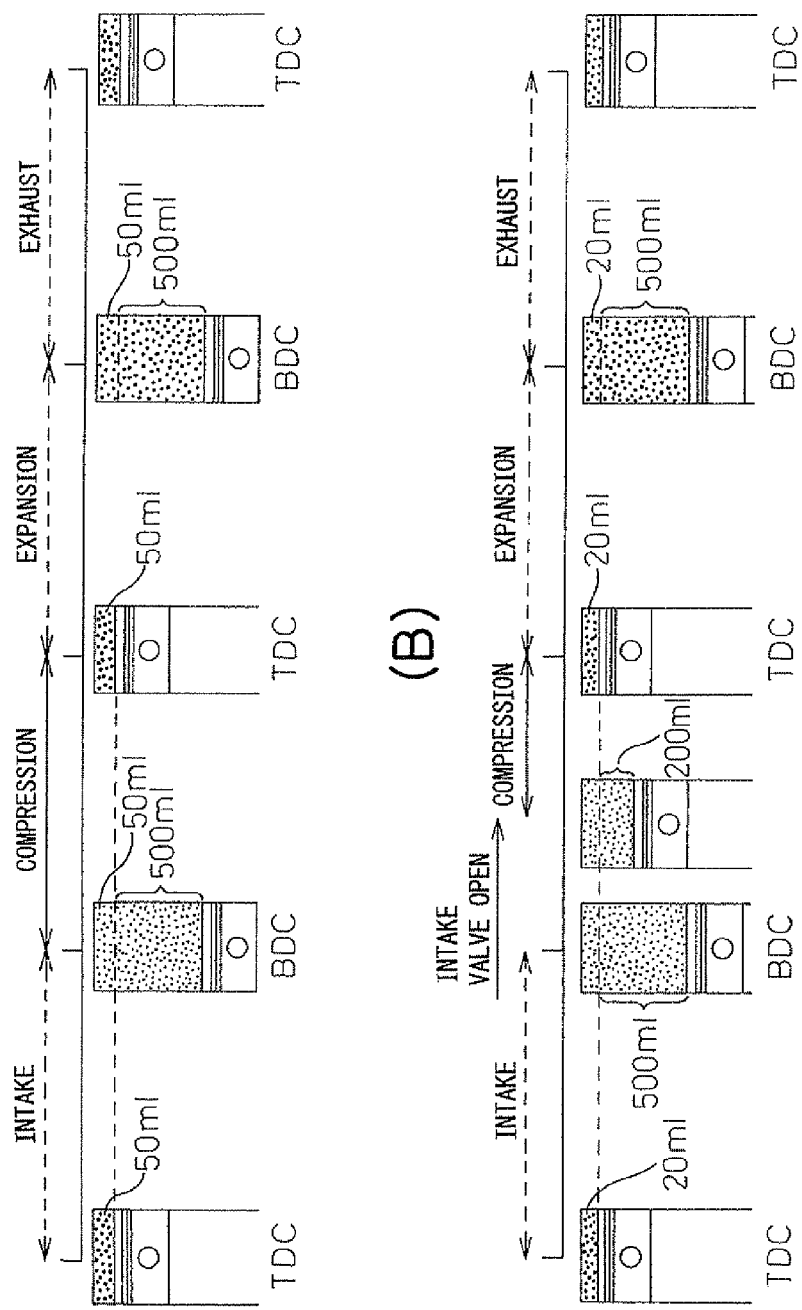
FIG. 8 are views for explaining an ordinary cycle and superhigh expansion ratio cycle.

The solid line in FIG. 7 shows the change in the theoretical heat efficiency in the case where the actual combustion ratio and expansion ratio are substantially equal, that is, in the ordinary cycle. In this case, it is learned that the larger the expansion ratio, that is, the higher the actual combustion ratio, the higher the theoretical heat efficiency. Therefore, in an ordinary cycle, to raise the theoretical heat efficiency, the actual combustion ratio should be made higher. However, due to the restrictions on the occurrence of knocking at the time of engine high load operation, the actual combustion ratio can only be raised even at the maximum to about 12, accordingly, in an ordinary cycle, the theoretical heat efficiency cannot be made sufficiently high.

On the other hand, under this situation, a method of raising the theoretical heat efficiency was studied while strictly differentiating between the mechanical compression ratio and actual combustion ratio and as a result it has been found that in the theoretical heat efficiency, the expansion ratio is dominant and that the theoretical heat efficiency is not affected much at all by the actual combustion ratio. That is, if raising the actual combustion ratio, the explosive force rises, but compression requires a large energy, accordingly even if raising the actual combustion ratio, the theoretical heat efficiency will not rise much at all.

As opposed to this, if increasing the expansion ratio, the longer the period during which a force acts pressing down a piston at the time of an expansion stroke, the longer the time that the piston gives a rotational force to the crankshaft. Therefore, the larger the expansion ratio is made, the higher the theoretical heat efficiency becomes. The broken line $\epsilon=10$ in FIG. 7 shows the theoretical heat efficiency in the case of fixing the actual combustion ratio at 10 and raising the expansion ratio in that state. In this way, it is learned that the amount of rise of the theoretical heat efficiency when raising the expansion ratio in the state where the actual combustion ratio $\epsilon$ is maintained at a low value and the amount of rise of the theoretical heat efficiency in the case where the actual combustion ratio is increased along with the expansion ratio as shown by the solid line of FIG. 7 will not differ that much.

If the actual combustion ratio is maintained at a low value in this way, knocking will not occur, therefore if raising the expansion ratio in the state where the actual combustion ratio is maintained at a low value, the occurrence of knocking can be prevented and the theoretical heat efficiency can be greatly raised. FIG. 8(B) shows an example of the case when using the variable compression ratio mechanism A and variable valve timing mechanism B to maintain the actual combustion ratio at a low value and raise the expansion ratio.

Referring to FIG. 8(B), in this example, the variable compression ratio mechanism A is used to lower the combustion chamber volume from 50 ml to 20 ml. On the other hand, the variable valve timing mechanism B is used to retard the closing timing of the intake valve until the actual stroke volume of the piston changes from 500 ml to 200 ml. As a result, in this example, the actual combustion ratio becomes (20 ml+200 ml)/20 ml=11 and the expansion ratio becomes (20 ml+500 ml)/20 ml=26. In the ordinary cycle shown in FIG. 8(A), as explained above, the actual combustion ratio is about 11 and the expansion ratio is 11. Compared with this case, in the case shown in FIG. 8(B), it is learned that only the expansion ratio is raised to 26. This is the reason why it called the "superhigh expansion ratio cycle".

Generally speaking, in an internal combustion engine, the lower the engine load, the worse the thermal efficiency, therefore to improve the thermal efficiency at the time of vehicle operation, that is, to improve the fuel efficiency, it becomes necessary to improve the thermal efficiency at the time of engine low load operation. On the other hand, in the superhigh expansion ratio cycle shown in FIG. 8(B), the actual stroke volume of the piston at the time of the compression stroke is made smaller, so the amount of intake air which can be sucked into the combustion chamber 5 becomes smaller, therefore this superhigh expansion ratio cycle can only be employed when the engine load is relatively low. Therefore, in the present invention, at the time of engine low load operation, the superhigh expansion ratio cycle shown in FIG. 8(B) is used, while at the time of engine high load operation, the ordinary cycle shown in FIG. 8(A) is used.

Next, the operational control as a whole will be explained with reference to FIG. 9.

Figure 9:
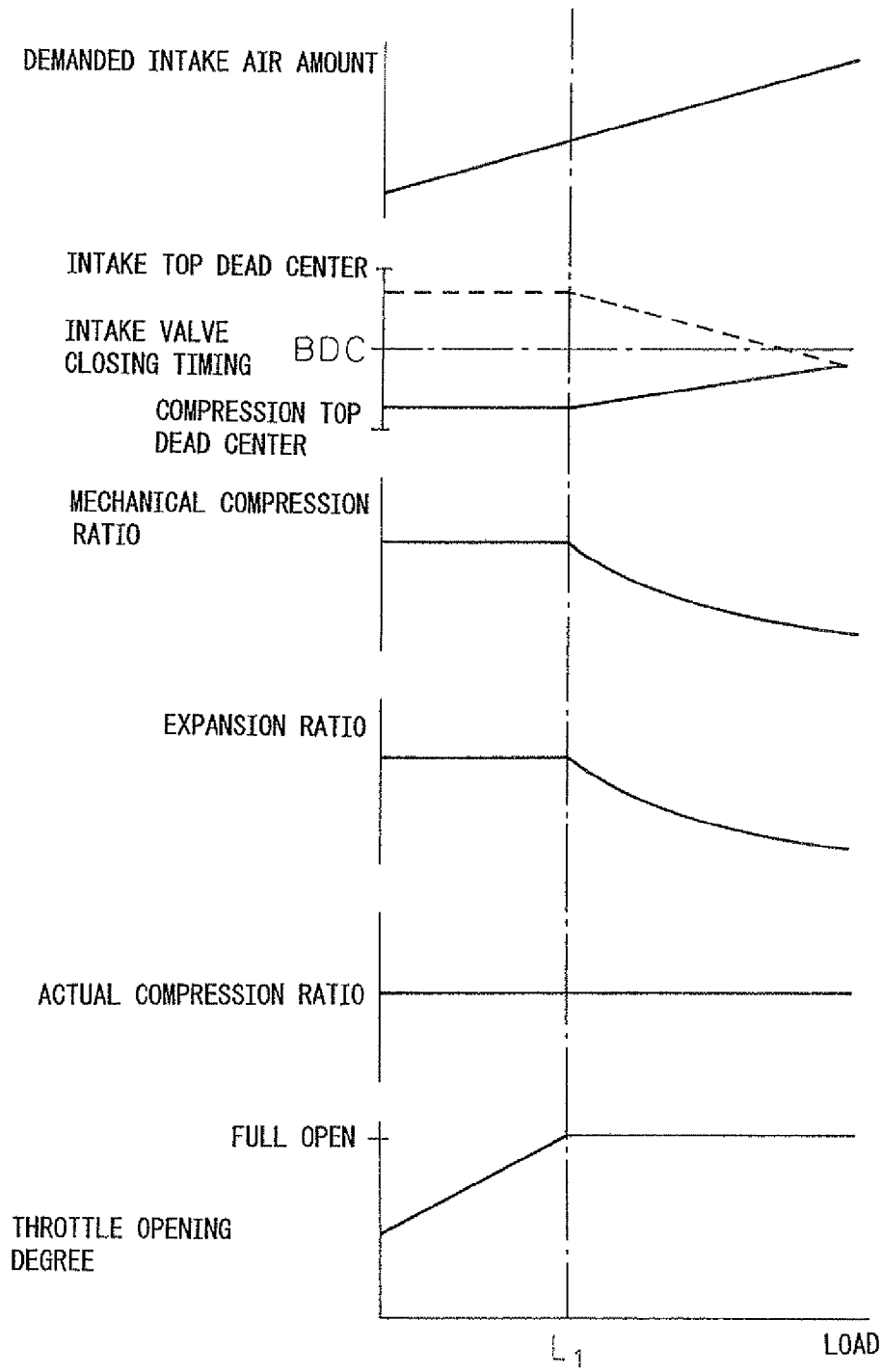
FIG. 9 is a view showing the changes in mechanical compression ratio etc. in accordance with the engine load.

FIG. 9 shows the changes in the amount of intake air, closing timing of the intake valve, mechanical compression ratio, expansion ratio, actual combustion ratio, and opening degree of the throttle valve 17 along with the engine load at a certain engine speed. Note that FIG. 9 shows the case where an average air-fuel ratio in the combustion chamber 5 is feedback controlled to the stoichiometric air-fuel ratio based on the output signal of the air-fuel ratio sensor 21 so that the three-way catalyst in the catalytic converter 20 can simultaneously reduce the unburned HC, CO, and $NO_x$ in the exhaust gas.

Now, as explained above, at the time of engine high load operation, the ordinary cycle shown in FIG. 8(A) is executed. Therefore, as shown in FIG. 9, at this time, the mechanical compression ratio is made low, so the expansion ratio becomes low and, as shown by the solid line in FIG. 9, the closing timing of the intake valve 7 is advanced as shown by the solid line in FIG. 5. Further, at this time, the amount of intake air is large. At this time, the opening degree of the throttle valve 17 is maintained full open, so the pumping loss becomes zero.

On the other hand, if, as shown in FIG. 9 by the solid line, the engine load becomes lower, along with this, the closing timing of the intake valve 7 is retarded so as to reduce the amount of intake air. Further, at this time, as shown in FIG. 9, the mechanical compression ratio is increased as the engine load becomes lower so that the actual combustion ratio is held substantially constant. Therefore, as the engine load becomes lower, the expansion ratio is also increased. Note that at this time as well, the throttle valve 17 is held at the full open state, therefore the amount of intake air which is fed to the combustion chamber 5 is controlled not by the throttle valve 17 but by changing the closing timing of the intake valve 7.

In this way, when the engine load becomes lower from the engine high load operating state, the mechanical compression ratio is made to increase as the amount of intake air is reduced under a substantially constant actual combustion ratio. That is, the volume of the combustion chamber 5 when the piston 4 reaches compression top dead center is made to decrease proportionally to the reduction in the amount of intake air. Therefore, the volume of the combustion chamber 5 when the piston 4 reaches compression top dead center changes proportionally to the amount of intake air. Note that at this time, in the example which is shown in FIG. 9, the air-fuel ratio in the combustion chamber 5 becomes the stoichiometric air-fuel ratio, so the volume of the combustion chamber 5 when the piston 4 reaches compression top dead center changes proportionally to the amount of fuel.

If the engine load becomes further lower, the mechanical compression ratio is further made to increase. When the engine load falls to the medium load $L_1$ somewhat near low load, the mechanical compression ratio reaches a limit mechanical compression ratio which forms the structural limit of the combustion chamber 5. In the region of a load lower than the engine load $L_1$ when the mechanical compression ratio reaches the limit mechanical compression ratio, the mechanical compression ratio is held at the limit mechanical compression ratio. Therefore at the time of engine medium load operation at the low load side and at the time of engine low load operation, that is, at the engine low load operation side, the mechanical compression ratio becomes maximum, and the expansion ratio also becomes maximum. Putting this another way, in the present invention, so as to obtain the maximum expansion ratio at the time of engine low load operation, the mechanical compression ratio is made maximum.

On the other hand, in the embodiment which is shown in FIG. 9, if the engine load falls to $L_1$, the closing timing of the intake valve 7 becomes the limit closing timing enabling control of the amount of intake air which is fed to the combustion chamber 5. If the closing timing of the intake valve 7 reaches the limit closing timing, in the region of a load lower than the engine load $L_1$ when the closing timing of the intake valve 7 reaches the limit closing timing, the closing timing of the intake valve 7 is held at the limit closing timing.

If the closing timing of the intake valve 7 is held at the limit closing timing, the amount of intake air can no longer be controlled by the change of the closing timing of the intake valve 7. In the embodiment shown in FIG. 9, at this time, that is, in the region of a load lower than the engine load $L_1$ when the closing timing of the intake valve 7 reaches the limit closing timing, the throttle valve 17 is used to control the amount of intake air which is fed to the combustion chamber 5 and the opening degree of the throttle valve 17 is made smaller the lower the engine load becomes.

On the other hand, as shown in FIG. 9 by the broken line, by advancing the closing timing of the intake valve 7 as the engine load becomes lower, it is also possible to control the intake air amount without depending on the throttle valve 17. Therefore, if expressed so as to cover both the case which is shown by the solid line and the case which is shown by the broken line in FIG. 9, in this embodiment according to the present invention, as the engine load becomes lower, the closing timing of the intake valve 7 is made to move in the direction away from intake bottom dead center BDC until the limit closing timing $L_1$ at which the intake air amount which is fed into the combustion chamber can be controlled. In this way, the intake air amount can be controlled by changing the closing timing of the intake valve 7 as shown in FIG. 9 by the solid line and can be controlled by changing it as shown by the broken line as well, but below, for the present invention, the case of changing the closing timing of the intake valve 7 as shown in FIG. 9 by the solid line will be explained as an example.

In this regard, as explained before, in the superhigh expansion ratio cycle which is shown in FIG. 8(B), the expansion ratio is made 26. The higher this expansion ratio, the better, but as will be understood from FIG. 7, even with the practically usable lower limit actual compression ratio $\epsilon=5$, if 20 or more, a considerably high theoretical heat efficiency can be obtained. Therefore, in the present invention, the variable compression ratio mechanism A is formed so that the expansion ratio becomes 20 or more.

Next, while referring to FIG. 10 to FIG. 12, the no-entry regions and the reference operating line for the mechanical compression ratio and the intake valve closing timing will be explained.

Figure 10:
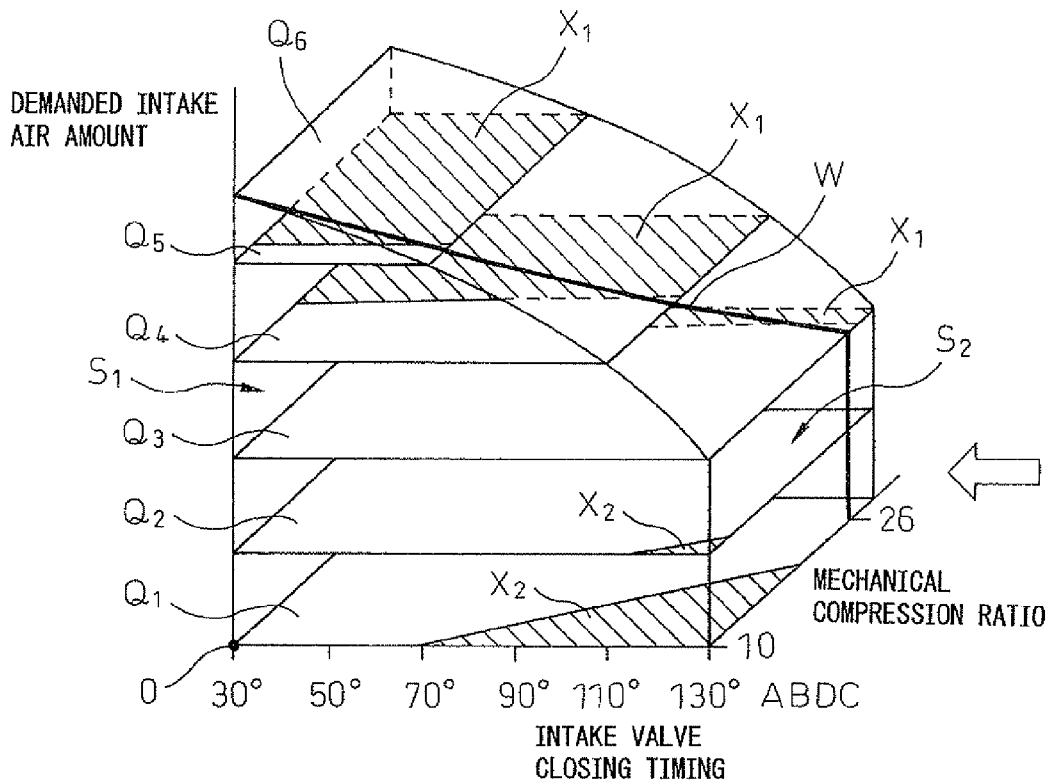
FIG. 10 is a view which shows non-entry regions and a target operating line.

FIG. 10 shows the intake air amount which is required for obtaining the demanded engine load, that is, the demanded intake air amount, the mechanical compression ratio, and the intake valve closing timing. Note that, in FIG. 10, the demanded intake air amount increases the further from the origin 0, while the mechanical compression ratio increases the further from the origin 0. Further, in FIG. 10, the intake valve closing timing is expressed by the crank angle after intake bottom dead center (ABDC). Therefore, the intake valve closing timing is retarded the more from the origin 0.

On the other hand, in FIG. 10, $Q_1$, $Q_2$, $Q_3$, $Q_4$, and $Q_5$ express equivalent intake air amount planes, while $Q_6$ expresses a throttle full open plane where the throttle valve 17 is full open. As will be understood from FIG. 10, this throttle full open plane $Q_6$ is comprised of an upwardly bulging curved surface. At the region below this throttle full open plane $Q_6$, the throttle opening degree becomes smaller the further downward.

The regions which are shown by the hatching in FIG. 10 show the no-entry regions in the equivalent intake air amount planes $Q_1$, $Q_2$, $Q_3$, $Q_4$, and $Q_5$. On the other hand, FIG. 11 shows what is seen from above FIG. 10, FIG. 12(A) shows the left side surface $S_1$ in FIG. 10 seen from the arrow direction, and FIG. 12(B) shows the right side surface $S_2$ in FIG. 10 seen from the arrow direction. The regions shown by hatching in these FIG. 11 and FIGS. 12(A) and 12(B) as well show no-entry regions.

From FIG. 10, FIG. 11, and FIGS. 12(A) and 12(B), it is learned that the no-entry regions extend three-dimensionally and, furthermore, the no-entry regions are comprised of two regions of a high load side region $X_1$ and a low load side region $X_2$. Note that, as will be understood from FIG. 10, FIG. 11, and FIGS. 12(A) and 12(B), the high load side no-entry region $X_1$ is formed at the side where the demanded intake air amount is large, the intake valve closing timing is at the advanced side, and the mechanical compression ratio is high, while the low load side no-entry region $X_2$ is formed at the side where the demanded intake air amount is small, the intake valve closing timing is at the retarded side, and the mechanical compression ratio is low.

Figure 11:
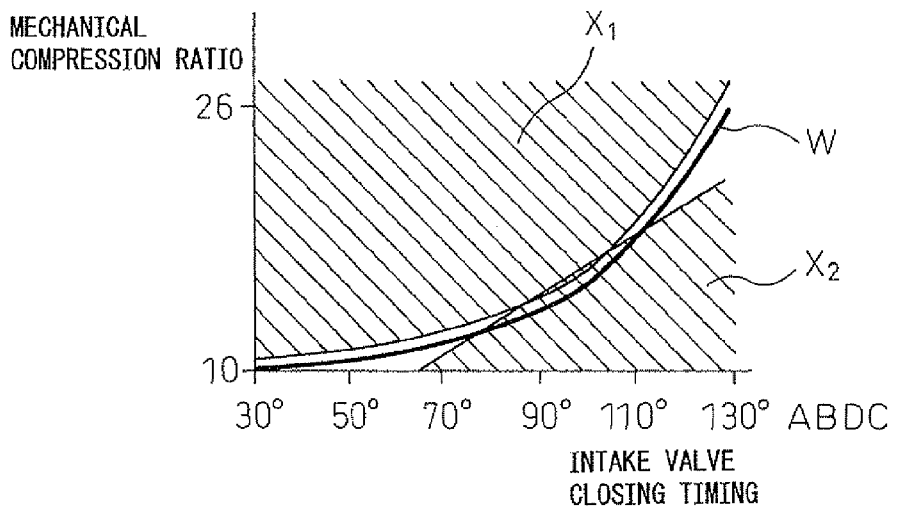
FIG. 11 is a view which shows non-entry regions and a target operating line.

Now then, FIG. 9 shows the relationships of the intake valve closing timing, the mechanical compression ratio, the actual compression ratio, and the throttle opening degree which give the minimum fuel consumption for the demanded intake air amount, and the line which satisfies these relationships is shown by the solid line W in FIG. 10 and FIG. 11. As will be understood from FIG. 10, this line W extends on the throttle full open plane $Q_6$ at the side of the greater intake air amount from the equivalent intake air amount plane $Q_3$ and extends on the right side surface $S_2$ at the side of the lesser intake air amount from the equivalent intake air amount plane $Q_3$. This equivalent intake air amount plane $Q_3$ corresponds to the load $L_1$ of FIG. 9.

That is, in FIG. 9, in the region of an engine load higher than $L_1$, the higher the engine load, that is, the more the demanded intake air amount is increased, the more the intake valve closing timing is advanced in the state where the throttle valve 17 is held full open. At this time, the mechanical compression ratio is made to fall so that the actual compression ratio becomes constant the more the demanded intake air amount is increased. At this time, the relationship between the mechanical compression ratio and the intake valve closing timing is expressed by the line W on the throttle wide open plane $Q_6$ of FIG. 10. That is, as shown in FIG. 10, at the side of the greater intake air amount from the equivalent intake air amount plane $Q_3$, the more the demanded intake air amount increases, the more the intake valve closing timing is advanced in the state with the throttle valve 17 held wide open. At this time, the mechanical compression ratio is made to fall as the demanded intake air amount is increased so that the actual compression ratio becomes constant.

On the other hand, in FIG. 9, in the region of an engine load lower than $L_1$, the mechanical compression ratio and the intake valve closing timing are held constant. The lower the engine load, that is, the more the demanded intake air amount is decreased, the more the opening degree of the throttle valve 17 is decreased. At this time, the relationship between the mechanical compression ratio and the intake valve closing timing is expressed by the line W on the right side surface $S_2$ of FIG. 10. That is, as shown in FIG. 10, at the side of the smaller intake air amount from the equivalent intake air amount plane $Q_3$, the mechanical compression ratio and the intake valve closing timing are held constant and the lower the engine load, that is, the more the demanded intake air amount is decreased, the more the opening degree of the throttle valve 17 is decreased.

In the present Description, the line which the mechanical compression ratio and the intake valve closing timing follow when the demanded intake air amount changes is called the "operating line". In particular, the line W which is shown in FIG. 10 is referred to as the "reference operating line". Note that, as explained before, the reference operating line shows the minimum fuel consumption operating line which gives the minimum fuel consumption.

As explained before, on the reference operating line W, the actual compression ratio is made constant. The actual compression ratio is unrelated to the opening degree of the throttle valve 17 and is determined by only the mechanical compression ratio and the intake valve closing timing. Accordingly, in FIG. 10, the actual compression ratio becomes the same ratio on the curved plane which passes through the reference operating line W and extends in the vertical direction. In this case, at the high mechanical compression ratio side from this curved plane, the actual compression ratio becomes higher, while at the low mechanical compression ratio side from this curved plane, the actual compression ratio becomes lower. That is, roughly speaking, the high load side no-entry region $X_1$ is positioned at the region of the higher actual compression ratio than the actual compression ratio on the reference operating line W, while the low load side no-entry region $X_2$ is positioned at the region of the lower actual compression ratio than the actual compression ratio on the reference operating line W.

Now then, if raising the actual compression ratio so as to improve the fuel consumption, knocking occurs. If retarding the ignition timing to prevent knocking, the combustion becomes unstable and torque fluctuations occur. The high load side no-entry region $X_1$ is an operating region where such torque fluctuations occur. Therefore, at the time of engine operation, it is necessary that the engine operating state not enter the operating region which causes such torque fluctuations. On the other hand, if the intake air amount is small and the actual compression ratio becomes low, the combustion will become difficult. If the opening degree of the throttle valve 17 becomes small and the compression end pressure becomes low, the combustion will deteriorate and torque fluctuations will occur. The low load side no-entry region $X_2$ is an operating region in which such torque fluctuations occur. Therefore, at the time of engine operation, it is necessary to prevent the engine operating state from entering this operating region as well.

On the other hand, the higher the actual compression ratio, the more the fuel efficiency is improved. Therefore, the minimum fuel consumption operating line which gives the optimum fuel efficiency without causing knocking or torque fluctuations extends at the outside of the high load side no-entry region $X_1$ along the outer edges of the high load side no-entry region $X_1$ as shown by W in FIG. 10 and FIG. 11. As explained before, in this embodiment according to the present invention, this minimum combustion operating line is made the reference operating line W. Basically, the mechanical compression ratio, the intake valve closing timing, and the opening degree of the throttle valve 17 are controlled in accordance with the demanded intake air amount so that the operating point which shows the combination of the mechanical compression ratio and the intake valve closing timing moves on this basic operating line W. Note that, the current operating point is constantly detected by the relative position sensor 22, valve timing sensor 23, and throttle opening degree sensor 24.

Next, while referring to FIG. 13 to FIG. 18, the case where the drive motor 59 of the variable compression ratio mechanism A breaks down during engine operation, that is, the case where the variable compression ratio mechanism A breaks down, will be explained. Note that, if the drive motor 59 breaks down, the drive motor 59 can no longer be used to control the mechanical compression ratio, therefore, in this embodiment according to the present invention, if the drive motor 59 breaks down, the supply of electric power to the drive motor 59 is stopped.

Figure 13:
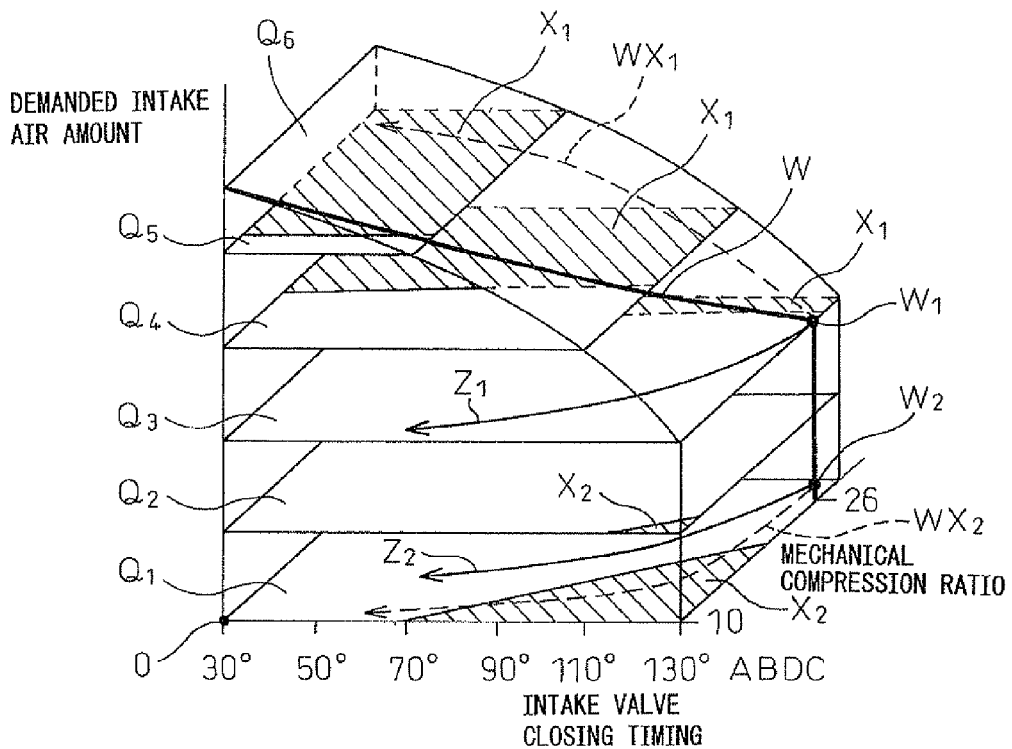
FIG. 13 is a view which shows various changes in the operating point when the variable compression ratio mechanism breaks down.
Figure 14:
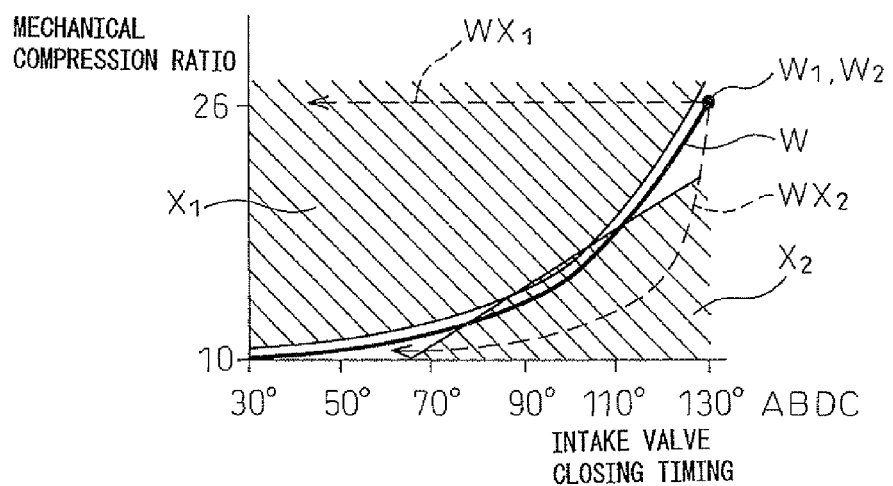
FIG. 14 is a view which shows various changes in the operating point when the variable compression ratio mechanism breaks down.

First, while referring to FIG. 13 and FIG. 14 which show views similar to FIG. 10 and FIG. 11, the problems and the preferable method of change of the mechanical compression ratio and the intake valve closing timing when the drive motor 59 breaks down will be explained. FIG. 13 and FIG. 14 show the two cases of the case where the drive motor 59 breaks down when the mechanical compression ratio and the intake valve closing timing are at the point $W_1$ on the reference operating line W and the case where the drive motor 59 breaks down when the mechanical compression ratio and the intake valve closing timing are at the point $W_2$ on the reference operating line W, that is, cases where the drive motor 49 breaks down when the mechanical compression ratio is high and the intake valve closing timing is retarded.

Now then, assuming that when the mechanical compression ratio and the intake valve closing timing are at the point $W_1$ on the reference operating line W, the drive motor 59 breaks down. At this time, if the mechanical compression ratio is attempted to be held at the high compression ratio which is shown by the point $W_1$, when the demanded intake air amount increases and thereby the intake valve closing timing is advanced, as shown in FIG. 13 and FIG. 14 by the broken line $WX_1$, the operating point which shows the combination of the mechanical compression ratio and the intake valve closing timing enters the high load side no-entry region $X_1$. As a result, abnormal combustion occurs.

As opposed to this, at this time, if the mechanical compression ratio and the intake valve closing timing are held in the states which are shown by the points $W_1$, $W_2$ so that this abnormal combustion does not occur, that is, if controlling the opening degree of the throttle valve 17 so that the operating point which shows the combination of the mechanical compression ratio and the intake valve closing timing moves on the basic operation line W between the point $W_1$ and the point $W_2$ in accordance with the demanded intake air amount, this time the engine startup ends up becoming difficult when restarting the engine.

That is, at the time of engine operation, even if the intake valve closing timing has been held at the points $W_1$, $W_2$, that is, even if the intake valve closing timing has been held in a retarded state, at the time of engine operation, inertia causes a certain degree of amount of intake air to be supplied into the combustion chamber 5 and therefore the engine operation to continue. However, at the time of engine startup, inertia does not act on the inflow of intake air, so the amount of intake air which is supplied to the combustion chamber 5 becomes about half of that at the time of engine operation. Therefore, if the intake valve closing timing is held in the retarded state, at the time of engine startup, the intake air amount becomes insufficient and therefore engine startup ends up becoming difficult. Therefore, when the drive motor 59 breaks down, the mechanical compression ratio and the intake valve closing timing cannot be held at the points $W_1$, $W_2$.

On the other hand, when the mechanical compression ratio and the intake valve closing timing are at the point $W_2$ on the reference operating line W, the drive motor 59 breaks down and, at this time, if the mechanical compression ratio is made to rapidly fall, as shown in FIG. 13 and FIG. 14 by the broken line $WX_2$, the operating point which shows the combination of the mechanical compression ratio and the intake valve closing timing enters the low load side no-entry region $X_2$. As a result, abnormal combustion occurs.

That is, as explained above, when the drive motor 59 breaks down, if the intake valve closing timing is held in the retarded state, when restarting the engine, engine startup becomes difficult. To facilitate engine startup when restarting the engine, when the drive motor 59 breaks down, it is necessary to make the intake valve closing timing advance. However, at this time, if just making the intake valve closing timing advance, the operating point which shows the combination of the mechanical compression ratio and the intake valve closing timing ends up entering the high load side no-entry region $X_1$. As opposed to this, if the mechanical compression ratio is made to rapidly fall so that the operating point which shows the combination of the mechanical compression ratio and the intake valve closing timing does not enter the high load side no-entry region $X_1$, this time the operating point which shows the combination of the mechanical compression ratio and the intake valve closing timing will end up entering the low load side no-entry region $X_2$.

That is, when the drive motor 59 breaks down, to advance the intake valve closing timing without the operating point which shows the combination of the mechanical compression ratio and the intake valve closing timing entering the different load side no-entry regions $X_1$, $X_2$, as shown in FIG. 13 by the solid lines $Z_1$, $Z_2$, it is necessary to make the mechanical compression ratio gradually fall along with the advance of the intake valve closing timing. That is, when the drive motor 59 breaks down, the mechanical compression ratio has to be made to drop so that the operating point which shows the mechanical compression ratio and the intake valve closing timing moves toward the demanded operating point which can easily secure restart of the engine without entering the no-entry regions $X_1$, $X_2$. The same control of the mechanical compression ratio is carried out also when the drive motor 59 breaks down when the mechanical compression ratio and the intake valve closing timing are not on the reference operating line W between the point $W_1$ and the point $W_2$.

Therefore, the basic feature of the present invention lies in the fact that a variable compression ratio mechanism A able to change the mechanical compression ratio and a variable valve timing mechanism B able to control the closing timing of the intake valve 7, no-entry regions $X_1$, $X_2$ for a combination of the mechanical compression ratio and the intake valve closing timing are set to prohibit entry of an operating point which shows the combination of the mechanical compression ratio and the intake valve closing timing into the no-entry regions $X_1$, $X_2$, and the mechanical compression ratio and the intake valve closing timing are made to change from a current operating point toward a low mechanical compression ratio side demanded operating point without entering the no-entry regions $X_1$, $X_2$ when the variable compression ratio mechanism breaks down.

Figure 15:
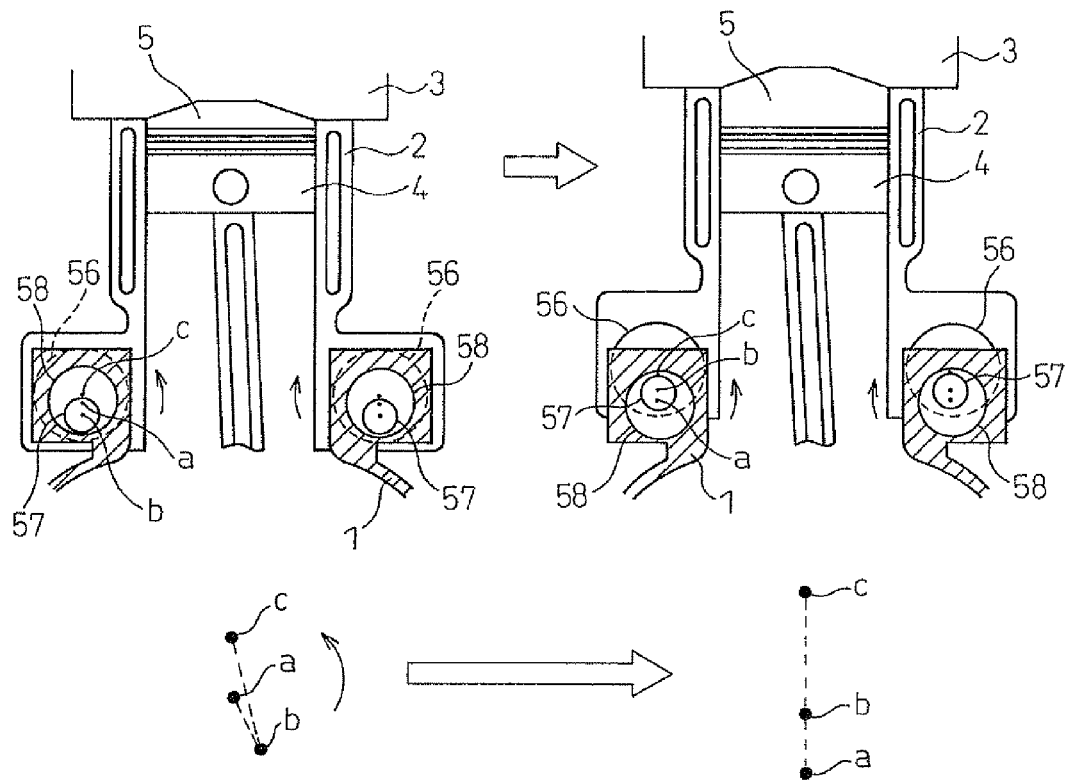
FIG. 15 is an illustrated side cross-sectional view of an internal combustion engine.

The left side of FIG. 15 shows a state the same as in FIG. 3(C), that is, the time when the mechanical compression ratio is made the maximum mechanical compression ratio, while the right side of FIG. 15 shows a state the same as in FIG. 3(A), that is, the time when the mechanical compression ratio is made the minimum mechanical compression ratio. In this embodiment according to the present invention, the variable compression ratio mechanism A is configured so that if the drive motor 59 breaks down, that is, when the variable compression ratio mechanism A breaks down, the combustion pressure causes to change from the state at the left side of FIG. 15 toward the state at the right side of FIG. 15. That is, it is configured so that the combustion pressure causes the mechanical compression ratio to gradually fall. As a result, when the variable compression ratio mechanism A breaks down and the mechanical compression ratio gradually falls, the mechanical compression ratio and the intake valve closing timing are made to change from the current operating point toward the demanded operating point without entering the no-entry regions $X_1$, $X_2$.

Now then, in this embodiment according to the present invention as explained above, as shown in FIG. 2, the variable compression ratio mechanism A is configured so as to make the relative positions of the crankcase 1 and the cylinder block 2 arranged above the crankcase 1 change by rotation of the camshafts 54, 55 so as to change the mechanical compression ratio. The variable compression ratio mechanism A is driven through the transmission mechanisms 65, 66 by the output of the drive motor 59, that is, the electric driven type actuator. The transmission mechanisms 65, 66 are respectively comprised of worm wheels 63, 64 which are attached to the camshafts 54, 55 and worms 61, 62 which engage with the worm wheels 63, 64 and are made to rotate by the actuator 59.

Figure 16:
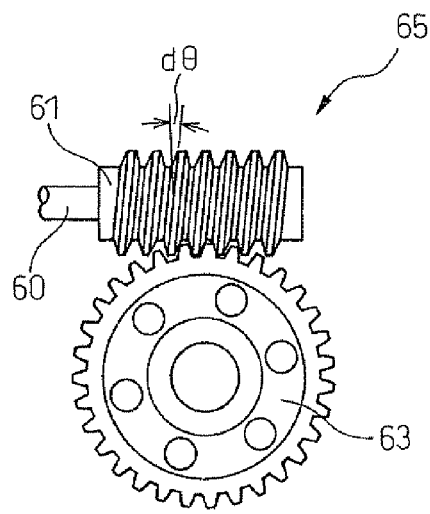
FIG. 16 is a view which shows a worm and a worm wheel.

FIG. 16 shows one transmission mechanism 65 among these transmission mechanisms 65, 66. In FIG. 16, dθ shows the advance angle of the worm 61. If this advance angle dθ is small, the worm 61 can be used to make the worm wheel 63 rotate, but the worm wheel 63 cannot be used to make the worm 61 rotate. At this time, the transmission mechanism 65 becomes irreversible. As opposed to this, if this advance angle dθ is large, the worm 61 can be used to make the worm wheel 63 rotate, the worm wheel 63 can be used to make the worm 61 rotate, and, at this time, the transmission mechanism 65 becomes reversible.

Figure 17:
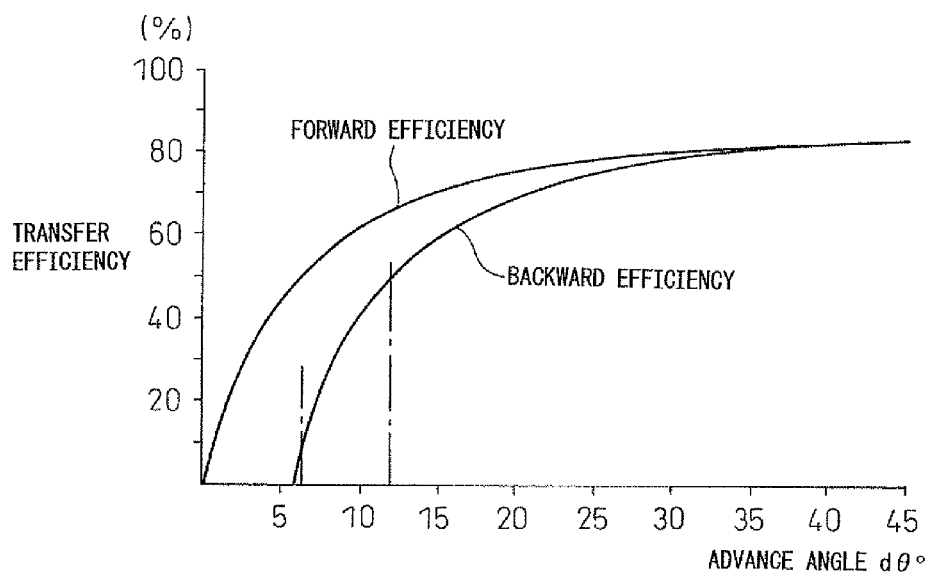
FIG. 17 is a view which shows a transfer efficiency.

FIG. 17 shows the relationship between the advance angle dθ and the transfer efficiency. In FIG. 17, a forward efficiency shows the transfer efficiency in the case where the worm 61 is used to make the worm wheel 63 rotate. As shown in FIG. 17, this forward efficiency becomes higher the larger the advance angle dθ. As opposed to this, in FIG. 17, the backward efficiency shows the transfer efficiency in the case where the worm wheel 63 is used to make the worm 61 rotate. As shown in FIG. 17, the backward efficiency is zero at an advance angle dθ of about 6° or less. When the advance angle dθ becomes about 6° or more, the backward efficiency becomes higher the larger advance angle dθ becomes. In this case, the backward efficiency being zero means that the worm wheel 63 cannot be used to make the worm 61 rotate.

Now then, when the engine is operating, the combustion pressure causes the cylinder block 2 to be constantly acted upon by a force in a direction lifting up the cylinder block 2. Therefore, the worm wheels 63, 64 of the transmission mechanisms 65, 66 are also acted on by a rotational force by which the cylinder block 2 rises. Therefore, when the engine is operating, if the drive motor 59 breaks down and the supply of electric power to the drive motor 59 is stopped, at this time as well, the worm wheels 63, 64 are acted on by rotational force in a direction by which the cylinder block 2 rises.

In this way, even if a rotational force acts on the worm wheels 63, 64, if the backward efficiency is zero, the worm wheels 63, 64 cannot rotate. Therefore, in this case, the mechanical compression ratio is maintained at the mechanical compression ratio of the time when the drive motor 59 has broken down. However, when the backward efficiency has a positive value, that is, when the transmission mechanisms 65, 66 are reversible, the worm wheels 63, 64 rotate in a direction whereby the cylinder block 2 is lifted up and therefore the mechanical compression ratio falls. Therefore, in the present invention, the backward efficiency is made a positive value so that the mechanical compression ratio will fall when the drive motor 59 breaks down.

That is, in this embodiment according to the present invention, the variable compression ratio mechanism A has a structure by which when the supply of electric power to the electric drive type actuator, that is, the drive motor 59, is stopped, the mechanical compression ratio is made to gradually fall by having the combustion pressure cause the transmission mechanisms 65, 66 to operate.

Figure 18:
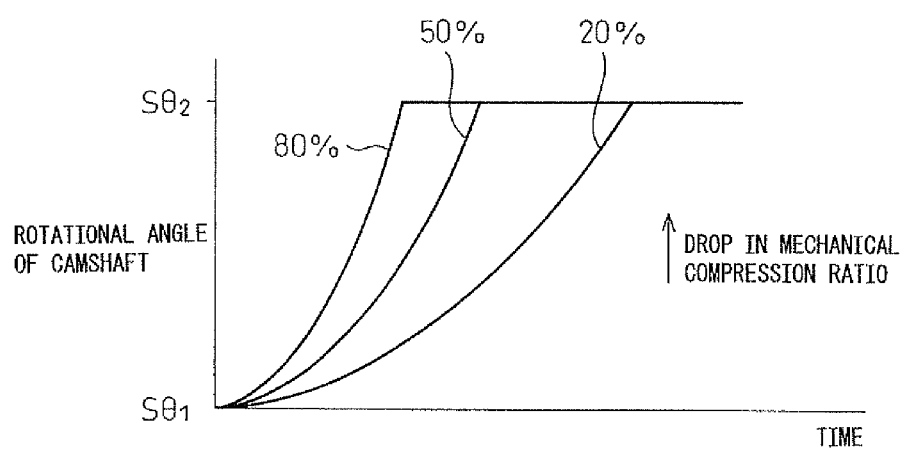
FIG. 18 is a view which shows a speed of change of a rotational angle of a camshaft.

FIG. 18 shows the state where, when the supply of electric power to the drive motor 59 is stopped in a certain engine operating state, the combustion pressure causes the camshafts 54, 55 to rotate from the rotational angle $S\theta_1$ to the rotational angle $S\theta_2$. Note that, FIG. 18 shows the state of rotation of the camshafts 54, 55 when the backward efficiency is 20%, 50%, and 80%. As will be understood from FIG. 18, the higher the backward efficiency, the shorter the time which is required for the camshafts 54, 55 to rotate from $S\theta_1$ to $S\theta_2$.

To make the intake valve closing timing advance, time is required. If, compared with this time, the speed of drop of the mechanical compression ratio is too fast, as shown in FIG. 13 by $WX_2$, the operating point which shows the combination of the mechanical compression ratio and the intake valve closing timing ends up entering the low load side no-entry region $X_2$. Seen from this point, the backward efficiency is preferably 50% or less. On the other hand, when the backward efficiency is 10% or less, the rotational force which is applied to the worm wheels 63, 64 does not exceed the static frictional force on the worms 61, 62, so the worm wheels 63, 64 do not rotate. To enable the worm wheels 63, 64 to rotate, the backward efficiency has to be made 10% or more.

Therefore, in this embodiment according to the present invention, the backward efficiency is made 10% to 50% in range. In other words, the transmission mechanisms 65, 66 are made ones with transmission efficiencies of 10 percent to 50 percent in range when the transmission mechanisms 65, 66 are made to operate by the combustion pressure. Note that, in FIG. 17, the advance angle dθ when the backward efficiency rises from zero changes depending on the value of the coefficient of dynamic friction between the worm wheels 63, 64 and the worms 61, 62. FIG. 17 shows the case where the coefficient of dynamic friction is 0.1. Note that, even if the coefficient of dynamic friction differs, the preferable range of backward efficiency does not change.

Figure 20:
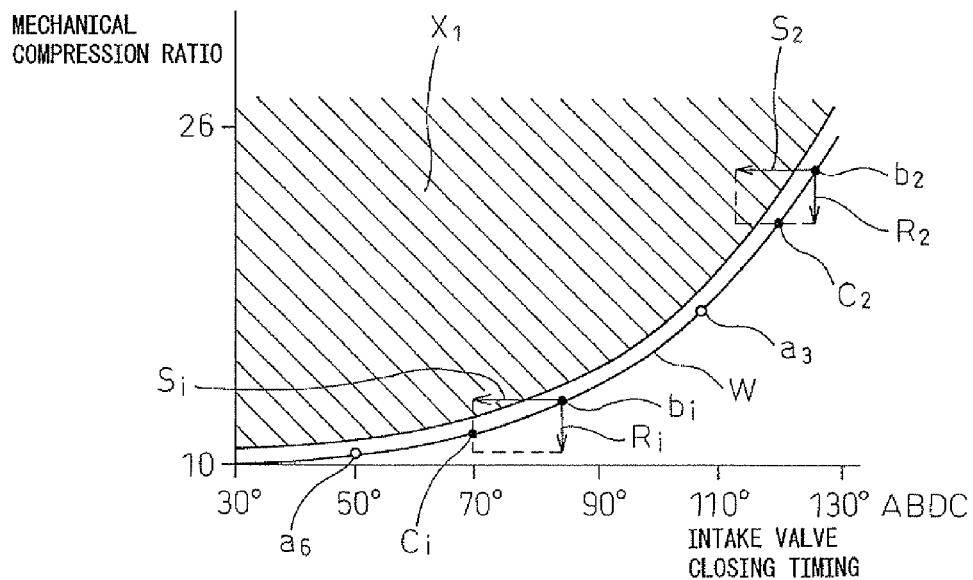
FIG. 20 is a view which shows a target operating point and an operating point.
Figure 21:
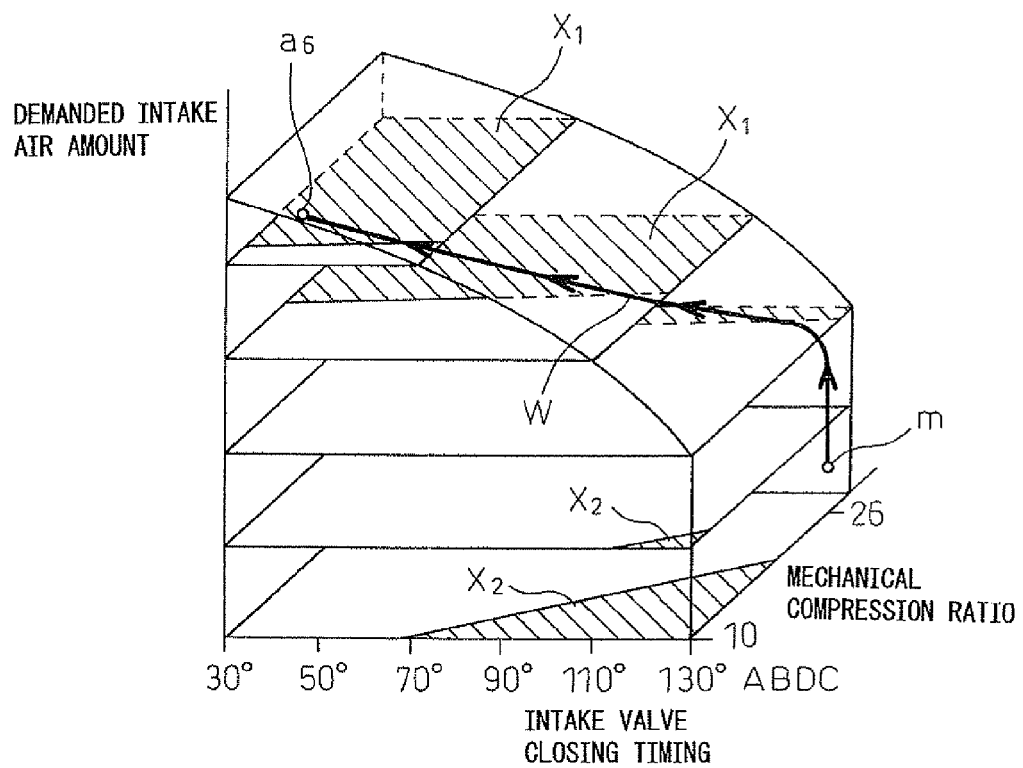
FIG. 21 is a view which shows changes in a mechanical compression ratio, intake valve closing timing, and throttle valve opening degree.

Next, the method of control of the mechanical compression ratio, the intake valve closing timing, and the opening degree of the throttle valve 17 according to the present invention will be explained from the basic method of control. This basic method of control is shown in FIG. 19 to FIG. 21.

Figure 19:
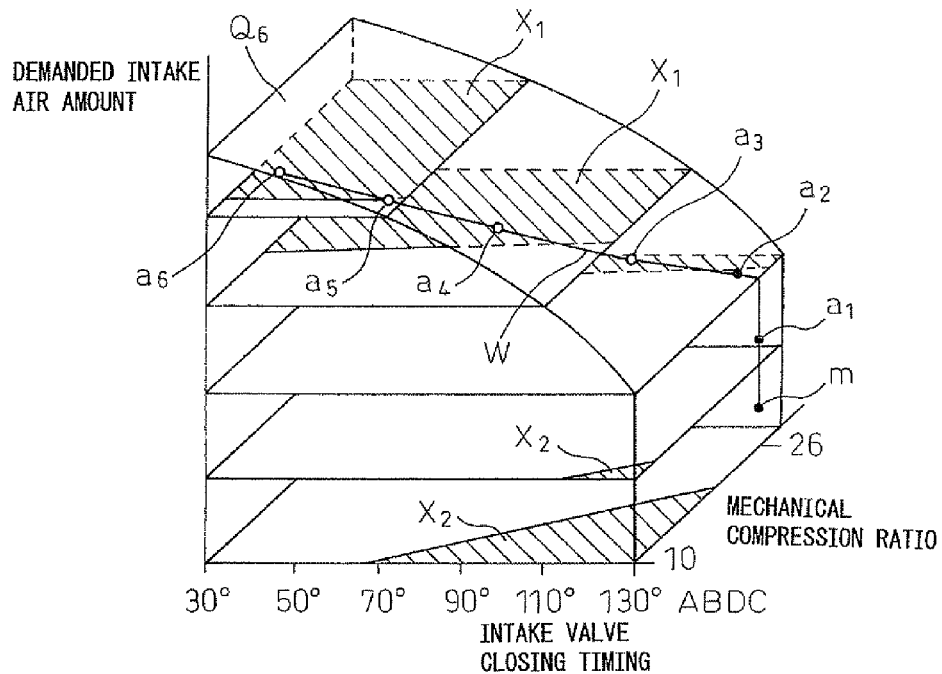
FIG. 19 is a view which shows a target operating point and an operating point.

That is, FIG. 19 shows the case where the demanded intake air amount is made to increase when the mechanical compression ratio and the intake valve closing timing are maintained at values at the point "m" on the reference operating line W. In this regard, in this embodiment according to the present invention, for example, the demanded intake air amount is calculated every predetermined time period, and the operating points on the reference operating line W which satisfy the amounts of demanded intake air calculated every predetermined time period are successively calculated. Examples of the operating points which satisfy the demanded intake air amount, that is, the demanded operating points, are shown in FIG. 19 by $a_1$, $a_2$, $a_3$, $a_4$, $a_5$, and $a_6$. That is, in this example, the demanded operating point which satisfies the demanded intake air amount which is first detected after the demanded intake air amount is made to increase is $a_1$, the demanded operating point which satisfies the demanded intake air amount which is detected next is $a_2$, and the demanded operating point which satisfies the demanded intake air amount which is detected next is $a_3$.

If the demanded operating point changes, the operating point which shows the mechanical compression ratio and the intake valve closing timing changes toward the new demanded operating point. That is, in the example which is shown in FIG. 19, if the demanded operating point is made $a_1$, the operating point which shows the mechanical compression ratio and the intake valve closing timing changes from the point "m" toward the point $a_1$, while if the demanded operating point is made $a_2$, the operating point which shows the mechanical compression ratio and the intake valve closing timing changes toward $a_2$. In this case, if the mechanical compression ratio and the intake valve closing timing reach the demanded operating point before the demanded operating point changes, the mechanical compression ratio and the intake valve closing timing change while tracking the change in the demanded operating point without any problem. However, if the mechanical compression ratio and the intake valve closing timing do not reach the demanded operating point before the demanded operating point changes, sometimes a problem is caused.

That is, in FIG. 19, when the mechanical compression ratio and the intake valve closing timing are at the point "m", when the demanded operating point becomes $a_1$, the mechanical compression ratio and the intake valve closing timing do not change. At this time, the opening degree of the throttle valve 17 for satisfying demanded intake air amount is made to increase. The response to change of the opening degree of the throttle valve 17 by the actuator 16 is extremely fast. Therefore, if the demanded operating point becomes $a_1$, the operating point which shows the mechanical compression ratio and the intake valve closing timing immediately shifts from the point "m" to the point $a_1$.

Next, if the demanded operating point becomes $a_2$, the mechanical compression ratio is made to fall just slightly and the intake valve closing timing is advanced just slightly while the throttle valve 17 is made to open full. At this time, the mechanical compression ratio and the intake valve closing timing reach near the demanded operating point $a_2$ around when the next demanded operating point $a_3$ is calculated. The mechanical compression ratio and the intake valve closing timing which are reached at this time are shown by the operating point $b_2$ at FIG. 20 which shows what is visible from above in FIG. 19.

If the demanded operating point $a_3$ is calculated, the mechanical compression ratio and the intake valve closing timing start moving from the operating point $b_2$ to the demanded operating point $a_3$. That is, in the state where the throttle valve 17 is full open, the mechanical compression ratio is made to fall and the intake valve closing timing is made to advance. In this regard, the response of the change of the mechanical compression ratio by the variable compression ratio mechanism A and the response of the change of the closing timing of the intake valve by the variable valve timing mechanism B are not that fast. In particular, the response of the change of the mechanical compression ratio by the variable compression ratio mechanism A is considerably slow. Therefore, when the speed of increase of the demanded intake air amount is fast, the demanded operating point and the operating point which shows the actual values of the mechanical compression ratio and the intake valve closing timing gradually move away from each other. For example, in FIG. 20, when the demanded operating point moves to $a_6$, a state arises in which the operating point which shows the actual values of the mechanical compression ratio and the intake valve closing timing continues to be positioned near $b_2$.

However, in such a case, if making the mechanical compression ratio and the intake valve closing timing move toward the demanded operating point without entering the no-entry region $X_1$ by feedback control, time is required until the mechanical compression ratio and the intake valve closing timing reach the demanded operating point. That is, in this case, when making the intake valve closing timing advance is likely to result in the operating point entering the no-entry region $X_1$, the advancing action of the intake valve closing timing is stopped, then the mechanical compression ratio is made to decrease by exactly a certain amount. If the mechanical compression ratio is made to decrease by exactly a certain amount, the intake valve closing timing is again advanced. If the operating point is likely to enter the no-entry region $X_1$, the advancing action of the intake valve closing timing is stopped. Below, this is repeated.

That is, if making the mechanical compression ratio and the intake valve closing timing move toward the demanded operating point by feedback control, the operating point which shows the mechanical compression ratio and the intake valve closing timing moves in a zigzag state along the outer edges of the no-entry region $X_1$, therefore time is taken for the mechanical compression ratio and the intake valve closing timing to reach the demanded operating point. As a result, good engine response is not obtained even with respect to change of the demanded intake air amount.

Therefore, in the present invention, when the demanded intake air amount changes, the target operating point which can be reached after a fixed time period when the mechanical compression ratio and the intake valve closing timing change from the current operating point toward a demanded operating point which satisfies the demanded intake air amount without entering the no-entry regions $X_1$, $X_2$ is calculated, and the mechanical compression ratio and the intake valve closing timing are made to change toward this target operating point.

Next, one embodiment of the present invention will be explained while referring to FIG. 20 which shows the throttle full open plane $Q_6$. As explained above, FIG. 20 shows the case where when the demanded operating point becomes $a_3$, the operating point which shows the mechanical compression ratio and the intake valve closing timing is $b_2$. In this case, the arrow $R_2$ expresses the mechanical compression ratio which can be reached in the predetermined fixed time when changing toward the demanded operating point $a_3$, while the arrow $S_2$ expresses the intake valve closing timing which can be reached in the predetermined fixed time when changing toward the demanded operating point $a_3$. Further, in FIG. 20, $c_2$ shows the target operating point which can be reached after the fixed time period when changing from the current operating point $b_2$ toward the demanded operating point $a_3$ which satisfies the demanded intake air amount without entering the no-entry region $X_1$.

As shown in FIG. 20, when the demanded intake air amount is made to increase and the operating point $b_2$ and the demanded operating point $a_3$ are on the throttle full open plane $Q_6$, this target operating point $c_2$ is positioned on the reference operating line W, in the example which is shown in FIG. 20, on the minimum fuel consumption operating line W. That is, in the example which is shown in FIG. 20, when the throttle valve 17 is maintained in the full open state, the target operating point is made to move outside of the no-entry region $X_1$ on the minimum fuel consumption operating line W which extends along the outer edge of the no-entry region $X_1$.

Further, in FIG. 20, when the demanded operating point is $a_6$, if assuming the operating point which shows the mechanical compression ratio and the intake valve closing timing was $b_1$, in this case as well, the target operating point is made the point $c_i$ on the reference operating line W. Note that, in FIG. 20, the arrow $R_i$ similarly expresses the mechanical compression ratio which can be reached after the fixed time period, while the arrow $S_i$ expresses the intake valve closing timing which can be reached after the fixed time period.

In this way, in the example which is shown in FIG. 20, when the operating point is $b_2$, if the target operating point $c_2$ is calculated, the operating point which shows the mechanical compression ratio and the intake valve closing timing reaches the target operating point $c_2$ after the fixed time period. At this time, the next new target operating point which can be reached after the fixed time period when changing from the current operating point $c_2$ toward a demanded operating point which satisfies the demanded intake air amount without entering the no-entry region $X_1$ is calculated, and the operating point reaches this new target operating point after the fixed time period. In this case, in this embodiment according to the present invention, the mechanical compression ratio, the intake valve closing timing, and the opening degree of the throttle valve 17 are made to reach the target operating point by PID (proportional integral derivative) control.

In this way, in the example which is shown in FIG. 20, the operating point which shows the mechanical compression ratio and the intake valve closing timing moves smoothly along the reference operating line W without slowing. That is, in FIG. 19, when the mechanical compression ratio and the intake valve closing timing are maintained at the point "m", if the demanded intake air amount is made to increase, as shown by the arrow in FIG. 21, the mechanical compression ratio and the intake valve closing timing are made to smoothly change along the reference operating line W without slowing. As a result, it is possible to secure good engine response for a change in the demanded intake air amount.

In this case, to further improve the response of the engine to the demanded intake air amount, the target operating points $c_2$, $c_i$ are preferably remoted as much as possible from their corresponding current operating points $b_2$, $b_i$. Therefore, in this embodiment according to the present invention, the target operating points $c_2$, $c_i$ are made the operating points which are the most remoted from the current operating points $b_2$, $b_i$ among the operating points which can be reached after the fixed time period without entering the no-entry region $X_1$ when changing from the corresponding current operating points $b_2$, $b_i$ toward the demanded operating points which satisfy the demanded intake air amounts.

That is, when the current operating point is $b_2$, the peak limit of the mechanical compression ratio from the operating point $b_2$ is made the target operating point $c_2$. For the intake valve closing timing, this target operating point $c_2$ becomes before the peak limit of the intake valve closing timing from the operating point $b_2$. Therefore, at this time, the mechanical compression ratio is made to fall by the possible maximum speed, while the intake valve closing timing is made to advance by a speed which is slower than the maximum possible speed. As opposed to this, when the current operating point is $b_i$, the peak limit of the intake valve closing timing from the operating point $b_i$ is made the target operating point $c_i$. For the mechanical compression ratio, this target operating point $c_i$ becomes before the peak limit of the intake valve closing timing from the operating point $b_i$. Therefore, at this time, the intake valve closing timing is advanced by the maximum possible speed, while the mechanical compression ratio is made to decrease by a speed slower than the maximum possible speed.

The possible maximum speed of change of the intake valve closing timing, that is, the value which can be reached after the fixed time period, is not affected much at all by the engine operating state. Therefore, the intake valve closing timing which can be reached after the fixed time period becomes constant regardless of the engine operating state. As opposed to this, the possible maximum speed of change of the mechanical compression ratio, that is, the value which can be reached after the fixed time period, is strongly affected by the engine operating state etc. Next, this will be explained with reference to FIG. 22 and FIG. 23.

Figure 22:
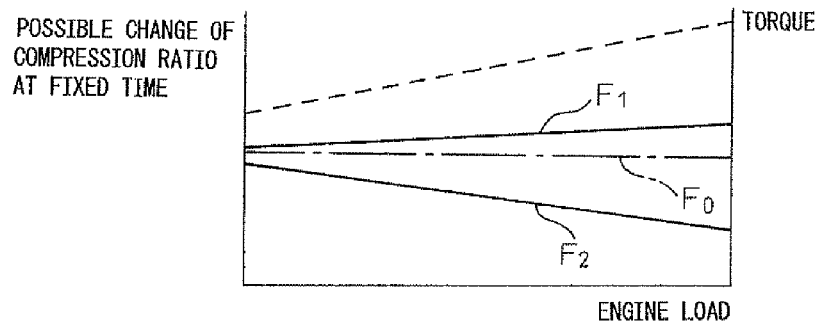
FIG. 22 is a view which shows an possible change of a mechanical compression ratio at a fixed time period.

FIG. 22 shows the relationship between the possible change of the mechanical compression ratio in the fixed time period, that is, the difference in compression ratio between the current mechanical compression ratio and the mechanical compression ratio which can be reached after the fixed time period, and the engine load. Note that, FIG. 22 shows the possible change of the compression ratio when the mechanical compression ratio is made a certain mechanical compression ratio. In FIG. 22, the dot and dash line $F_0$ shows the possible change of the compression ratio when the engine is stopped. Further, FIG. 22 shows by a broken line the torque which is applied by the combustion pressure to the variable compression ratio mechanism A. This torque acts in a direction pulling the cylinder block 2 away from the crankcase 1, that is, in a direction making the compression ratio fall. This torque, as shown by the broken line, becomes larger the higher the combustion pressure, that is, the higher the engine load.

In this way, this torque acts on the variable compression ratio mechanism A in a direction which causes the compression ratio to drop, so when making the mechanical compression ratio fall, the mechanical compression ratio easily falls and, therefore, in this case, the possible change of the compression ratio becomes larger. In FIG. 22, the solid line $F_1$ shows the possible change of the compression ratio in this case. The possible change of the compression ratio in this case becomes larger the higher the engine load. As opposed to this, this torque counters the increase in the mechanical compression ratio, so when making the mechanical compression ratio increase, compared with when making the mechanical compression ratio fall, the possible change of the compression ratio becomes smaller. In FIG. 22, the solid line $F_2$ shows the possible change of the compression ratio in the case of making the mechanical compression ratio increase. In this case, the possible change of the compression ratio becomes smaller the higher the engine load.

In one embodiment according to the present invention, the possible change of the compression ratio which serves as the reference as shown by $F_0$ in FIG. 22 is stored in advance. This reference possible change of the compression ratio is corrected by the relationships which are shown by $F_1$ and $F_2$ in FIG. 22, whereby the possible change of the compression ratio in accordance with the engine load is calculated. Next, the peak value of the mechanical compression ratio which can be reached after the fixed time period is calculated from this calculated possible change of the compression ratio. That is, in this embodiment, when the demanded intake air amount changes, the peak value of the mechanical compression ratio which can be reached after the fixed time period is changed in accordance with the engine load.

Figure 23:
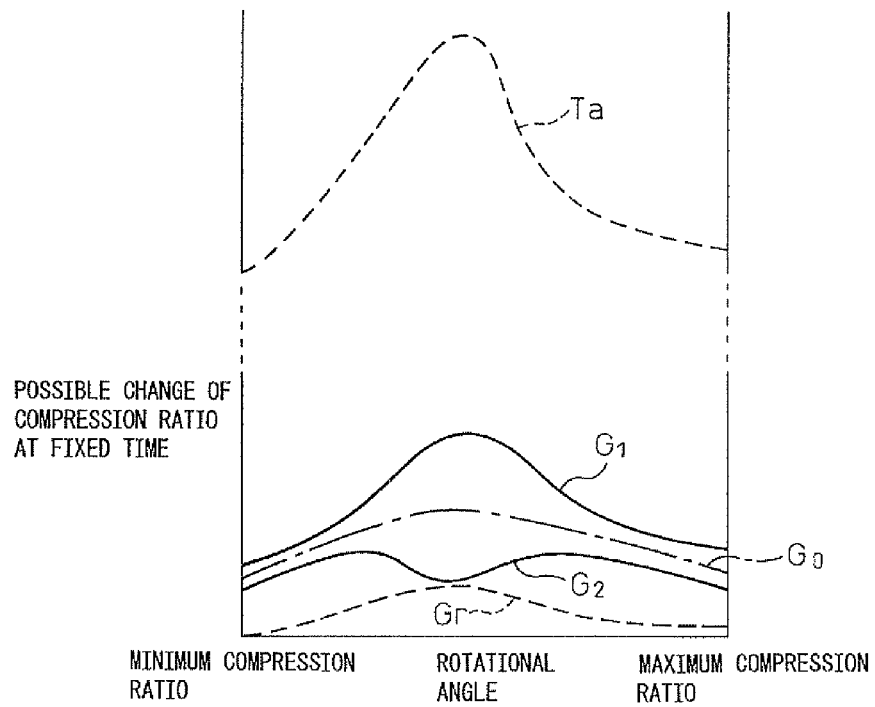
FIG. 23 is a view which shows an possible change of a mechanical compression ratio at a fixed time period.

FIG. 23 shows the relationship between a torque and the possible change of the mechanical compression ratio at the fixed time period and the rotational angles of the camshafts 54, 55, that is, the rotational angle of the circular cams 58. Note that, in FIG. 23, the left end of the abscissa shows the time of the lowest state of the mechanical compression ratio which is shown in FIG. 3(A), while in FIG. 23, the right end of the abscissa shows the time of the highest state of the mechanical compression ratio which is shown in FIG. 3(C). Further, FIG. 23 shows the possible change of the compression ratio when the engine load is made a certain load. In FIG. 23, the broken line Ta shows the torque which is applied by the combustion pressure to the variable compression ratio mechanism A.

Now then, in FIG. 23, the dot and dash line $G_0$ shows the possible change of the compression ratio when the engine operation is stopped. As will be understood from FIGS. 3(A), 3(B), and 3(C), when the mechanical compression ratio is intermediate, that is, at the time shown in FIG. 3(B), the amount of change of the compression ratio per unit rotational angle of the camshafts 54, 55 becomes the largest. Therefore, as shown by the dot and dash line $G_0$ of FIG. 23, when the mechanical compression ratio is intermediate, the possible change of compression ratio becomes maximum.

Further, as shown in FIG. 23 by the broken line Ta, the torque which is applied to the variable compression ratio mechanism A due to the combustion pressure becomes the highest at the time which is shown by FIG. 3(B), that is, at the time when the mechanical compression ratio is intermediate. On the other hand, in FIG. 23, the solid line $G_1$ shows the case of lowering the mechanical compression ratio, while the solid line $G_2$ shows the case of making the mechanical compression ratio increase. As shown in FIG. 23, the possible change of the compression ratio $G_1$ when making the mechanical compression ratio decrease becomes larger than the possible change of compression ratio $G_2$ when making the mechanical compression ratio increase. Further, when the mechanical compression ratio is intermediate, the torque based on the combustion pressure becomes the highest, so, at this time, the possible change of the compression ratio $G_1$ becomes higher and the possible change of the compression ratio $G_2$ falls.

In one embodiment according to the present invention, the possible change of the compression ratio which serves as the reference as shown by $G_0$ in FIG. 23 is stored in advance. This reference possible change of the compression ratio is corrected by the relationships which are shown by $G_1$ and $G_2$ in FIG. 23 whereby the possible change of the compression ratio in accordance with the rotational angles of the camshafts 54, 55 is calculated. Furthermore, this possible change of the compression ratio is corrected by the relationships which are shown in FIG. 22 by $F_1$ and $F_2$ so as to calculate the rotational angles of the camshafts 54, 55 and the possible change of the compression ratio in accordance with the engine load. Next, the peak value of the mechanical compression ratio which can be reached after the fixed time period is calculated from this calculated possible change of the compression ratio.

That is, in this embodiment, when the demanded intake air amount changes, the peak value of the mechanical compression ratio which can be reached after the fixed time period is made to change in accordance with the rotational angle of the rotating cam 58 and engine load.

Note that, FIG. 23 further shows, by the broken line Gr, the change in the compression ratio to the low compression ratio side in the fixed time period when the supply of electric power to the drive motor 59 is stopped. This compression ratio change Gr, as shown in FIG. 23, becomes higher as the torque Ta becomes higher. That is, this compression ratio change Gr becomes the highest at the time which is shown in FIG. 3(B), that is, when the mechanical compression ratio is intermediate. Furthermore, this compression ratio change Gr becomes larger the higher the engine load becomes. In this embodiment according to the present invention, this compression ratio change Gr is stored as a function of the engine load and the rotational angles of the camshafts 54, 55 in advance in the ROM 32. From this stored compression ratio change Gr, the peak value of the mechanical compression ratio reached after the fixed time is calculated.

Next, while referring to FIG. 24 to FIG. 39, the case where the demanded intake air amount is made to decrease will be explained. Note that, among FIG. 24 to FIG. 39, FIG. 24 and FIG. 25 show the case where the demanded intake air amount is made to slowly decrease, FIG. 26 to FIG. 33 show the case where the demanded intake air amount is made to decrease relatively fast, and FIG. 34 to FIG. 39 show the case where the demanded intake air amount is made to rapidly decrease. Note that, FIG. 24 to FIG. 39 show the case where the action of reduction of the demanded intake air amount is started when the operating point, which shows the combination of the mechanical compression ratio and the intake valve closing timing, is at the point "n" on the reference operating line W.

Figure 24:
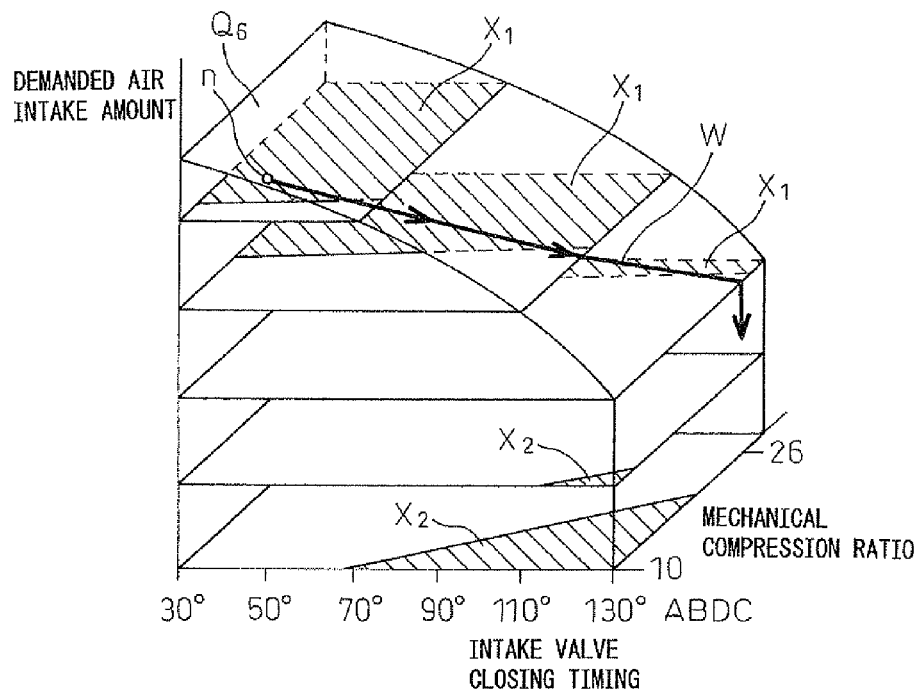
FIG. 24 is a view which shows changes in a mechanical compression ratio, intake valve closing timing, and throttle opening degree.

First, while referring to FIG. 24 and FIG. 25, the case where the demanded intake air amount is slowly made to decrease will be explained. Note that, FIG. 25 shows the full open plane $Q_6$ in the same way as FIG. 20.

Figure 25:
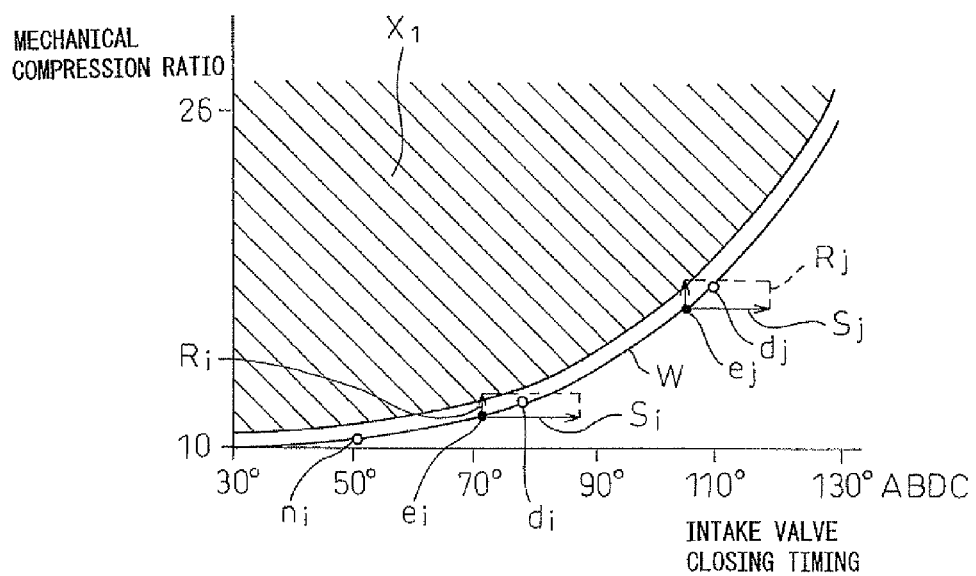
FIG. 25 is a view which shows a target operating point and an operating point.

FIG. 25 shows the relationship between the current operating point and the demanded operating point in this case. That is, in FIG. 25, the demanded operating point when the current operating point is $e_i$ is shown by $d_i$. At this time, the mechanical compression ratio which can be reached after the fixed time period is shown by $R_i$, and, at this time, the intake valve closing timing which can be reached after the fixed time period is shown by $S_i$. Furthermore, in FIG. 25, the demanded operating point when the current operating point is $e_j$ is shown by $d_j$. At this time, the mechanical compression ratio which can be reached after the fixed time period is shown by $R_j$, and, at this time, the intake valve closing timing which can be reached after the fixed time period is shown by $S_j$.

In this case, the demanded operating point $d_i$ is just before the peak limit of the mechanical compression ratio and just before the peak limit of the intake valve closing timing, so the demanded operating point $d_i$ becomes the target operating point. In the same way, the demanded operating point $d_j$ becomes just before the peak limit of the mechanical compression ratio and just before the peak limit of the intake valve closing timing, so the demanded operating point $d_j$ becomes the target operating point. Therefore, in this case, the operating point moves along the reference operating line W. That is, when the demanded intake air amount is slowly reduced, in the state where the throttle valve 17 is held full open, the intake valve closing timing is gradually retarded and the mechanical compression ratio is gradually increased so that the actual compression ratio becomes constant.

Next, while referring to FIG. 26 to FIG. 33, the case where the demanded intake air amount is made to decrease relatively fast will be explained. As explained above, in this embodiment according to the present invention, the demanded intake air amount is calculated for example for each predetermined time period. The demanded operating points on the reference operating line W which satisfy the successively calculated demanded amounts of intake air are shown in FIG. 26 by $d_1$, $d_2$, $d_3$, $d_4$, and $d_5$.

Figure 26:
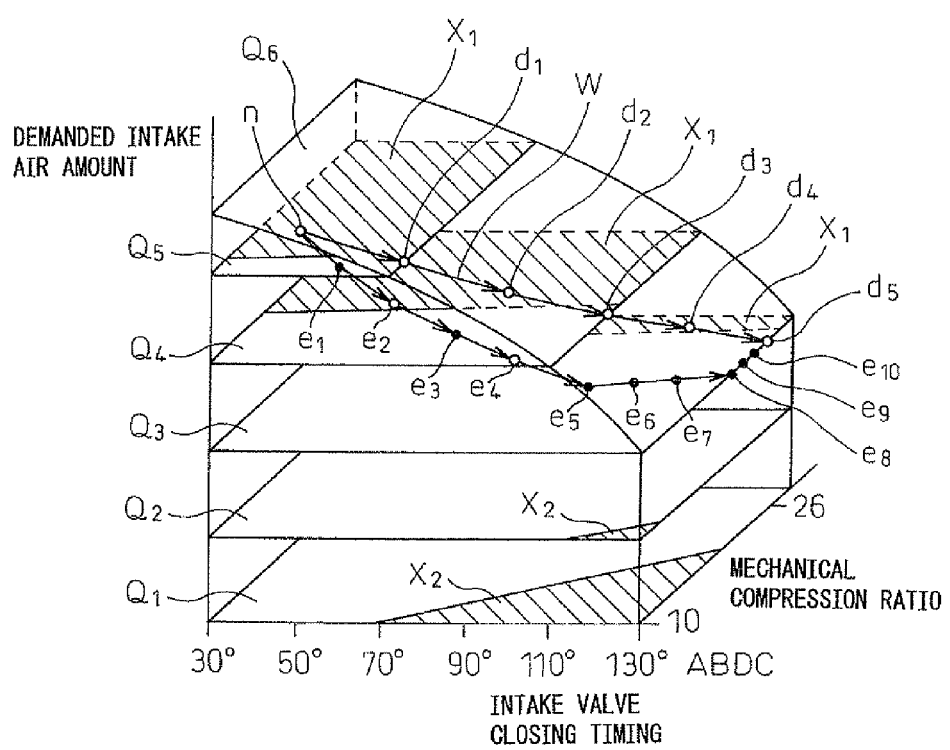
FIG. 26 is a view which shows a target operating point and an operating point.

Note that, to enable the control according to the present invention to be easily understood, FIG. 26 shows the case where the demanded intake air amount at the demanded operating point $d_1$ is $Q_5$, the demanded intake air amount at the demanded operating point $d_2$ is an intermediate value between $Q_5$ and $Q_4$, the demanded intake air amount at the demanded operating point $d_3$ is $Q_4$, the demanded intake air amount at the demanded operating point $d_4$ is an intermediate value between $Q_4$ and $Q_3$, and the demanded intake air amount at the demanded operating point $d_5$ is $Q_3$. That is, it shows the case where the successively calculated demanded intake air amount changes from $Q_6$ (point "n") to $Q_5$, an intermediate value of $Q_5$ and $Q_4$, $Q_4$, an intermediate value of $Q_4$ and $Q_3$, and $Q_3$.

Figure 27:
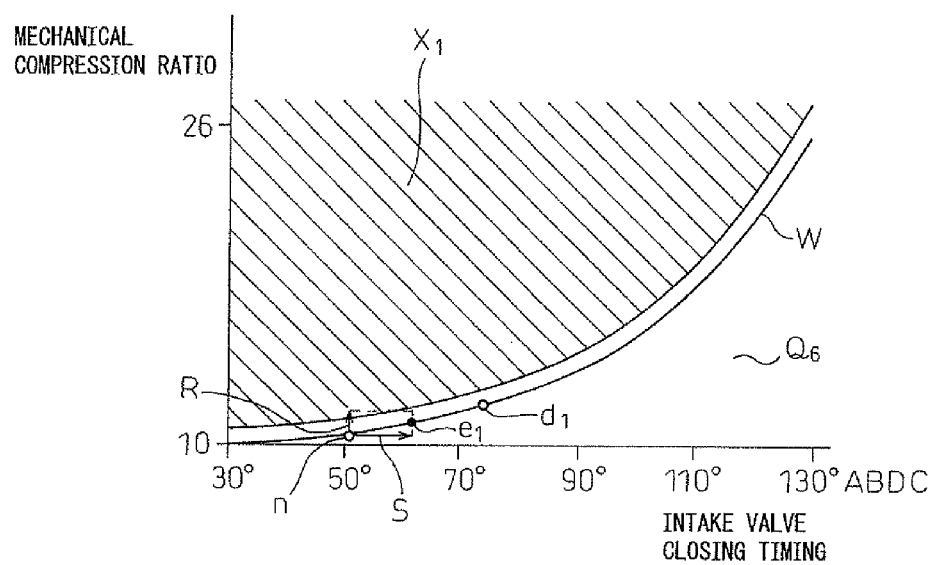
FIG. 27 is a view which shows a target operating point and an operating point.
Figure 28:
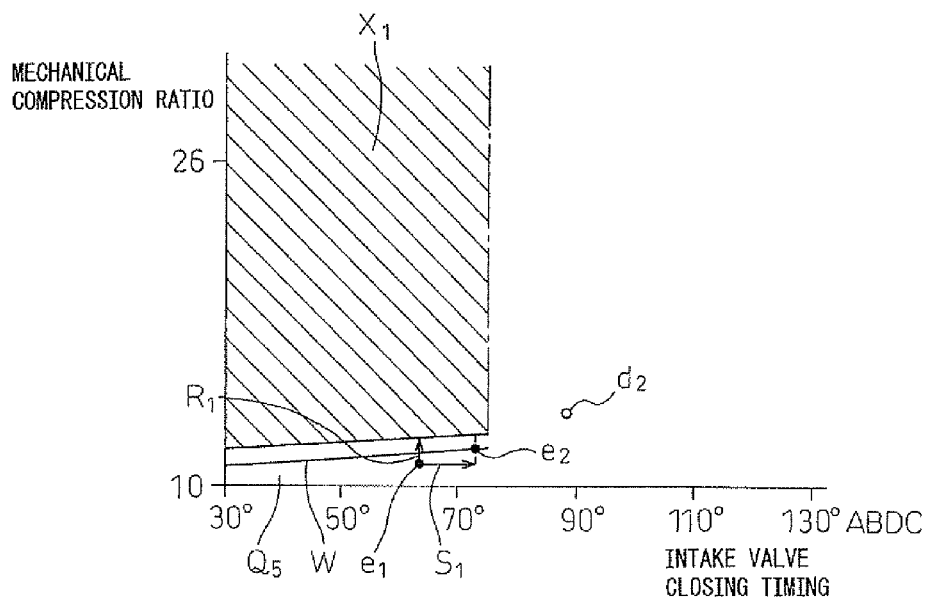
FIG. 28 is a view which shows a target operating point and an operating point.
Figure 29:
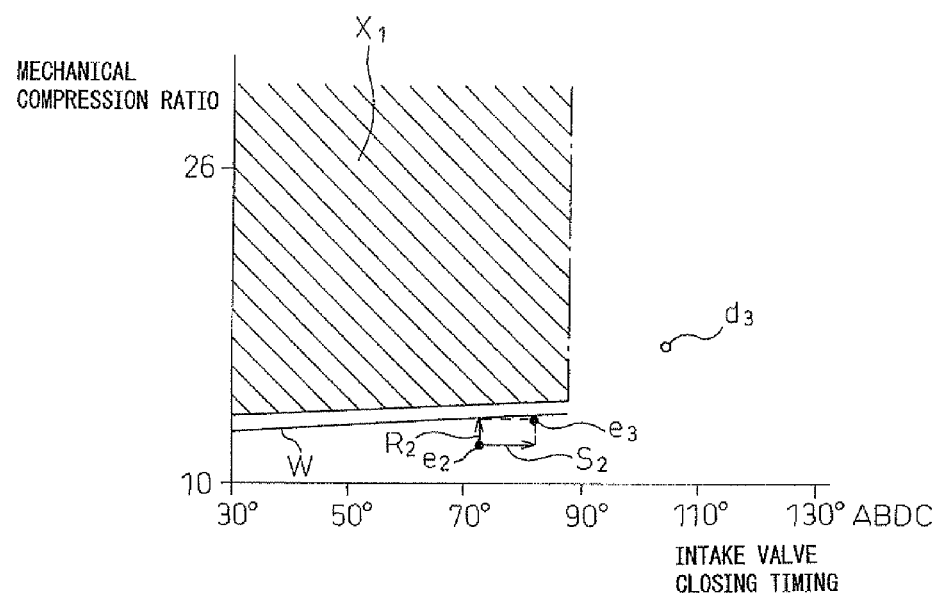
FIG. 29 is a view which shows a target operating point and an operating point.
Figure 30:
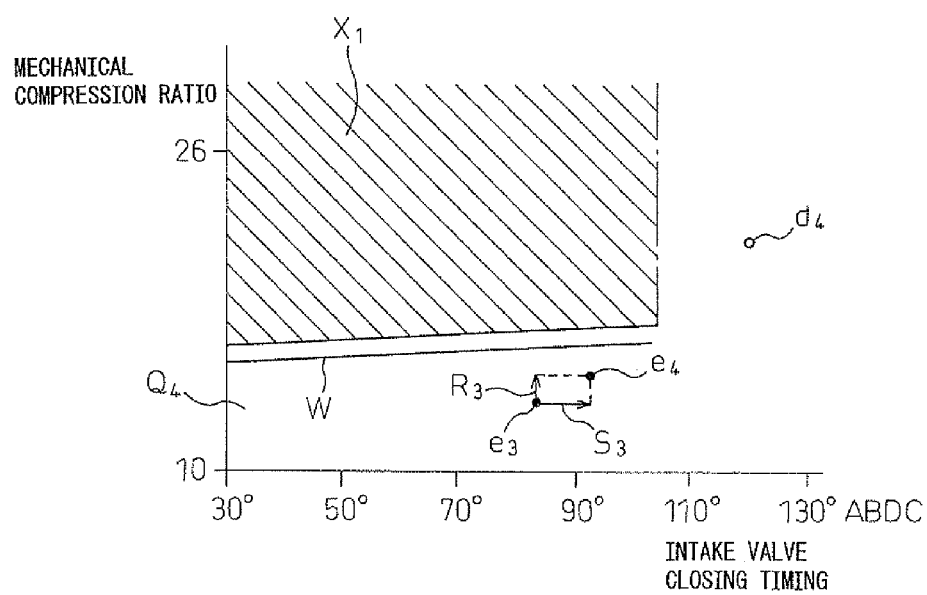
FIG. 30 is a view which shows a target operating point and an operating point.
Figure 31:
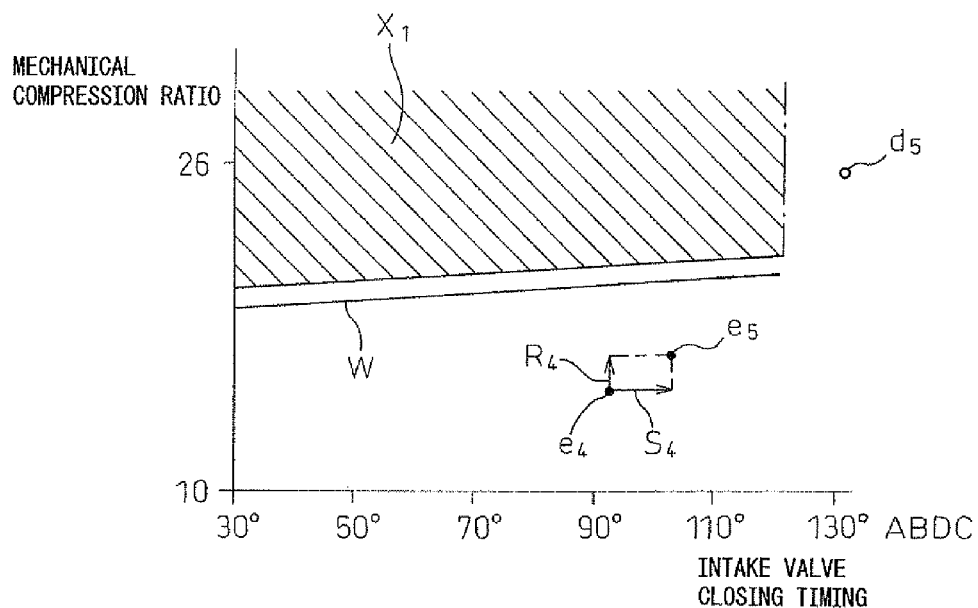
FIG. 31 is a view which shows a target operating point and an operating point.
Figure 32:
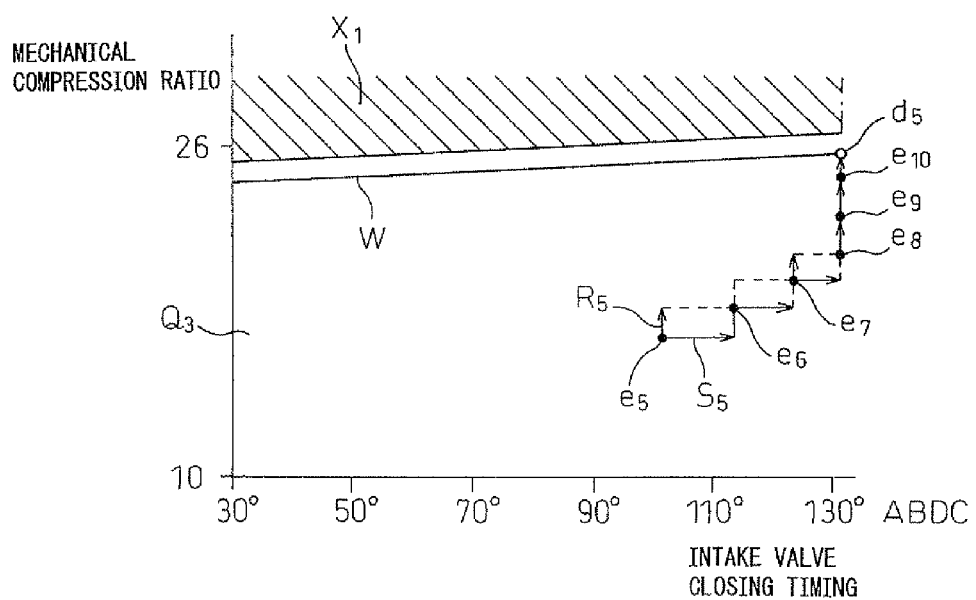
FIG. 32 is a view which shows a target operating point and an operating point.

Further, FIG. 27 shows the throttle full open plane $Q_6$, FIG. 28 shows the case where the intake air amount is an intake air amount the same as $Q_5$, FIG. 29 shows the equivalent intake air amount plane where the intake air amount is an intermediate value of $Q_5$ and $Q_4$, FIG. 30 shows an equivalent intake air amount plane where the intake air amount is $Q_4$, FIG. 31 shows an equivalent intake air amount plane where the intake air amount is an intermediate value of $Q_4$ and $Q_3$, and FIG. 32 shows an equivalent intake air amount plane where the intake air amount is $Q_3$.

Now then, if assuming that when the mechanical compression ratio and the intake valve closing timing are held at the operating point "n" which is shown in FIG. 26, the demanded intake air amount changes from $Q_6$ to $Q_5$ and, as a result, the demanded operating point becomes $d_1$, first, as shown in FIG. 27, the target operating point $e_1$ is calculated on the throttle full open plane $Q_6$. The method of calculation of the target operating point $e_1$ is the same as the method of calculation which has been explained up to here. The target operating point $e_1$ which is the closest to the demanded operating point $d_1$ without entering the no-entry region $X_1$ is calculated from the mechanical compression ratio which can be reached after the fixed time period and the intake valve closing timing which can be reached in the fixed time period. In the example which is shown in FIG. 27, this target operating point $e_1$ is positioned on the reference operating line W.

In this regard, the intake air amount at the target operating point $e_1$ is an intermediate value of $Q_6$ and $Q_5$ in a state larger than the demanded intake air amount $Q_5$. However, the intake air amount is preferably made to match the demanded intake air amount as much as possible. In this regard, if the demanded intake air amount is made to decrease, the opening degree of the throttle valve 17 may be made to change to adjust the intake air amount. Therefore, when the intake air amount at the target operating point $e_1$ is in a state larger than the demanded intake air amount $Q_5$, the throttle valve 17 is made to close to the target opening degree which is required for making the intake air amount the demanded intake air amount $Q_5$ without causing the target value for the mechanical compression ratio and the intake valve closing timing to change.

That is, in FIG. 26, the point on the equivalent intake air amount plane $Q_5$ which is positioned right under the target operating point $e_1$ on the throttle full open plane $Q_6$ which is shown in FIG. 27 is made the final target operating point $e_1$. The final target operating point $e_1$ on this equivalent intake air amount plane $Q_5$ is shown in FIG. 26 and FIG. 28. The mechanical compression ratio, the intake valve closing timing, and the opening degree of the throttle valve 17 are made to change toward the final target operating point $e_1$. That is, at this time, the mechanical compression ratio is made to increase, the intake valve closing timing is retarded, and the opening degree of the throttle valve 17 is made smaller than the full open state.

Next, if the demanded intake air amount becomes an intermediate value of $Q_5$ and $Q_4$ and the demanded operating point becomes $d_2$, next, as shown in FIG. 28, the target operating point $e_2$ on the equivalent intake air amount plane at the current intake air amount $Q_5$ is calculated. This method of calculation of the target operating point $e_2$ is also the same as the method of calculation which is explained up to here. The target operating point $e_2$ which is the closest to the demanded operating point $d_2$ without entering the no-entry region $X_1$ is calculated from the mechanical compression ratio which can be reached after the fixed time period and the intake valve closing timing which can be reached after the fixed time period. In the example which is shown in FIG. 28, this target operating point $e_2$ is positioned on the reference operating line W in the equivalent intake air amount plane $Q_5$.

In this regard, in this case as well, the intake air amount at the target operating point $e_2$ is in a state larger than the demanded intake air amount. Therefore, in this case as well, in FIG. 26, the point on the equivalent intake air amount plane (intermediate value of $Q_5$ and $Q_4$) which is positioned right under the target operating point $e_2$ on the equivalent intake air amount plane $Q_5$ which is shown in FIG. 28 is made the final target operating point $e_2$. This final target operating point $e_2$ on the equivalent intake air amount plane (intermediate value of $Q_5$ and $Q_4$) is shown in FIG. 26 and FIG. 29. The mechanical compression ratio, the intake valve closing timing, and the opening degree of the throttle valve 17 are made to change toward this final target operating point $e_2$. At this time as well, the mechanical compression ratio is made to increase, the intake valve closing timing is retarded, and the opening degree of the throttle valve 17 is made smaller from the full open state.

Next, the same thing is successively repeated, that is, the demanded intake air amount becomes $Q_4$, next, becomes an intermediate value of $Q_4$ and $Q_3$, next, becomes $Q_3$. That is, if the demanded intake air amount becomes $Q_4$, as shown in FIG. 30, the final target operating point $e_3$ on the equivalent intake air amount plane $Q_4$ is calculated, if the demanded intake air amount becomes an intermediate value of $Q_4$ and $Q_3$, as shown in FIG. 31, the final target operating point $e_4$ on the equivalent intake air amount plane (intermediate value of $Q_4$ and $Q_3$) is calculated, and, next, if the demanded intake air amount becomes $Q_3$, as shown in FIG. 32, the final target operating point $e_5$ on the equivalent intake air amount plane $Q_3$ is calculated.

During this period, that is, while the mechanical compression ratio, the intake valve closing timing, and the opening degree of the throttle valve 17 are made to successively change toward the final target operating points $e_3$, $e_4$, and $e_5$, the mechanical compression ratio is made to increase, the intake valve closing timing is retarded, and the opening degree of the throttle valve 17 is made smaller.

If the demanded intake air amount becomes $Q_3$, as shown in FIG. 32, the successive final target operating points $e_6$, $e_7$, $e_8$, $e_9$, and $e_{10}$ on the equivalent intake air amount plane $Q_3$ are calculated, and the mechanical compression ratio, the intake valve closing timing, and the opening degree of the throttle valve 17 are successively changed through these final target operating points $e_6$, $e_7$, $e_8$, $e_9$, and $e_{10}$ to the demanded operating point $d_5$. During this period, the mechanical compression ratio is made to increase, the intake valve closing timing is retarded until reaching $e_8$, and the opening degree of the throttle valve 17 is gradually increased and is made full open when reaching $e_8$.

Figure 33:
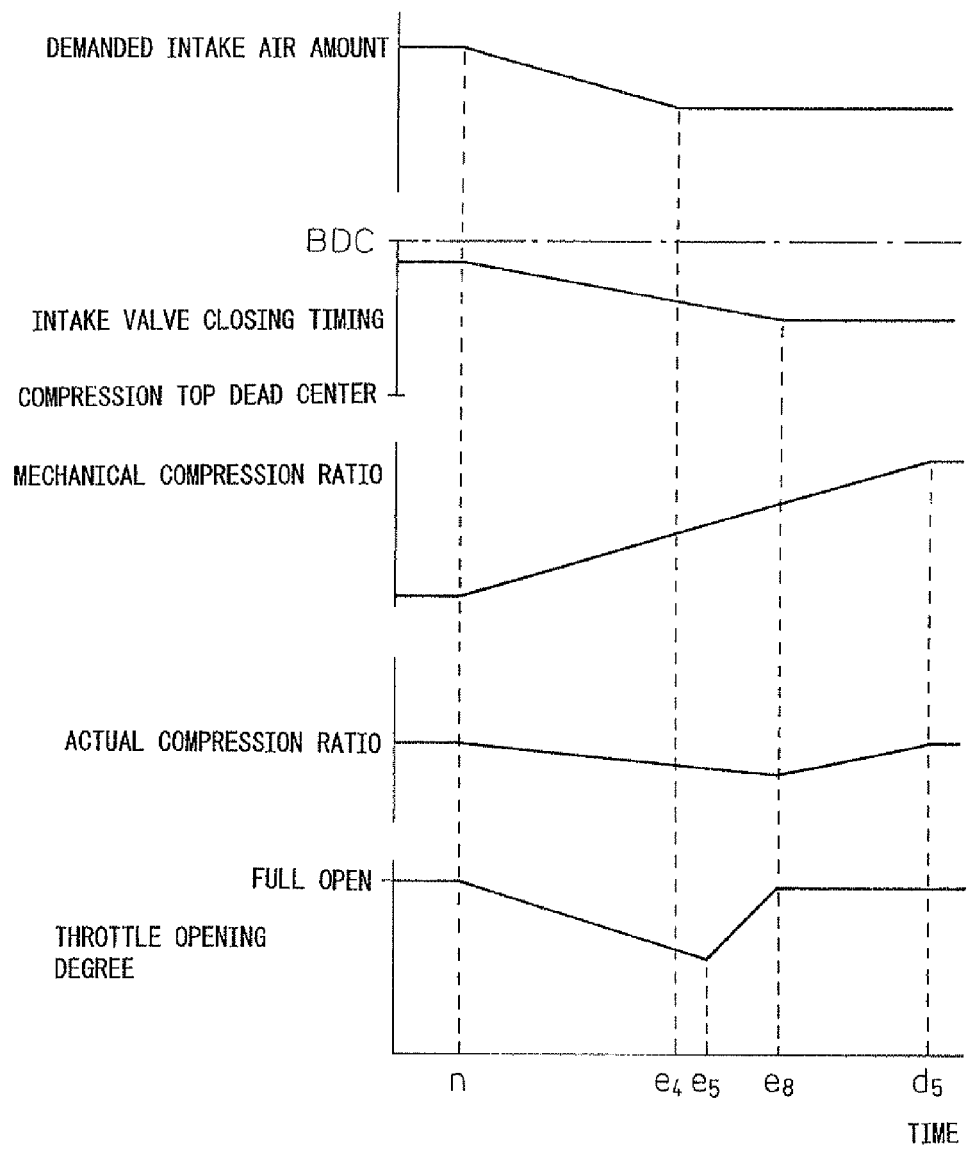
FIG. 33 is a time chart which shows changes in a mechanical compression ratio, intake valve closing timing, throttle opening degree, etc.

FIG. 33 shows the changes in the intake valve closing timing, mechanical compression ratio, actual compression ratio, and throttle opening degree in the case, as shown in FIG. 26, where the target intake air amount is made to decrease relatively quickly from $Q_6$ (point "n") to $Q_3$ (target operating point $d_5$). From FIG. 33, in this case, it is learned that after the demanded intake air amount becomes the target value (operating point $e_4$), the retarding action of the intake valve closing timing is completed (operating point $e_8$), next, the increasing action of the mechanical compression ratio is completed (target operating point $d_5$). On the other hand, the actual compression ratio gradually decreases until the retarding action of the intake valve closing timing is completed (operating point $d_8$), then gradually rises. Further, the throttle opening degree is gradually made to decrease from the full open state until the operating point becomes the operating point $e_5$ on the equivalent intake air amount plane $Q_3$, next, is made to gradually open up to the full open state until the retarding action of the intake valve closing timing is completed (operating point $e_8$).

As shown in FIG. 26 to FIG. 33, when the demanded intake air amount is made to decrease relatively quickly, in addition to control of the mechanical compression ratio and the intake valve closing timing, the throttle opening degree is also controlled. In the present invention, at this time, three-dimensional no-entry regions $X_1$, $X_2$ are set for the combination of the mechanical compression ratio, the intake valve closing timing, and the throttle opening degree. The operating point which shows the combination of the mechanical compression ratio, the intake valve closing timing, and the throttle opening degree is prohibited from entering these three-dimensional no-entry regions $X_1$, $X_2$.

Next, while referring to FIG. 34 to FIG. 39, the case where the demanded intake air amount is made to rapidly decrease to the minimum intake air amount $Q_1$ will be explained. As explained before, in this embodiment according to the present invention, for example, the demanded intake air amount is calculated every predetermined time period. The demanded operating points on the reference operating line W which satisfy the successively calculated amounts of demanded intake air are shown by $d_1$, $d_2$, and $d_3$ in FIG. 34.

Figure 34:
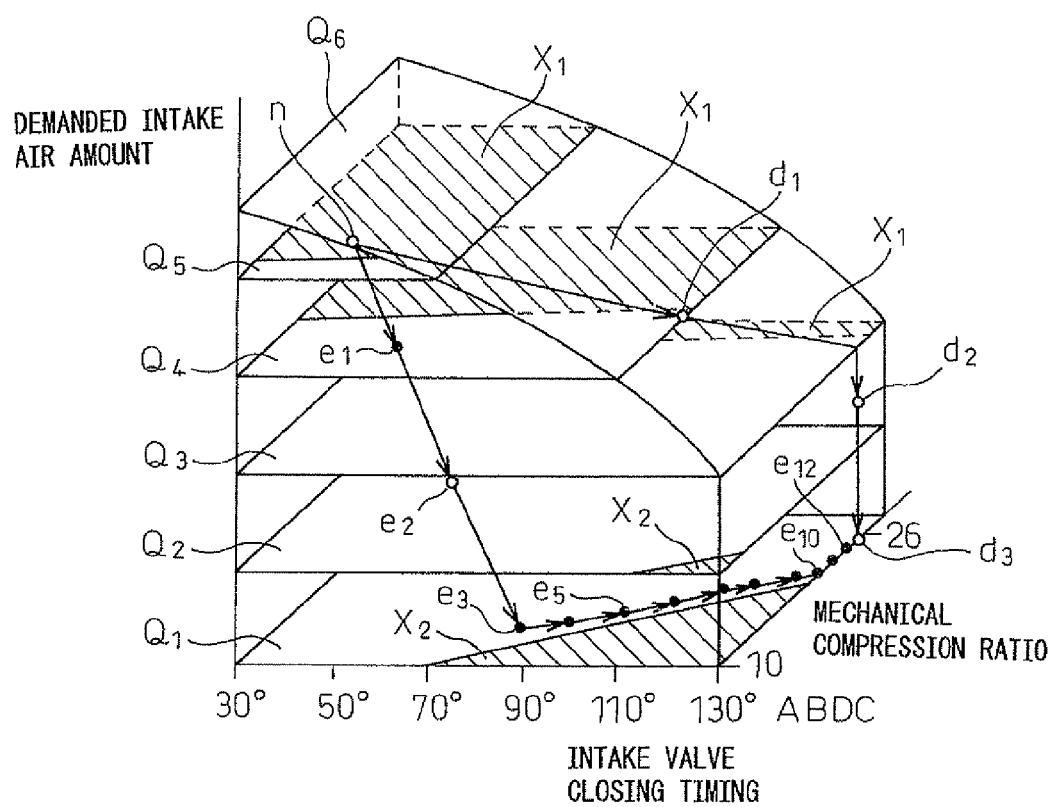
FIG. 34 is a view which shows a target operating point and an operating point.

Note that, in this case as well, to enable easy understanding of the control according to the present invention, FIG. 34 shows the case where the demanded intake air amount at the demanded operating point $d_1$ is $Q_4$, the demanded intake air amount at the demanded operating point $d_2$ is an intermediate value of $Q_2$ and $Q_3$, and the demanded intake air amount at the demanded operating point $d_3$ is $Q_1$. That is, it shows the case where the successively calculated demanded intake air amount changes from $Q_6$ (point "n") to $Q_4$, the intermediate value of $Q_3$ and $Q_2$, and $Q_1$.

Figure 35:
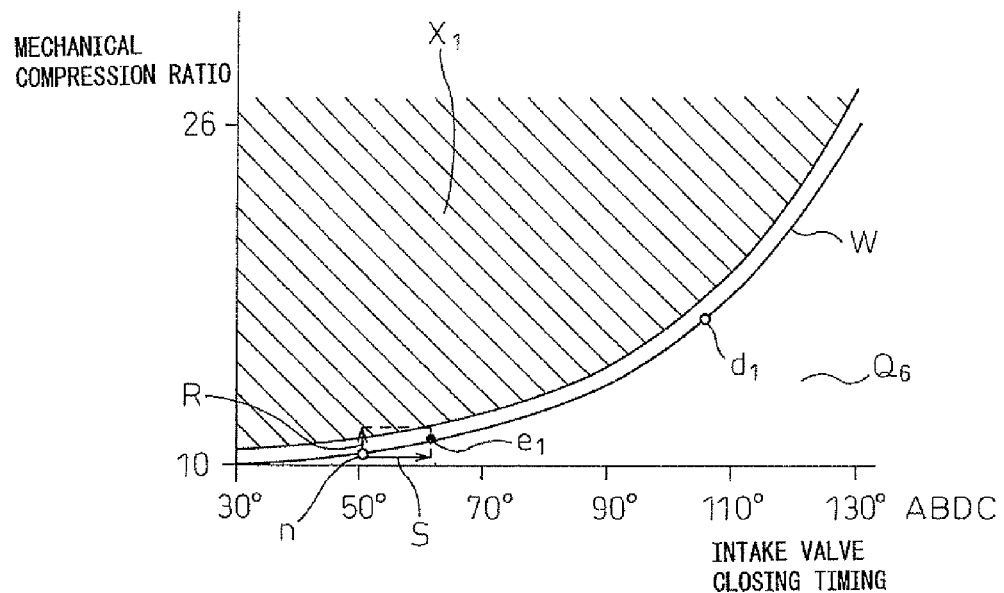
FIG. 35 is a view which shows a target operating point and an operating point.
Figure 36:
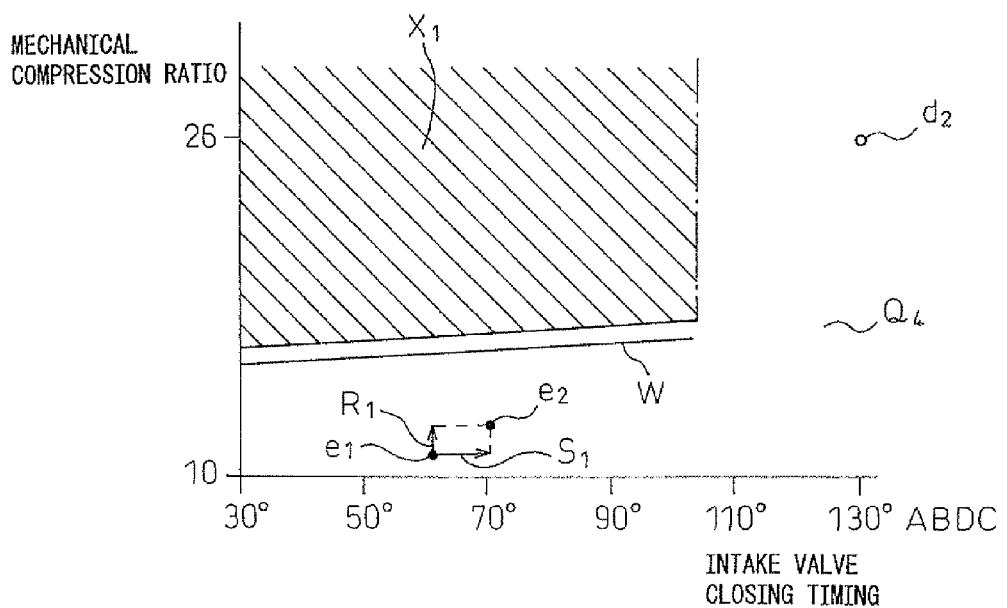
FIG. 36 is a view which shows a target operating point and an operating point.
Figure 37:
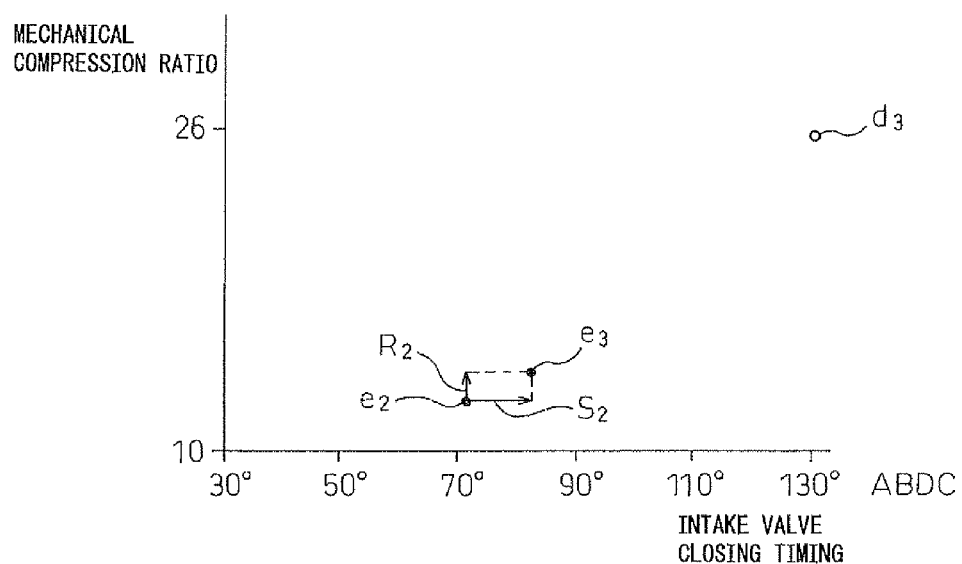
FIG. 37 is a view which shows a target operating point and an operating point.
Figure 38:
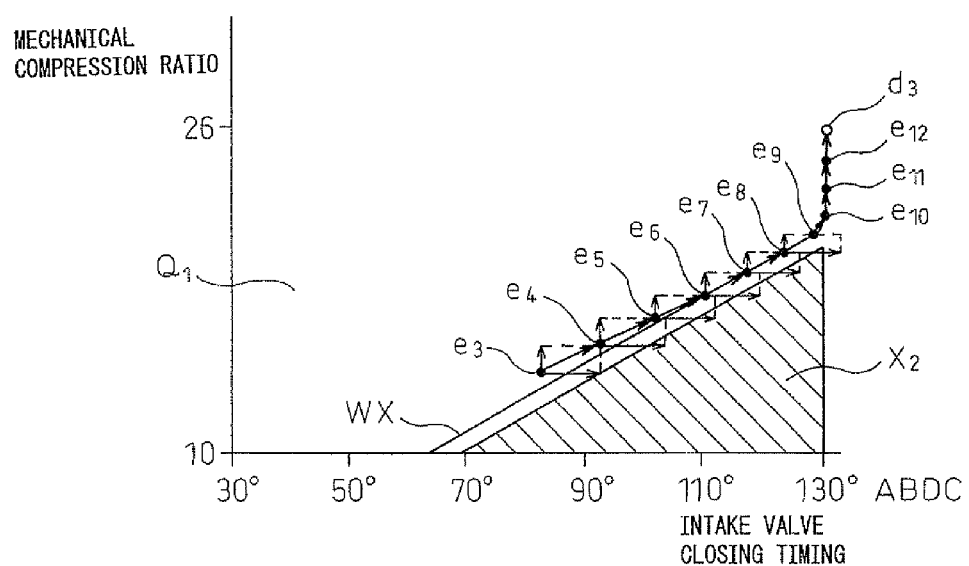
FIG. 38 is a view which shows a target operating point and an operating point.

Further, FIG. 35 shows the throttle full open plane $Q_6$, FIG. 36 shows the equivalent intake air amount plane where the intake air amount is $Q_4$, FIG. 37 shows the equivalent intake air amount plane where the intake air amount is an intermediate value of $Q_3$ and $Q_2$, and FIG. 38 shows an equivalent intake air amount plane where the intake air amount is $Q_1$.

Now then, if, when the mechanical compression ratio and the intake valve closing timing are held at the operating point "n" which is shown in FIG. 34, the demanded intake air amount changes from $Q_6$ to $Q_4$ and as a result the demanded operating point becomes $d_1$, first, as shown in FIG. 32, the target operating point $e_1$ on the throttle full open plane $Q_6$ is calculated. The method of calculation of the target operating point $e_1$ is the same as the method of calculation which is shown in FIG. 27. The target operating point $e_1$ which is closest to the demanded operating point $d_1$ without entering the inside of the no-entry region $X_1$ is calculated from the mechanical compression ratio which can be reached after the fixed time period and the intake valve closing timing which can be reached after the fixed time period. In the example which is shown in FIG. 35, this target operating point $e_1$ is positioned on the reference operating line W.

On the other hand, at this time, in the same way as the case which is shown in FIG. 26, the throttle valve 17 is made to close to the target opening degree which is required for making the intake air amount the demanded intake air amount $Q_4$ without changing the target value for the mechanical compression ratio and the intake valve closing timing.

That is, in FIG. 34, the point on the equivalent intake air amount plane $Q_4$ which is positioned right under the target operating point $e_1$ on the throttle full open plane $Q_6$ which is shown in FIG. 35 is made the final target operating point $e_1$. The final target operating point $e_1$ on this equivalent intake air amount plane $Q_4$ is shown in FIG. 34 and FIG. 36. The mechanical compression ratio, the intake valve closing timing, and the opening degree of the throttle valve 17 are made to change toward this final target operating point $e_1$. At this time, the mechanical compression ratio is made to increase, the intake valve closing timing is retarded, and the opening degree of the throttle valve 17 is made smaller from the full open state.

Next, if the demanded intake air amount becomes an intermediate value of $Q_3$ and $Q_2$ and the demanded operating point becomes $d_2$, this time, as shown in FIG. 36, the target operating point $e_2$ on the equivalent intake air amount plane at the current intake air amount $Q_4$ is calculated. The method of calculation of the target operating point $e_2$ is also the same as the method of calculation which was explained up to here. The target operating point $e_2$ which is the closest to the demanded operating point $d_2$ without entering the no-entry region $X_1$ is calculated from the mechanical compression ratio which can be reached after the fixed time period and the intake valve closing timing which can be reached after the fixed time period. In this case as well, in FIG. 34, the point on the equivalent intake air amount plane (intermediate value of $Q_3$ and $Q_2$) which is positioned right under the target operating point $e_2$ on the equivalent intake air amount plane $Q_4$ which is shown in FIG. 36 is made the final target operating point $e_2$. The final target operating point $e_2$ on this equivalent intake air amount plane (intermediate value of $Q_3$ and $Q_2$) is shown in FIG. 34 and FIG. 37.

Next, if the demanded intake air amount becomes $Q_1$ and the demanded operating point becomes $d_3$, as shown in FIG. 37, the target operating point $e_3$ on the equivalent intake air amount plane (intermediate value of $Q_3$ and $Q_2$) is calculated, next, as shown in FIG. 38, the final target operating point $e_3$ on the equivalent intake air amount plane $Q_1$ is calculated. If the final target operating point $e_3$ is calculated, the mechanical compression ratio, the intake valve closing timing, and the opening degree of the throttle valve 17 are made to change toward the final target operating point $e_3$. At this time as well, the mechanical compression ratio is made to increase, the intake valve closing timing is retarded, and the opening degree of the throttle valve 17 is made smaller than the full open state.

In this regard, if the demanded intake air amount becomes small in this way, the low load side no-entry region $X_2$ appears in the equivalent intake air amount plane. The low load side no-entry region $X_2$ which appears inside this equivalent intake air amount plane becomes larger the smaller the intake air amount becomes, and the low load side no-entry region $X_2$ which appears inside this equivalent intake air amount plane becomes maximum when, as shown by FIG. 38, the demanded intake air amount becomes the minimum $Q_1$. Note that, in this embodiment according to the present invention, around this low load side no-entry region $X_2$, an entry-blocking plane is set in advance at a slight interval away from the low load side no-entry region $X_2$ so as to block entry of the operating point to the inside of the low load no-entry region $X_2$. The intersecting line of this entry-blocking plane and equivalent intake air amount plane, that is, the entry-blocking line, is shown in FIG. 34 by WX.

Now then, in this embodiment according to the present invention, if the intake air amount becomes the demanded intake air amount $Q_1$, as shown in FIG. 38, the target operating points $e_4$, $e_5$, $e_6$, $e_7$, $e_8$, $e_9$, $e_{10}$, $e_{11}$, and $e_{12}$ which are closest to the demanded operating point $d_3$ are successively calculated from the mechanical compression ratio which can be reached after the fixed time period and the intake valve closing timing which can be reached after the fixed time period on the equivalent intake air amount plane $Q_1$. In this case, when, like with the target operating point $e_4$, the calculated target operating point which is closest to the demanded operating point $d_3$ is positioned at the opposite side to the no-entry region $X_2$ from the entry-blocking line WX, the calculated target operating point is made the target operating point $e_4$. As opposed to this, when the calculated target operating point which is closest to the demanded operating point $d_3$ is at the side nearer to the no-entry region $X_2$ from the entry-blocking line WX, the points on the entry-blocking line WX giving the peak limit of either the mechanical compression ratio and the intake valve closing timing are made the target operating points $e_5$, $e_6$, $e_7$, $e_8$, and $e_9$.

That is, if the demanded intake air amount becomes $Q_1$, the mechanical compression ratio, the intake valve closing timing, and the opening degree of the throttle valve 17 are made to change on the equivalent intake air amount plane $Q_1$ through the successive final target operating points $e_4$, $e_5$, $e_6$, $e_7$, $e_8$, $e_9$, $e_{10}$, $e_{11}$, and $e_{12}$ to the demanded operating point $d_3$. During this period, the mechanical compression ratio is made to increase, the intake valve closing timing is retarded until reaching $e_{10}$, and the opening degree of the throttle valve 17 is gradually made larger.

Figure 39:
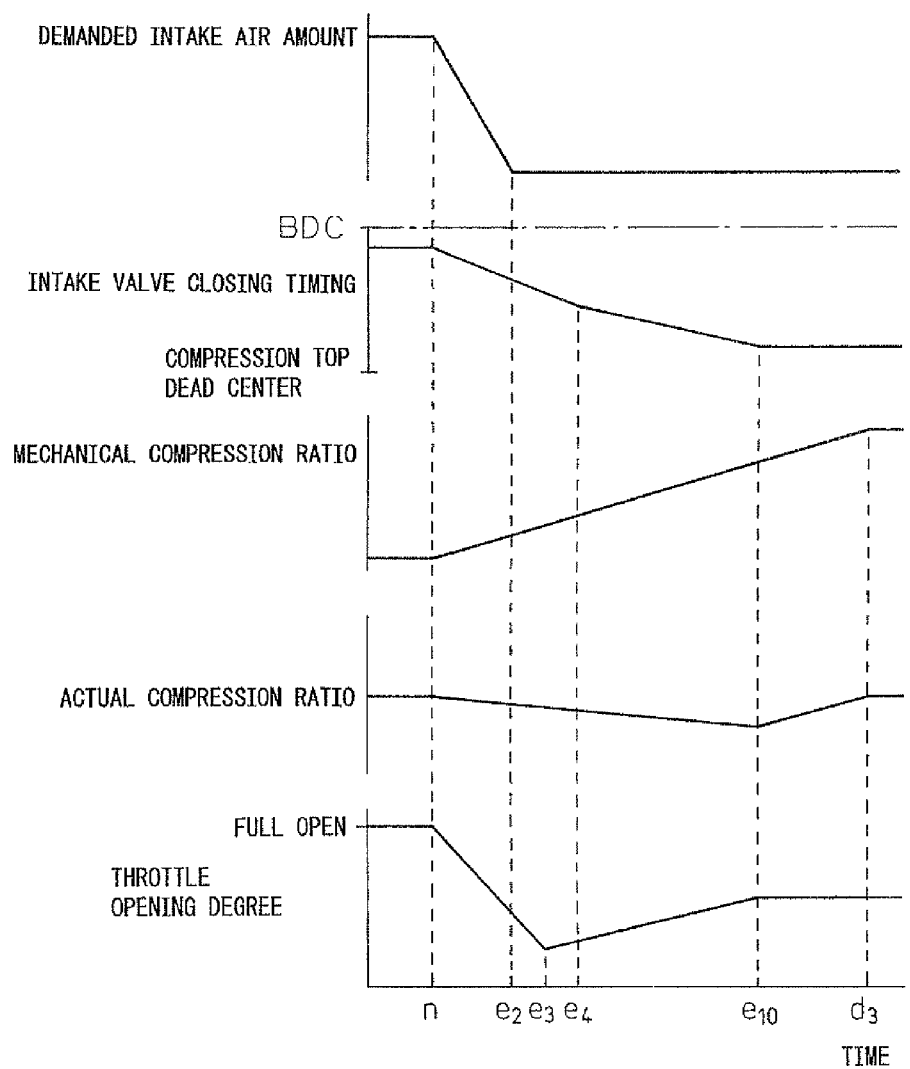
FIG. 39 is a time chart which shows changes in a mechanical compression ratio, intake valve closing timing, throttle opening degree, etc.

FIG. 39 shows the changes in the intake valve closing timing, mechanical compression ratio, actual compression ratio, and throttle opening degree in the case as shown in FIG. 34 where the target intake air amount is rapidly made to decrease from $Q_6$ (point "n") to $Q_1$ (target operating point $d_3$). In the case from FIG. 39, it is learned that after the demanded intake air amount becomes the target value (operating point $e_2$), the retarding action of the intake valve closing timing is completed (operating point $e_{10}$), then the increasing action of the mechanical compression ratio is completed (target operating point $d_3$). On the other hand, the actual compression ratio is gradually decreased and then gradually raised before the retarding action of the intake valve closing timing is completed (operating point $e_{10}$). Further, the throttle opening degree is made to be reduced from the wide open state until the operating point becomes the operating point $e_3$ on the equivalent intake air amount plane $Q_1$, then the intake valve is made to gradually open until the retarding action of the intake valve closing timing is completed (operating point $e_{10}$).

Note that, sometimes, when the demanded intake air amount changes, the opening degree of the throttle valve 17 which satisfies the demanded intake air amount is inside the three-dimensional no-entry region, that is, inside the low load side no-entry region $X_2$. In this case, the opening degree of the throttle valve 17 is made to change until the above-mentioned entry-blocking plane, that is, until right before entering inside the three-dimensional no-entry region, then the operating point which shows the combination of the mechanical compression ratio, the intake valve closing timing, and the throttle opening degree is made to change toward the operating point which satisfies the demanded intake air amount without entering the three-dimensional no-entry region.

Figure 40:
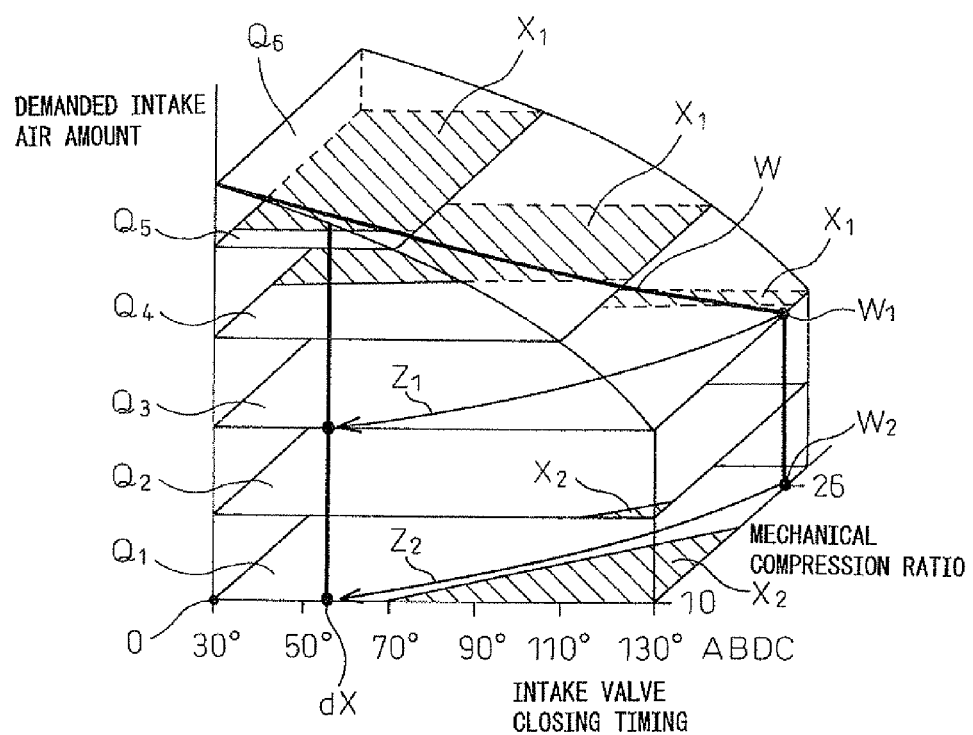
FIG. 40 is a view which shows a target operating point and an operating point.

Next, while referring to FIG. 40 to FIG. 44, the case where the drive motor 59 breaks down and the supply of electric power to the drive motor 59 is stopped will be explained. FIG. 40 shows the case where when the mechanical compression ratio and the intake valve closing timing are at the point $W_1$ and the point $W_2$, the drive motor 59 breaks down and the supply of electric power to the drive motor 59 is stopped. In this case, the operating points which show the mechanical compression ratio and the intake valve closing timing are respectively made to change from the points $W_1$ and $W_2$ toward, as shown by the arrows $Z_1$, $Z_2$, the demanded operating point dX. The demanded operating point dX is the mechanical compression ratio and the intake valve closing timing in the ordinary cycle which is shown in FIG. 8(B). In the example which is shown in FIG. 40, the mechanical compression ratio is made 10 and the intake valve closing timing is made ABDC 55°.

Figure 41:
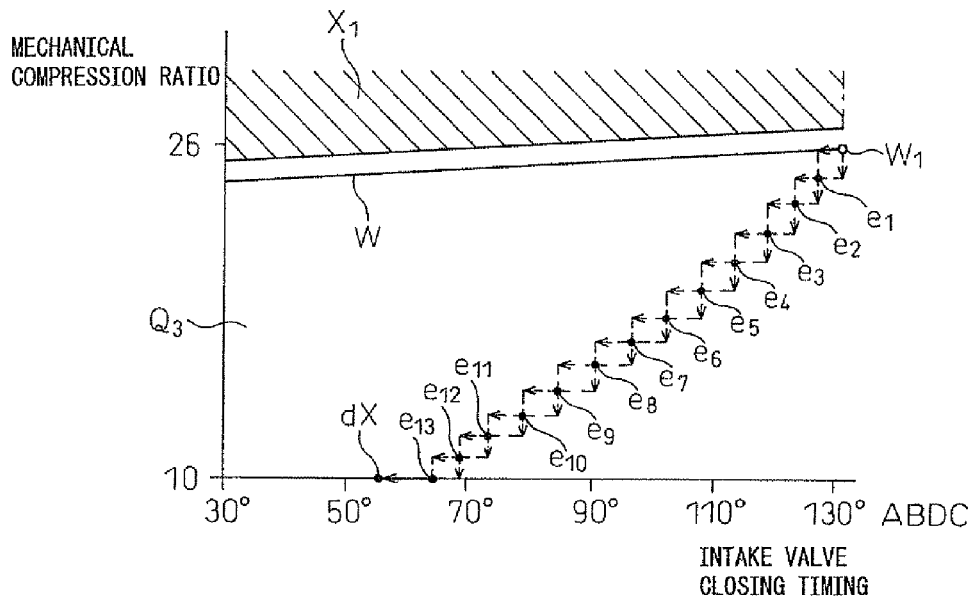
FIG. 41 is a view which shows a target operating point and an operating point.
Figure 42:
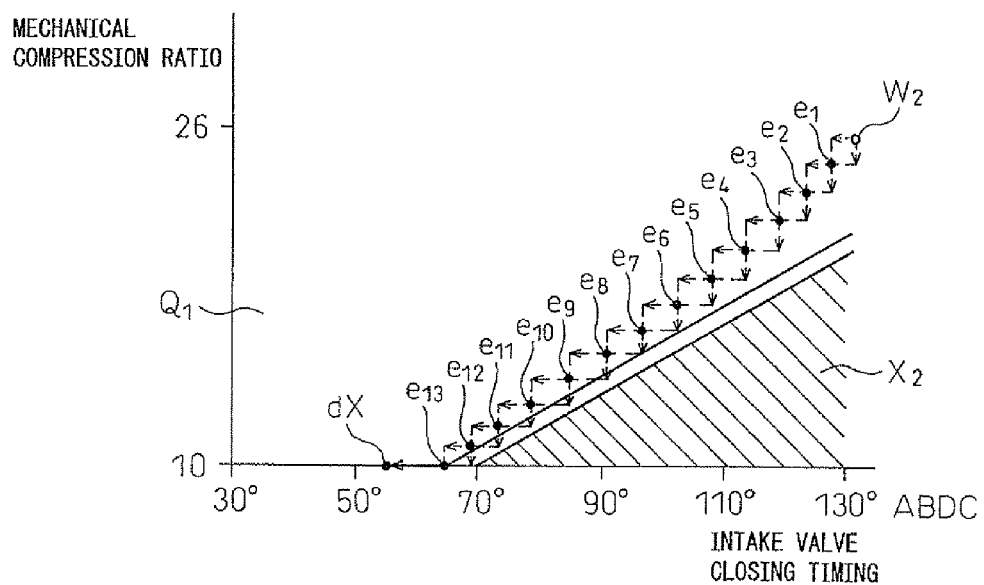
FIG. 42 is a view which shows a target operating point and an operating point.

FIG. 41 shows the target operating points $e_1$, $e_2$, $e_3$, $e_4$, $e_5$, $e_6$, $e_7$, $e_8$, $e_9$, $e_{10}$, $e_{11}$, $e_{12}$, and $e_{13}$ for when the supply of electric power to the drive motor 59 is stopped when the mechanical compression ratio and the intake valve closing timing are at the point $W_1$, while FIG. 42 shows the target operating points $e_1$, $e_2$, $e_3$, $e_4$, $e_5$, $e_6$, $e_7$, $e_8$, $e_9$, $e_{10}$, $e_{11}$, $e_{12}$, and $e_{13}$ for when the supply of electric power to the drive motor 59 is stopped when the mechanical compression ratio and the intake valve closing timing are at the point $W_2$. Note that, in the case shown in each of FIG. 41 and FIG. 42, the case where the target operating point changes in the equivalent intake air amount plane is shown as an example.

In the case which is shown in FIG. 41 and FIG. 42 as well, the method of calculation of the target operating point is similar to the method of calculation which was explained up to here. The target operating point which is the closest to the demanded operating point dX without entering the no-entry regions $X_1$, $X_2$ is calculated from the change Gr of the compression ratio in the fixed time period of the mechanical compression ratio and the intake valve closing timing which can be reached after the fixed time period. Incidentally, in the example which is shown in FIG. 41 and FIG. 42, at the target operating point $e_2$, compared with the target operating point $e_1$, the amount of decrease of the mechanical compression ratio is made the change Gr of the compression ratio in the fixed time period, while the intake valve closing timing is made the intake valve closing timing which can be reached after the fixed time period. In the same way, at the target operating point $e_3$, compared with the target operating point $e_2$, the amount of decrease of the mechanical compression ratio is made the compression ratio change Gr at the fixed time period, while the intake valve closing timing is made the intake valve closing timing which can be reached after the fixed time period. Note that, in this case, the amount of decrease of the mechanical compression ratio cannot be controlled, so what is controlled is only the intake valve closing timing.

Figure 43:
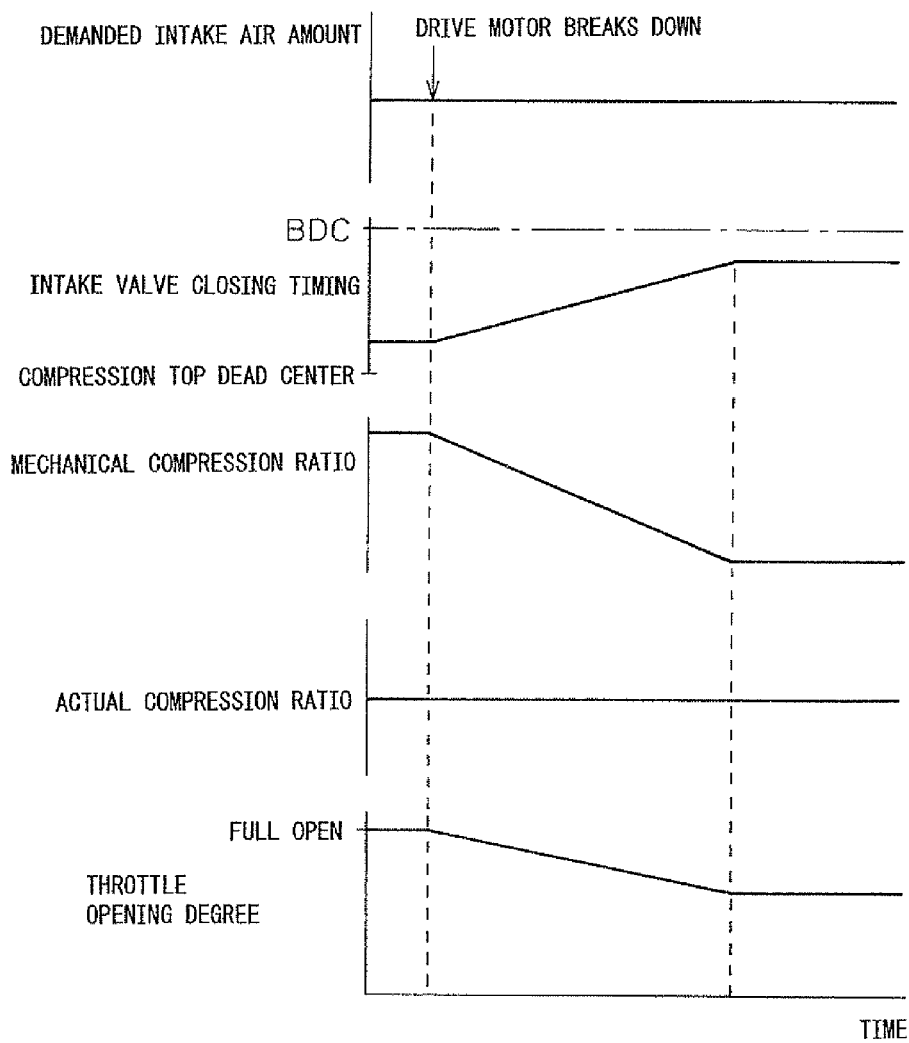
FIG. 43 is a time chart which shows changes in a mechanical compression ratio, intake valve closing timing, throttle opening degree, etc.
Figure 44:
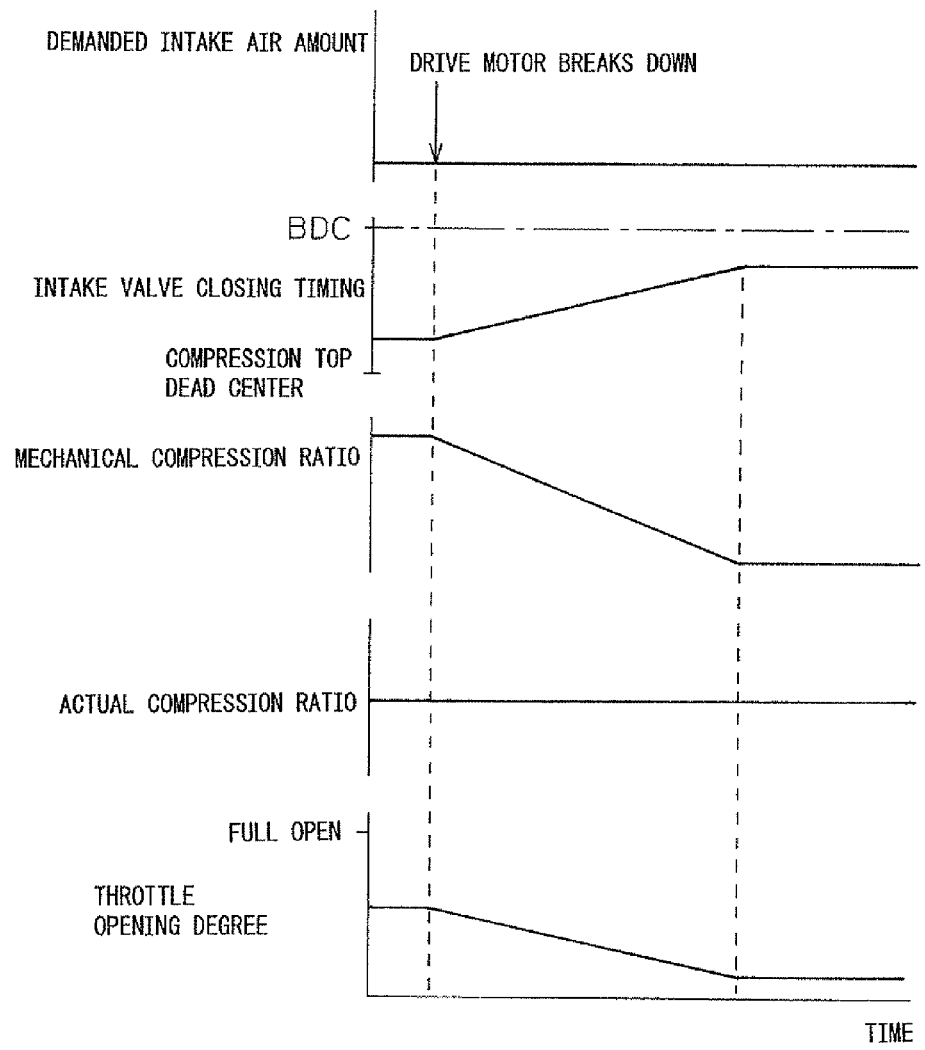
FIG. 44 is a time chart which shows changes in a mechanical compression ratio, intake valve closing timing, throttle opening degree, etc.

On the other hand, FIG. 43 shows the changes in the intake valve closing timing, the mechanical compression ratio, the actual compression ratio, and the throttle opening degree in the case which is shown in FIG. 41, while FIG. 44 shows the changes in the intake valve closing timing, the mechanical compression ratio, the actual compression ratio, and the throttle opening degree in the case which is shown in FIG. 42. In the case shown in either of FIG. 43 and FIG. 44, it is learned that if the drive motor 59 breaks down, the intake valve closing timing is advanced, the mechanical compression ratio is made to fall, and the throttle opening degree is made smaller. Note that, in this case, if the mechanical compression ratio and the intake valve closing timing reach the demanded operating point dX, the mechanical compression ratio and the intake valve closing timing are held at the demanded operating point dX. At this time, the intake air amount is controlled by the throttle valve 17.

In this way, in this embodiment according to the present invention, when the drive motor 59 breaks down, that is, when the variable compression ratio mechanism A breaks down, the target operating point which can be reached after the fixed time period from the current operating point toward the demanded operating point dX without entering the no-entry regions $X_1$, $X_2$ is calculated, and the mechanical compression ratio and the intake valve closing timing are made to change toward the target operating point. In this case, the target operating point is preferably made the operating point the most remoted from the current operating point among the operating points which can be reached after the fixed time period from the current operating point toward the demanded operating point dX without entering the no-entry regions $X_1$, $X_2$. Furthermore, in this embodiment according to the present invention, after the variable compression ratio mechanism A breaks down and the mechanical compression ratio and the intake valve closing timing reach the demanded operating point dX, the intake air amount is controlled by the throttle valve.

Figure 45:
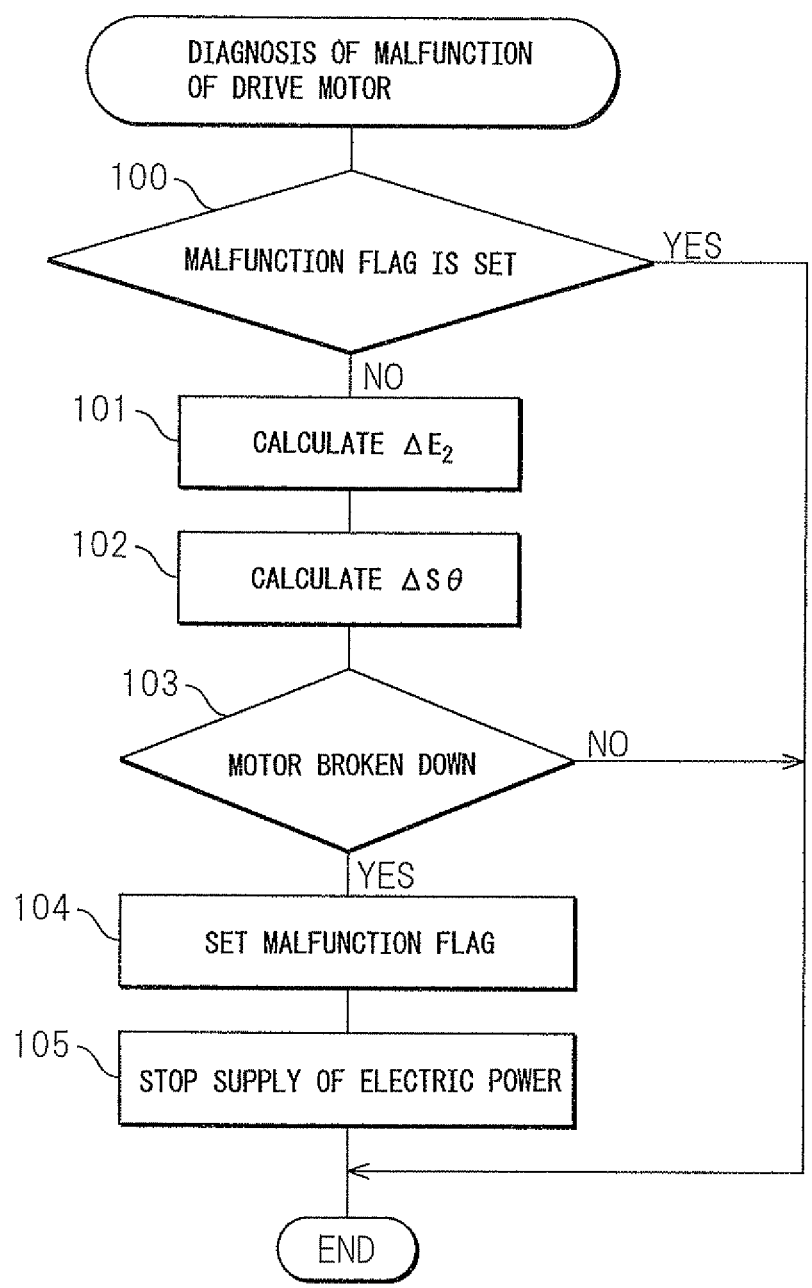
FIG. 45 is a flowchart for diagnosis of malfunction of a drive motor.

FIG. 45 shows the routine for diagnosis of malfunction of the drive motor 59. This routine is performed by interruption at certain time intervals.

Referring to FIG. 45, first, at step 100, it is judged if an malfunction flag which shows that the drive motor 59 has broken down is set. When the malfunction flag is not set, the routine proceeds to step 101 where the amount of change $\Delta E_2$ of the amount of supply of electric power to the drive motor 49 from the time of the previous interruption to the time of the current interruption is calculated. Next, at step 102, the amount of change $\Delta S\theta$ of the rotational angle of the camshaft 55 from the time of the previous interruption to the time of the current interruption is calculated. Next, at step 103, it is judged if the drive motor 59 has broken down. When $\Delta E_2$ is larger than a predetermined reference amount, yet $\Delta S\theta$ is smaller than a predetermined reference amount, it is judged that the drive motor 59 has broken down and, at this time, the routine proceeds to step 104. At step 104, the malfunction flag is set, and at step 105, the supply of electric power to the drive motor 59 is stopped.

Figure 46:
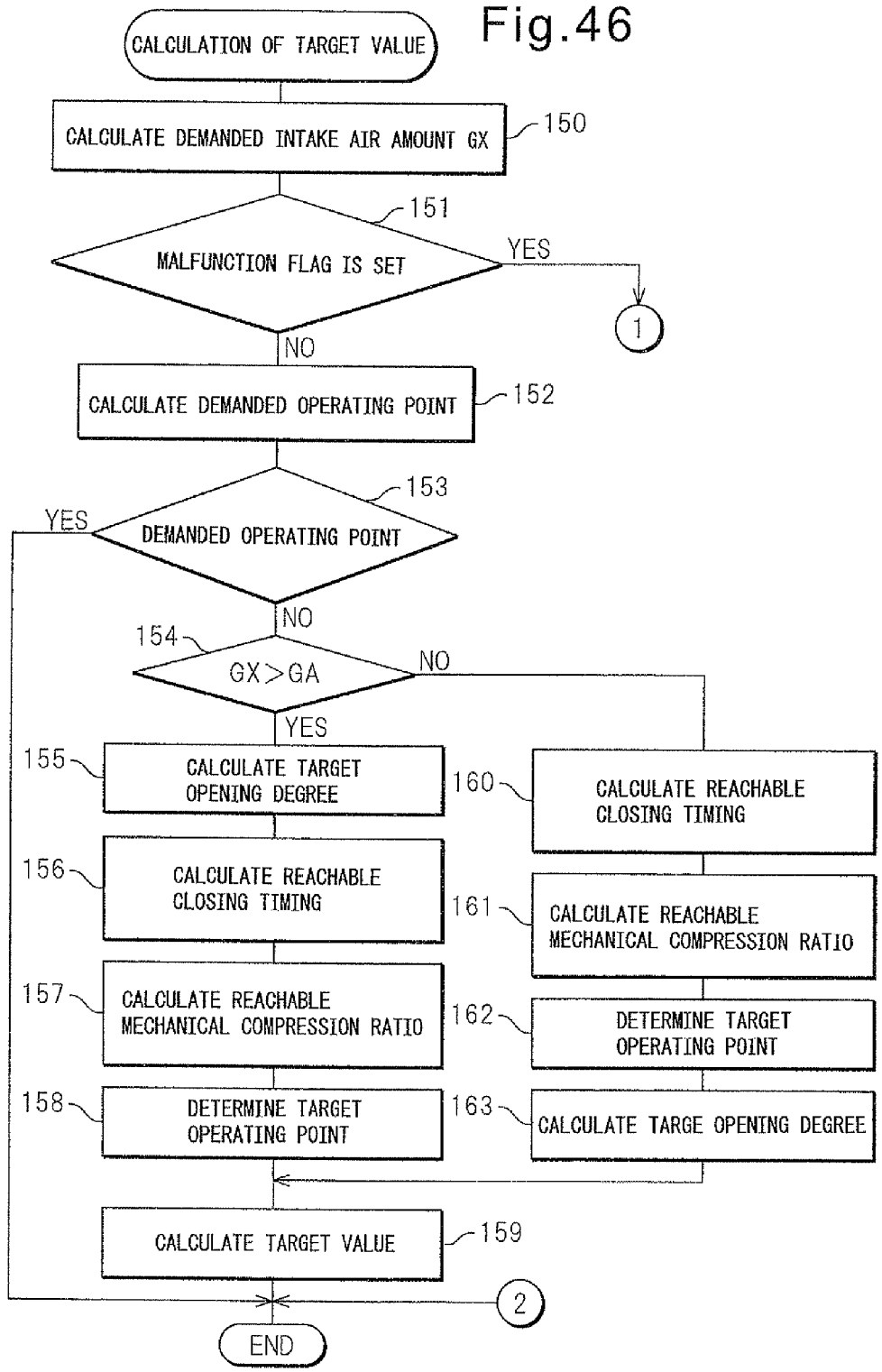
FIG. 46 is a flowchart for calculation of a target value.
Figure 47:
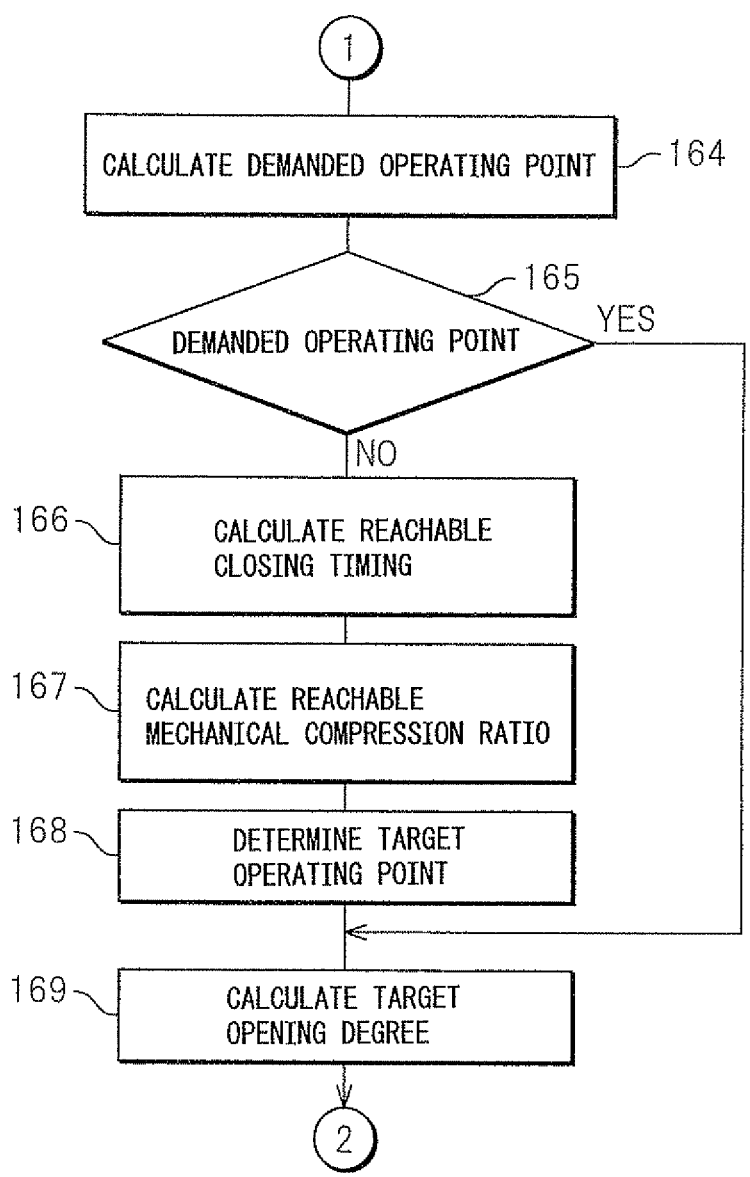
FIG. 47 is a flowchart for calculation of a target value.

FIGS. 46 and 47 shows the routine for calculating the target operating point which can be reached after the predetermined fixed time period from the current operating point, that is, for calculating the target values of the mechanical compression ratio, the intake valve closing timing, and the target value of the throttle opening degree.

In this routine, the target operating point which can be reached after the predetermined fixed time period is calculated every predetermined time period. Therefore, the routine which is shown in FIG. 46 is executed by interruption every predetermined time period. This predetermined time period can be freely set, but in this embodiment according to the present invention, this predetermined time interval is made 8 msec. Therefore, in this embodiment according to the present invention, the routine for calculation of the target value which is shown in FIG. 46 is performed every 8 msec, and the target operating point which can be reached after 8 msec from the current operating point is calculated every 8 msec.

Referring to FIG. 46, first, at step 150, the demanded intake air amount GX is calculated. This demanded intake air amount GX is for example stored as a function of the amount of depression of the accelerator pedal 40 and the engine speed in advance in the ROM 32. Next, at step 151, it is judged if the malfunction flag is set. When the malfunction flag is not set, the routine proceeds to step 152 where the demanded operating point on the reference operating line W is calculated in accordance with the demanded intake air amount GX. Next, step 153, it is judged if the current operating point is the demanded operating point. When the current operating point is the demanded operating point, the processing cycle is ended. As opposed to this, when the current operating point is not the demanded operating point, the routine proceeds to step 154 where it is judged if the demanded intake air amount GX is larger than the intake air amount GA at the current operating point.

When GX>GA, that is, when the intake air amount should be increased, the routine proceeds to step 155 where, as explained based on FIG. 19 to FIG. 21, the target operating point is determined. That is, at step 155, the target throttle opening degree in accordance with the demanded intake air amount GX is calculated. This target throttle opening degree usually becomes full open if the demanded operating point is positioned on the throttle full open plane $Q_6$. Next, at step 156, the intake valve closing timing which can be reached after the fixed time period is calculated, then, next, at step 157, the mechanical compression ratio which can be reached after the fixed time period is calculated. At this time, the possible change of the mechanical compression ratio which was explained with reference to FIG. 22 and FIG. 23 is considered to calculate the mechanical compression ratio which can be reached after the fixed time period.

Next, at step 158, the method which was explained based on FIG. 20 is used to determine the target operating point. Next, at step 159, from the determined target operating point, the target value of the mechanical compression ratio and the target value of the intake valve closing timing are calculated. The target value of the throttle opening degree was already calculated at step 155 as the target throttle opening degree.

On the other hand, when it was judged at step 154 that GX≤GA, that is, when the intake air amount should be decreased or the intake air amount becomes the demanded intake air amount, the routine proceeds to step 160 where, as explained based on FIG. 24 to FIG. 39, the target operating point is determined. That is, at step 160, the intake valve closing timing which can be reached after the fixed time period is calculated, then, next, at step 161, the mechanical compression ratio which can be reached after the fixed time period is calculated. At this time as well, the possible change of the mechanical compression ratio which was explained with reference to FIG. 22 and FIG. 23 is taken into consideration to calculate the mechanical compression ratio which can be reached after the fixed time period. Next, at step 162, the target operating point is determined.

Next, at step 163, the target throttle opening degree which satisfies the demanded intake air amount is calculated, and this target throttle opening degree is made the target value of the throttle opening degree. However, when the throttle opening degree which satisfies the demanded intake air amount GX would be inside the no-entry region, the target throttle opening degree is made a value on the above-mentioned entry-blocking plane. As the mechanical compression ratio and the intake valve closing timing approach the demanded operating point, the target throttle opening degree is made to change along the entry-blocking plane.

Note that while not explained up to here, a similar situation can occur if the demanded intake air amount increases. For example, when the operating point is positioned at the lower region of the high load side no-entry region $X_1$ in FIG. 19, if the demanded intake air amount increases, sometimes the target throttle opening degree would be inside the high load side no-entry region $X_1$. At this time, the target throttle opening degree is made a value on a reference operating plane including the different reference operating lines W which are preset for the different equivalent intake air amount planes. As the mechanical compression ratio and the intake valve closing timing approach the demanded operating point, the target throttle opening degree is made to change along this reference operating plane.

On the other hand, when it is judged at step 151 that the malfunction flag is set, the routine proceeds to step 164 where the demanded operating point dX is calculated. Next, at step 165, it is judged if the current operating point is the demanded operating point dX. When the current operating point is not the demanded operating point dX, the routine proceeds to step 166 where, as explained based on FIG. 41 and FIG. 42, the target operating point is determined. That is, at step 166, the intake valve closing timing which can be reached after the fixed time period is calculated, next, at step 167, the stored compression ratio change Gr of the mechanical compression ratio is used to calculate the mechanical compression ratio which is reached after the fixed time period.

Next, at step 168, the target operating point is calculated, then, next, at step 169, the target throttle opening degree is calculated. On the other hand, when it is judged at step 165 that the current operating point is the demanded operating point dX, the routine proceeds to step 169 where the target throttle opening degree is calculated in accordance with demanded intake air amount.

Figure 48:
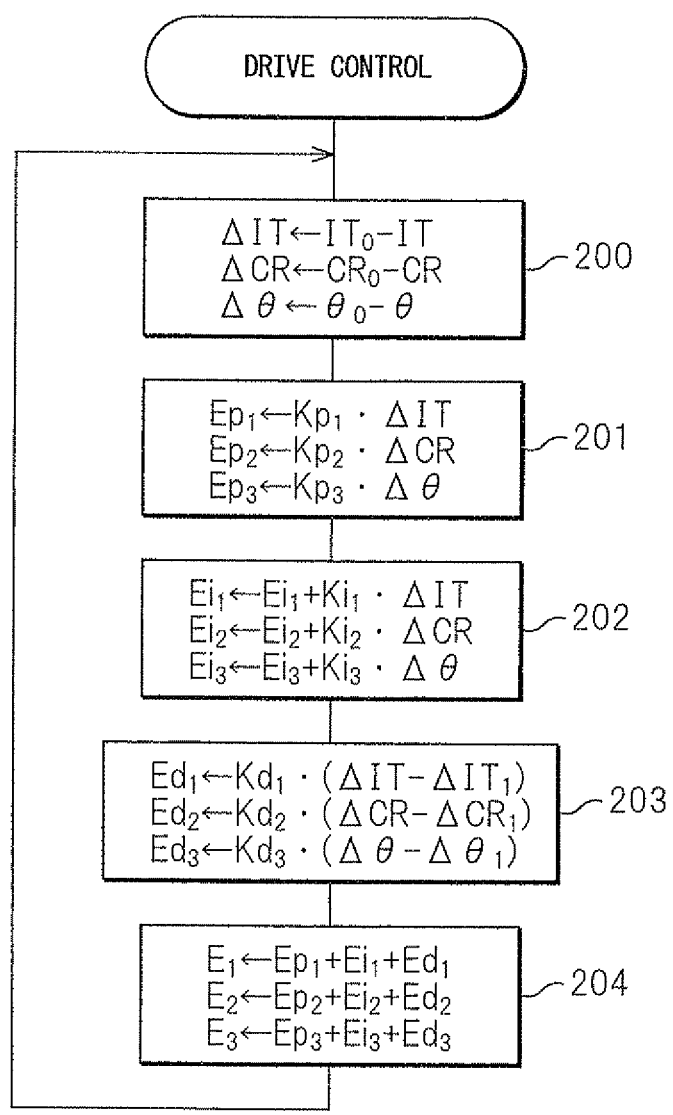
FIG. 48 is a flowchart for drive control of a variable compression ratio mechanism etc.

FIG. 48 shows a drive routine for driving the variable compression ratio mechanism A, the variable valve timing mechanism B, and the throttle valve 17 by using PID control so that the mechanical compression ratio, the intake valve closing timing, and the throttle opening degree become the target values which were calculated in the routine which is shown in FIGS. 46 and 47. This routine is repeatedly executed when the engine starts to be operated.

Referring to FIG. 48, at step 200, the difference $\Delta IT$ (=$IT_0$−IT) of the target value of the intake valve closing timing $IT_0$ and the current intake valve closing timing IT is calculated, the difference $\Delta CR$ (=$CR_0$−CR) of the target value of the mechanical compression ratio $CR_0$ and the current mechanical compression ratio CR is calculated, and the difference $\Delta\theta$ ($\theta_0$−$\theta$) of the target value of the throttle opening degree $\theta_0$ and the current throttle opening degree $\theta$ is calculated.

Next, at step 201, $\Delta IT$ is multiplied with a proportional constant $K_{p1}$ so as to calculate a proportional term $E_{p1}$ of the drive voltage for the variable valve timing mechanism B, $\Delta CR$ is multiplied with a proportional constant $K_{p2}$ so as to calculate a proportional term $E_{p2}$ of the drive voltage for the variable compression ratio mechanism A, and $\Delta\theta$ is multiplied with a proportional constant $K_{p3}$ so as to calculate a proportional term $E_{p3}$ of the drive voltage for the throttle valve 17.

Next, at step 202, $\Delta IT$ is multiplied with an integral constant $K_{i1}$ and this multiplied result ($K_{i1}\cdot\Delta IT$) is cumulatively added to calculate an integral term $E_{i1}$ of the drive voltage for the variable valve timing mechanism B, $\Delta CR$ is multiplied with an integral constant $K_{i2}$ and this multiplied result ($K_{i2}\cdot\Delta CR$) is cumulatively added to calculate an integral term $E_{i2}$ of the drive voltage for the variable compression ratio mechanism A, and $\Delta\theta$ is multiplied with an integral constant $K_{i3}$ and this multiplied result ($K_{i3}\cdot\Delta\theta$) is cumulatively added to calculate an integral term $E_{i3}$ of the drive voltage for the throttle valve 17.

Next, at step 203, the difference ($\Delta IT-\Delta IT_1$) between the current $\Delta IT$ and the previous calculated $\Delta IT_1$ is multiplied with a differential constant $K_{d1}$ so as to calculate a differential term $E_{d1}$ of the drive voltage for the variable valve timing mechanism B, the difference ($\Delta CR-\Delta CR_1$) between the current $\Delta CR$ and the previous calculated $\Delta CR_1$ is multiplied with a differential constant $K_{d2}$ so as to calculate a differential term $E_{d2}$ of the drive voltage for the variable compression ratio mechanism A, and the difference $\Delta\theta-\Delta\theta_1$) between the current $\Delta\theta$ and the previous calculated $\Delta\theta_1$ is multiplied with a differential constant $K_{d3}$ so as to calculate a differential term $E_{d3}$ of the drive voltage for the throttle valve 17.

Next, at step 204, the proportional term $E_{p1}$, the integral term $E_{i1}$, and the differential term $E_{d1}$ are added to calculate the drive voltage $E_1$ for the variable valve timing mechanism B, the proportional term $E_{p2}$, the integral term $E_{i2}$, and the differential term $E_{d2}$ are added to calculate the drive voltage $E_2$ for the variable compression ratio mechanism A, and the proportional term $E_{p3}$, the integral term $E_{i3}$, and the differential term $E_{d3}$ are added to calculate the drive voltage $E_3$ for the throttle valve 17.

If the variable valve timing mechanism B, the variable compression ratio mechanism A, and the throttle valve 17 are respectively driven in accordance with the drive voltages $E_1$, $E_2$, and $E_3$, the intake valve closing timing, the mechanical compression ratio, and the throttle opening degree respectively change toward the successively changing target values. Note that, when the malfunction flag is set, the application of the drive voltage $E_2$ to the variable compression ratio mechanism A is stopped.

Figure 49:
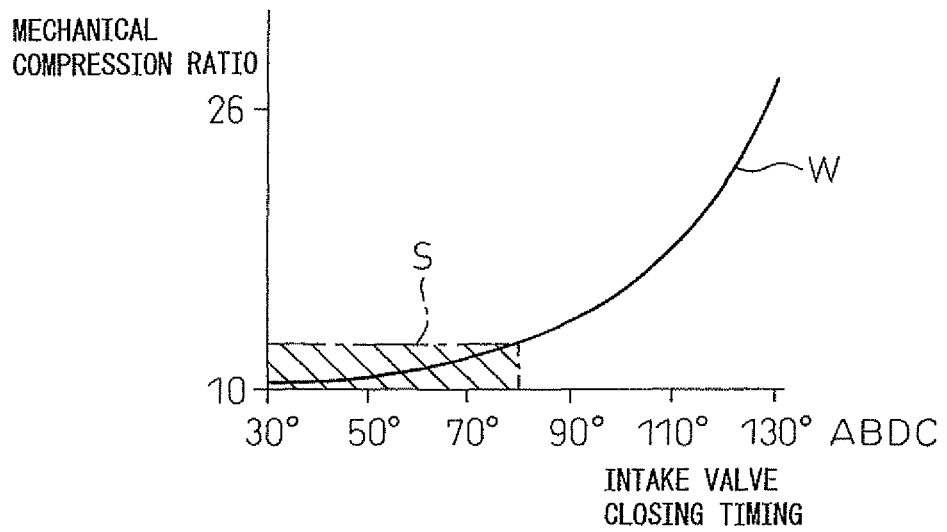
FIG. 49 is a view for explaining a modification.

FIG. 49 shows a modification. As shown in FIG. 40 to FIG. 42, in the embodiment which was explained up to here, when the supply of electric power to the drive motor 59 is stopped, the mechanical compression ratio and the intake valve closing timing are made to change toward the demanded operating point dX. However, when the operating point which shows the mechanical compression ratio and the intake valve closing timing is in a region shown by the hatching S in FIG. 49, that is, when the mechanical compression ratio is low and the intake valve closing timing is at the advanced side, if the drive motor 59 breaks down, no problem occurs even if maintaining the operating point which shows the mechanical compression ratio and the intake valve closing timing at the operating point at the time of breakdown of the drive motor 59.

Therefore, in the modification which is shown in FIG. 49, if the drive motor 59 breaks down when the operating point which shows the mechanical compression ratio and the intake valve closing timing is in the region which is shown by the hatching S in FIG. 49, the operating point which shows the mechanical compression ratio and the intake valve closing timing is maintained at the operating point at the time of breakdown of the drive motor 59. Furthermore, in the modification which is shown in FIG. 49, if the drive motor 59 breaks down when the operating point which shows the mechanical compression ratio and the intake valve closing timing is outside the region which is shown by the hatching S in FIG. 49, it is possible to make the demanded operating point dX for the mechanical compression ratio and the intake valve closing timing any position inside the region which is shown by the hatching S.

Figure 50:
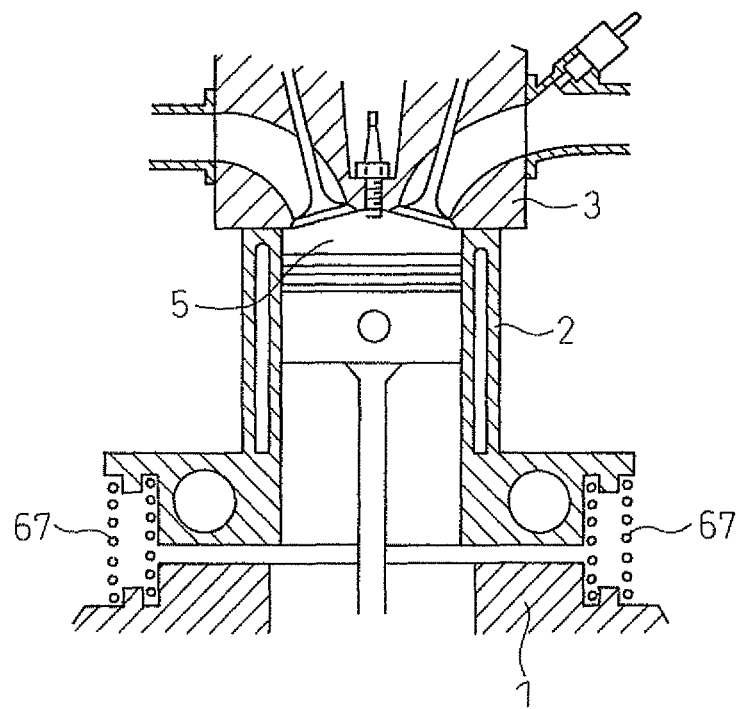
FIG. 50 is a side cross-sectional view of an internal combustion engine which shows another embodiment.

FIG. 50 shows another embodiment. As explained above, in the present invention, reversible type transmission mechanisms 65, 66 are used. Therefore, when the engine is stopped, the cylinder block 2 descends due to gravity and a high compression ratio state is entered. As a result, when restarting the engine, there is a danger of abnormal combustion occurring. Therefore, in the embodiment which is shown in FIG. 50, when the engine is stopped, the cylinder block 2 is kept from descending due to gravity by placing elastic members, for example, compression springs 67, between the crankcase 1 and the cylinder block 2.

On the other hand, if making the structure such as shown in FIG. 50, since using reversible type transmission mechanisms 65, 66, when the engine is stopped, the cylinder block 2 is lifted up and a low compression ratio state is entered. Therefore, at the time of restart of the engine, the low compression ratio state is entered. However, at the time of restart of the engine, if entering an extreme low compression ratio state, startup of the engine becomes difficult.

Figure 51:
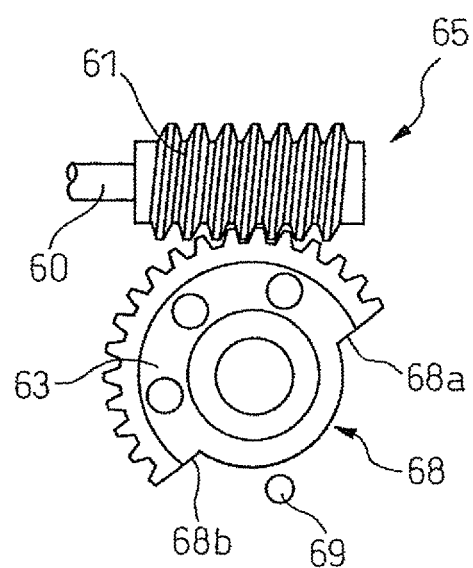
FIG. 51 is a view which shows another embodiment of a worm and a worm wheel.

Therefore, in the embodiment which is shown in FIG. 51, a cutaway part 68 is formed at the worm wheel 63 and a stopper 69 which can engage with the two end parts 68a, 68b of the cutaway part 68 is attached. This stopper 69 is used to restrict the range of rotational angle of the worm wheel 63 so that the compression ratio does not become extremely low. That is, in this embodiment, to prevent the mechanical compression ratio from excessively falling when the engine is stopped, the transmission mechanisms 65, 66 are used to limit the rotational angles of the camshafts 65, 66.

REFERENCE SIGNS LIST

1 ... crankcase
2 ... cylinder block
3 ... cylinder head
4 ... piston
5 ... combustion chamber
7 ... intake valve
17 ... throttle valve
65, 66 ... transmission mechanisms
70 ... intake valve drive-use camshaft
A ... variable compression ratio mechanism
B ... variable valve timing mechanism

The invention claimed is:

1. A spark ignition type internal combustion engine comprising a variable compression ratio mechanism able to change a mechanical compression ratio and a variable valve timing mechanism able to control a closing timing of an intake valve, wherein a no-entry region for a combination of the mechanical compression ratio and the intake valve closing timing is set to prohibit entry of an operating point which shows the combination of the mechanical compression ratio and the intake valve closing timing into the no-entry region, and the mechanical compression and the intake valve closing timing are made to change from a current operating point toward a demanded operating point on a low mechanical compression ratio side without entering the no-entry region when the variable compression ratio mechanism breaks down.

2. The spark ignition type internal combustion engine as claimed in claim 1, wherein said variable compression ratio mechanism is configured so that if the variable compression ratio mechanism breaks down, the combustion pressure causes the mechanical compression ratio to gradually fall and, when the variable compression ratio mechanism breaks down and the mechanical compression ratio gradually falls, the mechanical compression ratio and the intake valve closing timing are made to change from the current operating point toward the demanded operating point without entering the no-entry region.

3. The spark ignition type internal combustion engine as claimed in claim 2, wherein when said variable compression ratio mechanism breaks down, a target operating point which can be reached after a fixed time period from the current operating point toward the demanded operating point without entering the no-entry region is calculated, and the mechanical compression ratio and the intake valve closing timing are made to change toward the target operating point.

4. The spark ignition type internal combustion engine as claimed in claim 3, wherein said target operating point is calculated from the intake valve closing timing which can be reached after the fixed time period and a change of compression ratio of the mechanical compression ratio which is stored.

5. The spark ignition type internal combustion engine as claimed in claim 4, wherein said target operating point is made an operating point which is remoted the most from the current operating point in the operating points which can be reached after the fixed time period from the current operating point toward the demanded operating point without entering the no-entry region.

6. The spark ignition type internal combustion engine as claimed in claim 2, wherein a throttle valve for controlling an intake air amount is provided, and the intake air amount is controlled by the throttle valve after said variable compression ratio mechanism breaks down and the mechanical compression ratio and the intake valve closing timing reach the demanded operating point.

7. The spark ignition type internal combustion engine as claimed in claim 2, wherein said variable compression ratio mechanism is driven through a transmission mechanisms by output of an electric driven type actuator, and said variable compression ratio mechanism has a structure wherein the combustion pressure causes said transmission mechanism to operate so that the mechanical compression ratio gradually falls when supply of electric power to the electric driven type actuator is stopped.

8. The spark ignition type internal combustion engine as claimed in claim 7, wherein said transmission mechanism has a transfer efficiency of 10 percent to 50 percent when the transmission mechanism is made to operate by the combustion pressure.

9. The spark ignition type internal combustion engine as claimed in claim 7, wherein said variable compression ratio mechanism makes relative positions of a crankcase and a cylinder block arranged above the crankcase change due to rotation of a camshaft so as to make the mechanical compression ratio change, and said transmission mechanism is comprised of a worm wheel which is attached to the camshaft and a worm which engage with the worm wheel and are made to rotate by the actuator.

10. The spark ignition type internal combustion engine as claimed in claim 7, wherein an elastic member is arranged between the crankcase and the cylinder block so as to keep the cylinder block from descending due to gravity when the engine is stopped.

11. The spark ignition type internal combustion engine as claimed in claim 10, wherein said transmission mechanisms restricts a rotational angle of a camshaft to keep the mechanical compression ratio from excessively falling when the engine is stopped.

* * * * *